United States Patent [19]

Leung

[11] 4,197,767

[45] Apr. 15, 1980

[54] WARM UP CONTROL FOR CLOSED LOOP ENGINE ROUGHNESS FUEL CONTROL

[75] Inventor: Chun-Keung Leung, Farmington, Mich.

[73] Assignee: The Bendix Corporation, Southfield, Mich.

[21] Appl. No.: 904,129

[22] Filed: May 8, 1978

[51] Int. Cl.² .................. B60K 41/18; F02B 3/00; G06F 15/20
[52] U.S. Cl. .................. 74/860; 123/32 EG; 123/117 D; 364/569
[58] Field of Search .................. 74/856, 857, 858, 859, 74/860; 123/32 EG, 117 D, 117 R; 364/550, 569

[56] References Cited

U.S. PATENT DOCUMENTS

| | | | |
|---|---|---|---|
| 4,099,495 | 7/1978 | Kiencke et al. | 123/32 EG X |
| 4,126,107 | 11/1978 | Harada et al. | 123/32 EG X |
| 4,132,210 | 1/1979 | Long | 123/32 EG X |

*Primary Examiner*—Lance Chandler

*Attorney, Agent, or Firm*—Gaylord P. Haas, Jr.; Russel C. Wells

[57] ABSTRACT

A warm-up control for a closed loop engine roughness control responsive to engine load and engine temperature is disclosed herein. The warm-up control provides a first correction signal to the closed loop engine roughness control operative to increase the effective value of the roughness signal in response to a signal indicative of a load being applied to the engine and the engine temperature being below a predetermined temperature and a second correction signal to the closed loop engine roughness control operative to decrease the effective value of the roughness signal in response to a signal indicative of a light engine load and the engine temperature being below a predetermined temperature. The control also generates a transient signal in response to a sudden increase of the engine's load operative to cause the closed loop engine roughness control to generate a fixed output signal for a predetermined length of time. The fuel control computer in response to the fixed output signal generates signals increasing the fuel delivery to the engine to prevent the engine from stumbling or stalling with the application of the load.

19 Claims, 56 Drawing Figures

$P_n = 0, 1$

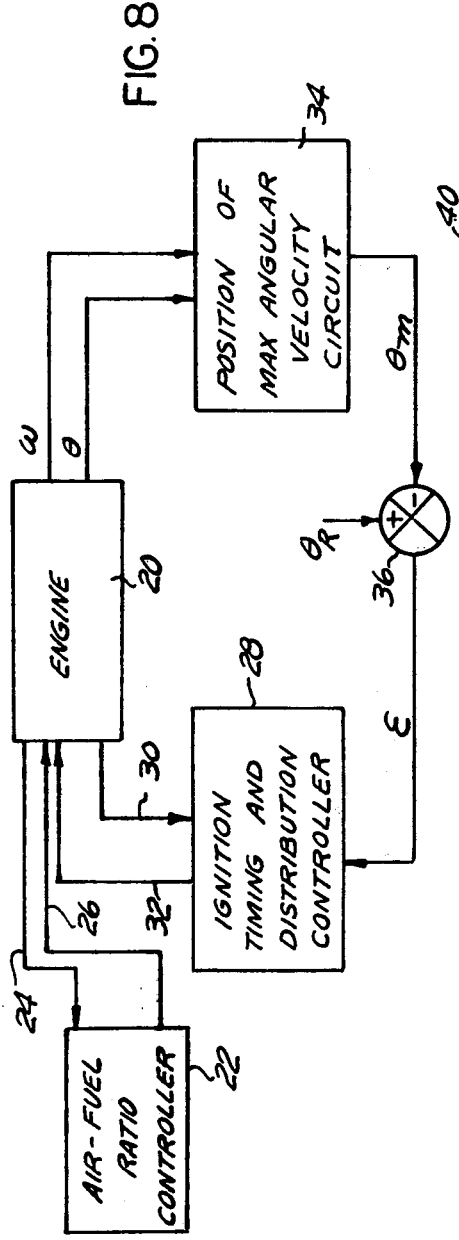
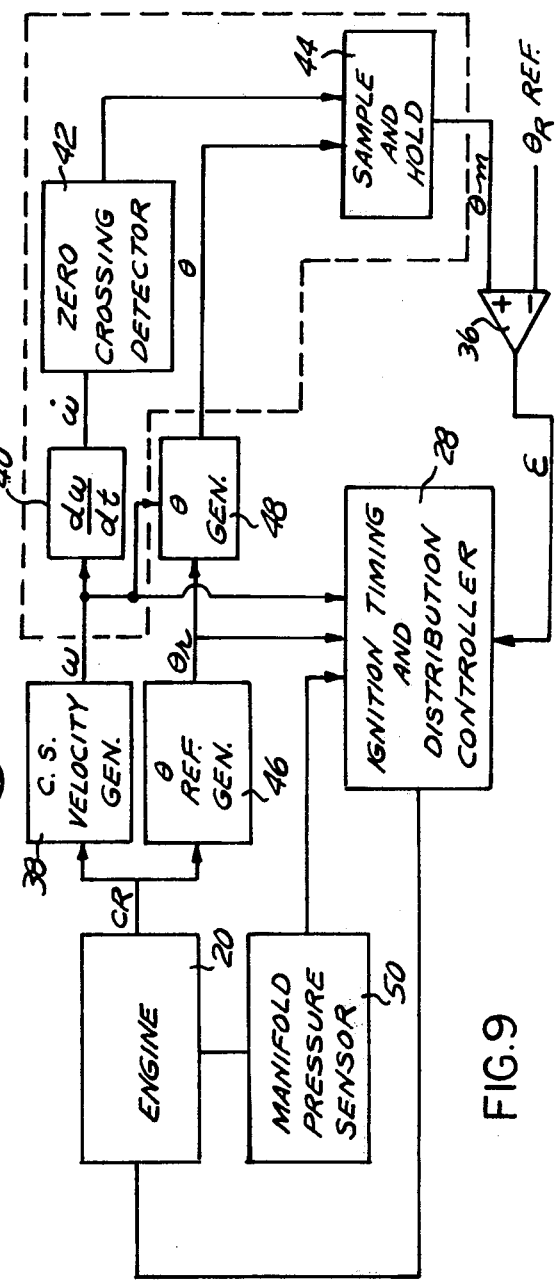
FIG. 8
FIG. 9

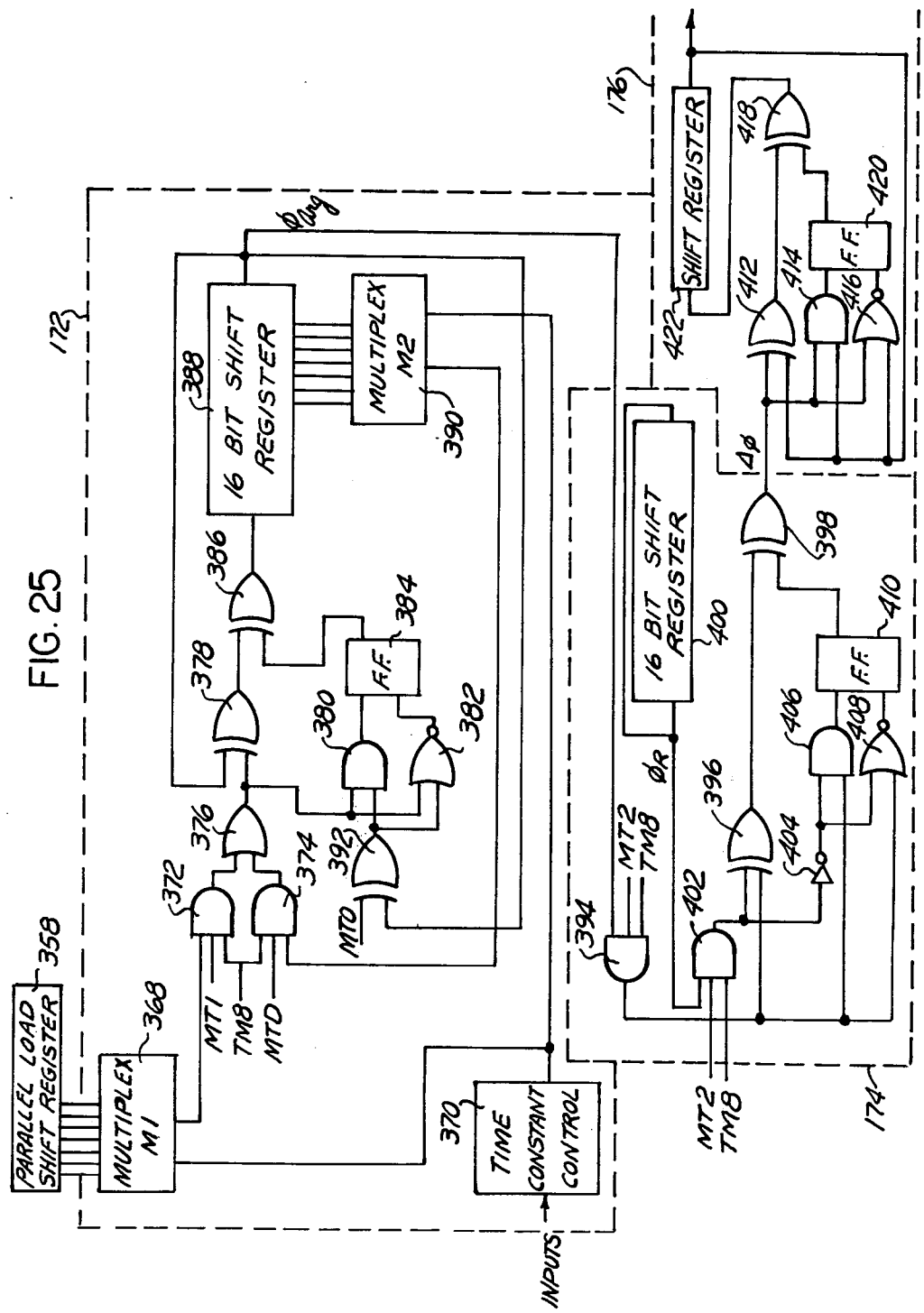

CORRECTION TO FUEL DELIVERY

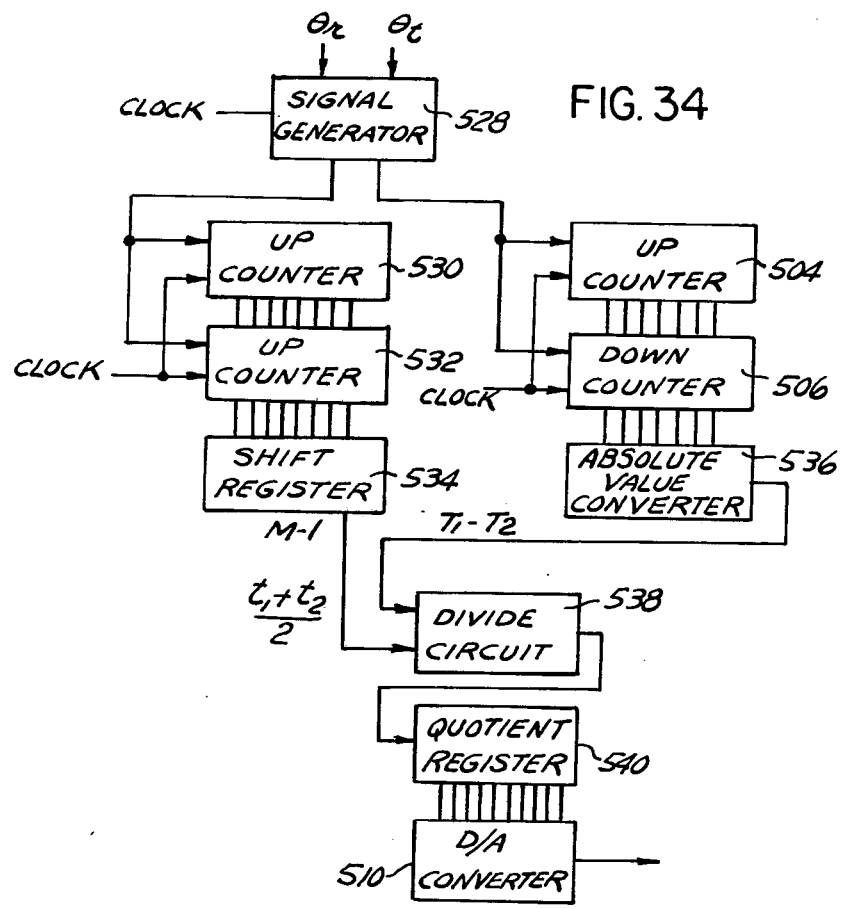
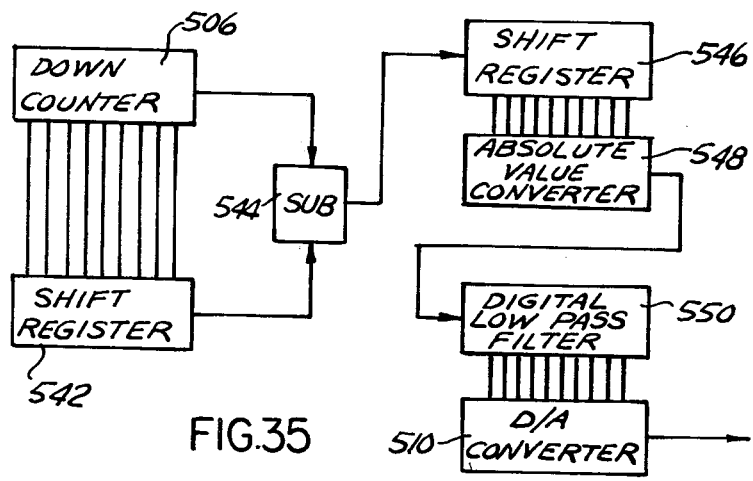

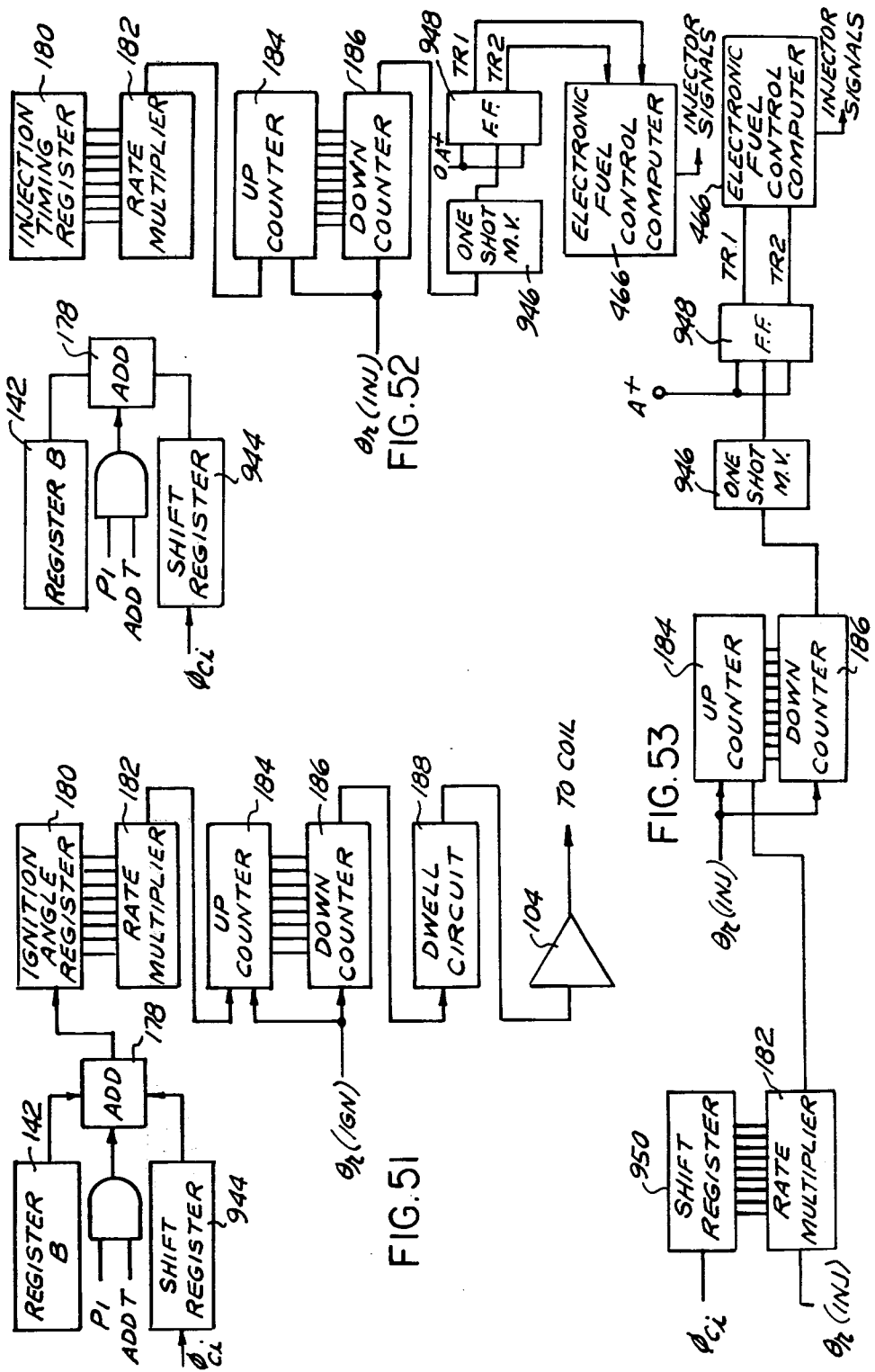

FIG. 54
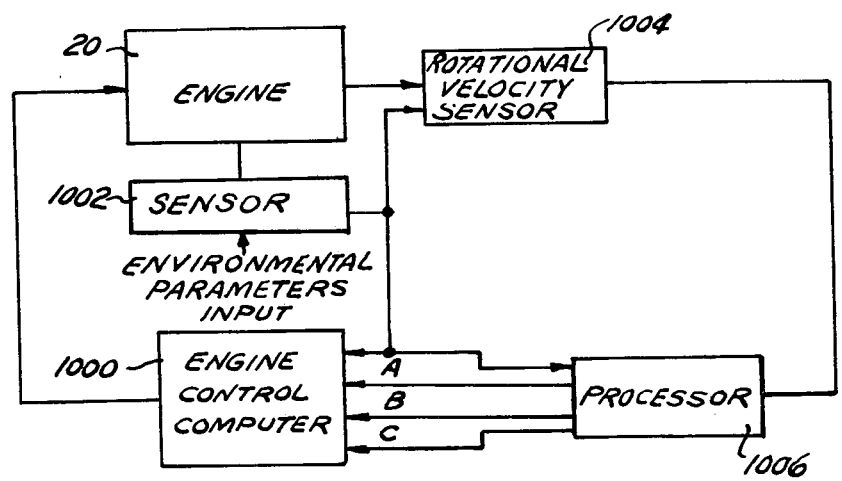
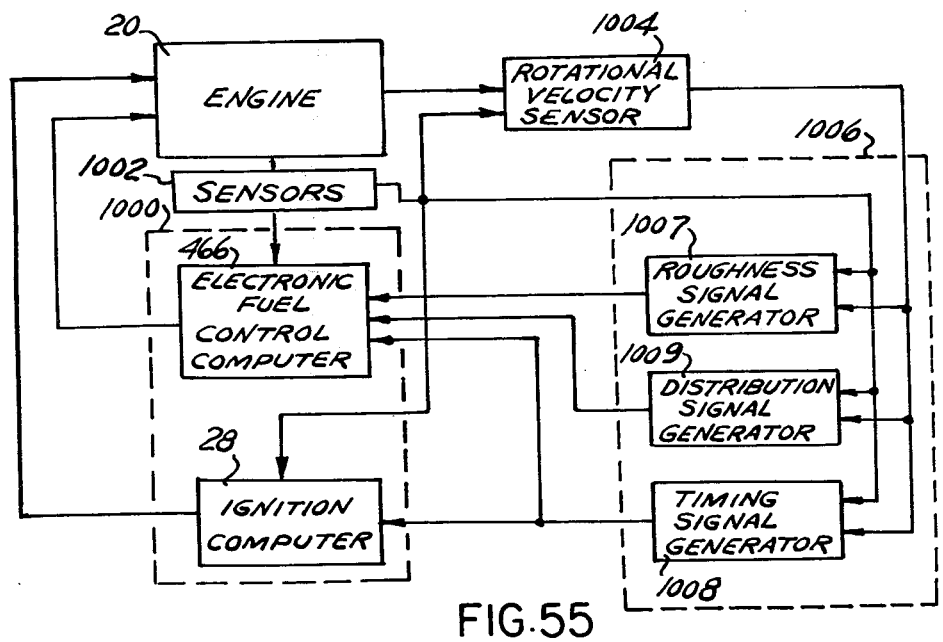
FIG. 55

WARM UP CONTROL FOR CLOSED LOOP ENGINE ROUGHNESS FUEL CONTROL

CROSS REFERENCE

The disclosed invention is related to the commonly-assigned co-pending applications (Docket Nos. REL 75-44, REL 76-54, 360-77-0050, 360-77-0860, 360-78-0280 and 360-78-0640) filed concurrently herewith.

BACKGROUND OF THE INVENTION

The invention is related to warm-up controls for an internal combustion engine, and in particular, a warm-up control responsive to engine load and engine temperature for a closed loop engine roughness control of the type disclosed in my commonly-assigned co-pending application (Docket No. 360-77-0050) filed concurrently herewith.

PRIOR ART

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control samples could be developed. This would reduce the number of variables needed to be detected, reduce the complexity of the control systems, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR503 entitled "Closed Loop Control of Internal Combustion Engine Efficiency and Exhaust Emission". The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al in U.S. Pat. No. 3,897,766 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned et al in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In his patent, Wahl teaches sensing the temperature of a catalytic converter, the exhaust gas composition (especially NO compounds), or in the alternative using a vibration sensor to detect a rough running engine. The use of engine roughness as the measured parameter is similar to the system taught by Harned in U.S. Pat. No. 4,002,155 discussed above. In still another type of close loop system, Schweitzer et al in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close thee loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjunction with the spark plugs are known but still suffer from the first listed deficiencies. The direct measurement of engine torque as taught by Pratt, Jr. et al is an alternate approach but requires a relatively complex and expensive torque measuring sensor. The measurement of the onset of engine knock or roughness as taught by Harned et al and Wahl respectively are believed to be too inaccurate to meet today's standards while the system taught by Schweitzer is believed to be ineffective because factors other than ignition timing such as a change in load could affect the engine speed and result in inproper ignition timing.

Various types of closed loop fuel control systems for internal combustion engines have been developed in which the loop is closed about different engine parameters. The one of the parameters about which the loop is closed is the composition of the exhaust gas as taught by Seitz in U.S. Pat. no. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin et al in U.S. Pat. No. 3,789,816 "Lean Limit Internal Combustion Engine Roughness Control System" issued Feb. 5, 1974 in which engine roughness is detected as the parameter about which the loop is closed. In this system, the airfuel mixture is leaned out until a predetermined level of engine roughness is achieved. The magnitude of engine roughness is selected to correspond with a level of engine roughness at which the air fuel mixture is made as lean as possible to the point that the formation of such exhaust gas as HC and CO is minimized without the drivability of the particular vehicle being unacceptable. Engine roughness as measured in the Taplin et al patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner et al in U.S. Pat. No. 4,015,572 teaches a similar type of fuel control system in which the loop is closed about engine power. In their preferred embodiment, Leshner et al use exhaust back pressure as a manifestation of engine power, however, state that a measured torque, cylinder pressure, or a time integral of overall combustion pressure for one or more engine revolutions at a given RPM may be used in the alternative. In a more recent advertising brochure "Breaking the Lean Limit Barrier", Fuel Injection Development Corporation of Bellmawr, New Jersey, the assignee of the Leshner et al patent, states that the parameter measured is the velocity of the engine's flywheel.

In another type of fuel control system using engine roughness as the sensed parameter to close the loop, Bianchi et al in U.S. Pat. No. 4,044,236 teaches measuring the rotational periods of the crankshaft between two sequential revolutions of the engine. The differential is digitally measured in an up down counter counting at a frequency proportional to the engine speed.

In an alternate type of roughness closed loop fuel control system, Frobenius et al in U.S. Pat. No. 4,044,234 "Process and Apparatus for Controlling Engine Operation Near the Lean-Running Limit" issued August, 1977, teaches measuring the rotational periods of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus for Determining Smooth Running Operation in an Internal Combustion Engine" issued August, 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine.

The prior art teaches independent closed loop control systems, in which each control, i.e., ignition timing, fuel control, and fuel distribution are treated as separate entities. The Applicants herein teach an integrated engine control system in which the control loops for each controlled parameter is closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

SUMMARY OF THE INVENTION

The invention is a warm-up control for a closed loop engine roughness fuel control of the type disclosed in my commonly-assigned co-pending application (Docket No. 360-77-0050) filed concurrently herewith. The warm-up control comprises a temperature sensor and a load sensor generating signals indicative of the engine's temperature and engine's load. A first circuit responsive to the engine's temperature generates a first warm-up signal having a value inversely proportional to the difference between the engine's temperature and a reference temperature, a second circuit responsive to the engine's temperature generates a second warm-up signal proportional to the difference between the engine's temperature and a reference temperature. A switch circuit applies said first signal to the closed loop engine roughness control where it is summed with the roughness signal in response to the load sensor generating a signal indicative of a load on the engine, and said second warm-up signal to the closed loop engine roughness control where it is summed with the roughness signal in response to the load sensor generating a signal indicative of the absence of an engine load. A load enrichment circuit further generates for a predetermined time a transient signal in response to the application of a load to the engine. The closed loop engine roughness control generates a fixed bias signal in response to the transient signal causing the fuel control computer to generate signals momentarily enriching the fuel delivery to the engine to prevent stumbling or stalling with the application of the load.

The object of the invention is a warm-up control for a closed loop engine roughness control in which the warm-up enrichment is a function of engine temperature and engine load. Another object of the invention is a warm-up enrichment control in which the enrichment is increased when a load is applied to the engine and decreased in the absence of a load. Still another object of the invention is a warm-up control which momentarily causes the closed loop engine roughness control to supply a rich air/fuel mixture to the engine when a load is first applied. A final object of the invention is a warm-up control which generates a signal causing the roughness control to momentarily supply a rich air/fuel mixture to the engine when the engine is commanded to accelerate from its idle operational mode.

These and other objects of the invention will become apparent from the reading of the Specification in conjunction with the drawings.

BRIEF DESCRIPTION OF THE DRAWINGS

FIG. 8 is a block diagram of the disclosed Closed Loop Timing Control.

FIG. 9 is a block diagram of an analog embodiment of the Closed Loop Timing Control of FIG. 8.

FIG. 14A shows an actual period waveform generated in accordance with the circuit of FIG. 8.

FIG. 14 D and E illustrate the actual function sin 2$\pi$ i/N and cos 2$\pi$ i/N respectively.

FIG. 25 is a circuit diagram of the Phase Angle Averaging Circuit, Comparator and Accumulator shown on FIG. 15.

FIG. 34 is a circuit diagram of an alternate embodiment of the Roughness Sensor.

FIG. 35 is a circuit diagram of an addition to the Roughness Sensors shown in FIGS. 32 and 34 for generating a second difference roughness signal.

FIG. 51 is a circuit diagram showing the application of the timing correction signal to an Ignition Timing Control.

FIG. 52 is a circuit diagram showing the application of the timing correction signal to an Injection Timing Control.

FIG. 53 is a circuit diagram showing the application of the timing correction signal to a simplified Injection Timing Control.

FIG. 54 is a block diagram of an Integrated Closed Loop Engine Control having multiple Control loops each closed about the instantaneous rotational velocity of the engine's crankshaft.

FIG. 55 is a block diagram of an Integrated Closed Loop Engine Control for a spark ignited engine.

DETAILED DESCRIPTION OFF THE EMBODIMENT THEORY OF OPERATION

Figure 1:
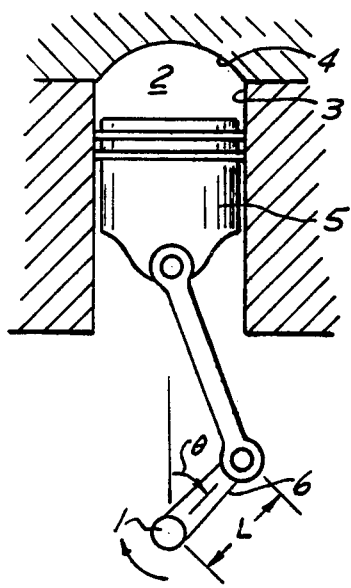
FIG. 1 is an illustration showing the mechanical relationship between the piston and crankshaft in a typical engine.

Prior to discussing the closed loop engine control system using digital period analysis (DPA) of the instantaneous rotational velocity of the engine's crankshaft, a brief discussion of the applicable theory is presented. As the fuel/air mixture in each of the engine's combustion chambers is ignited and burned, a rotational force is imparted to the engine's crankshaft which causes it to rotate. Referring to FIG. 1, the rotational force transmitted to the crankshaft 1 is a function of the pressure P generated in the combustion chamber 2 enclosed by the wall 3 and head 4 of the cylinder and the piston 5, the area of the piston 5, the length "L" of the lever arm 6 attached to the crankshaft and the angle $\theta$ between the arm and the reciprocating motion of the piston.

Figure 2:
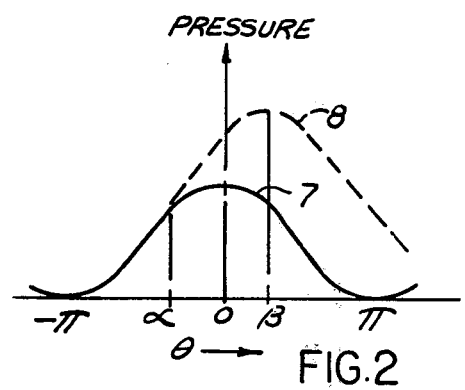
FIG. 2 is a waveform showing the pressure profile in an engine's cylinder as a function of the crankshaft's rotational position.

Considering first only a single cycle of operation, the profile of pressure in the chamber 2 as piston moves up and down due to the rotation of the crankshaft is shown as curve 7 on FIG. 2. As the crankshaft rotates in the direction indicated by the arrow from the position $\theta = -\pi$ to $\phi = 0$, the piston moves from its lowermost position to its uppermost position and the pressure in the cylinder increases as shown. The uppermost position of the cylinder is conventionally referred to as the top dead center (TDC) position of the piston. In the rotational interval of the crankshaft from $\theta = 0$ to $\theta = \pi$, the piston returns to its lower most position and the pressure decreases to its original value. In the absence of exhaust and intake valves normally associated with 4 cycle internal combustion engines, this pressure profile would repeat with each revolution of the crankshaft. However, the intake and exhaust valve open and close on every other revolution of the crankshaft so that the illustrated pressure cycle occurs only once for every two revolutions.

When the chamber 2 is filled with a combustible air-fuel mix which is ignited at an angle $\alpha$, the pressure P will increase as shown on curve 8 of FIG. 2 and the maximum pressure in the chamber 2 will occur at an angle $\beta$. Although the angle at which the air/fuel mixture is ignited is shown to be in the rotational interval between $-\pi$ and 0 those skilled in the art will recognize that the ignition may be controlled to occur in the interval between 0 and $\pi$ after the piston has passed the top dead center position.

The angle $\beta$ at which maximum pressure occurs, is a function of various factors such as: the angle $\alpha$ at which ignition occurs, the rotational velocity of the crankshaft, and the rate at which the air-fuel mixture burns. Ideally, the angle at which maximum pressure occurs should be controlled so that a maximum torque is imparted to the crankshaft.

The instantaneous torque imparted to the crankshaft is a function of the force generated by the piston due to the pressure in chamber 2, the length "L" of the lever arm 6 and the angle $\theta$. The torque $T_\theta$ produced at the angle $\theta$ is $$T_\theta = AP_\theta L \sin \theta$$

where A is the area of the piston and $P_\theta$ is the pressure in chamber 2 at the angle $\theta$. The total torque T produced is $$T = AL \int_0^\pi P_\theta \sin \theta \, d\theta$$

Figure 3:
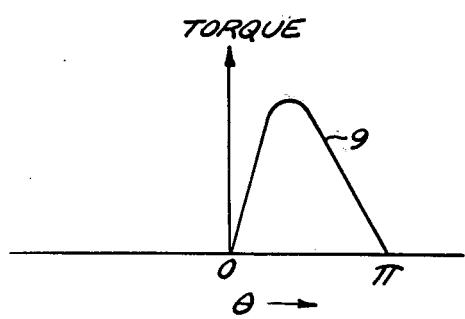
FIG. 3 is a waveform showing a torque impulse imparted to the engine's crankshaft.

The instantaneous value of the torque "$T_\theta$" imparted to the crankshaft due to the pressure in a single cylinder as a function of $\theta$ is shown as curve 9 on FIG. 3.

Figure 4:
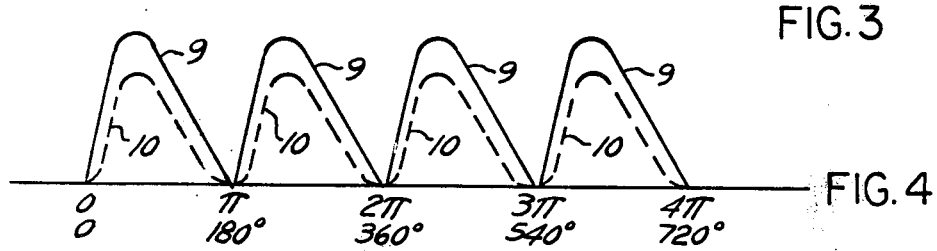
FIGS. 4, 5, and 6 are waveforms illustrating the torque impulses to an engine's crankshaft for an operational cycle of a 4, 6 and 8 cylinder engine respectively.

In multi-cylinder engines, the burning of the air fuel mixture in each cylinder will impart a comparable torque to the crankshaft in a predetermined timed sequence. Considering a four cylinder four cycle internal combustion engine, each cylinder generates a torque producing cycle once for every two revolutions (4 $\pi$ radians) of the crankshaft as is known, therefore the torque imparted to the crankshaft by the individual cyliders occurs at sequential $\pi$ radian angular intervals, as shown on FIG. 4. The torque curves 9 on FIG. 4 show the torque imparted to crankshaft ignoring the effect of the forces produced by the other pistons attached to the crankshaft. However, as is evident from FIG. 2, a portion of the torque produced by the increased pressure in one cylinder is utilized to compress the air-fuel mixture in the next cylinder to be fired or ignited. A smaller portion of the produced torque is also expended in the intake and exhaust operations of the other cylinders. As a result, the effective torque applied to the crankshaft by the burning of the air-fuel mixture in each cylinder is less than that shown by curves 9 and is more realistically shown by curve 10.

Figure 5:
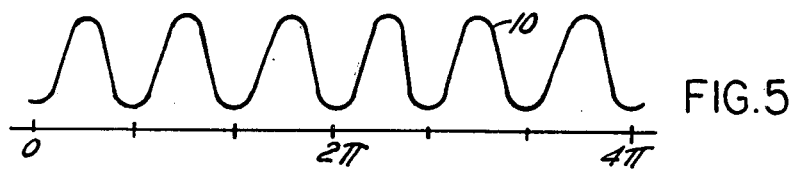
Figure 6:
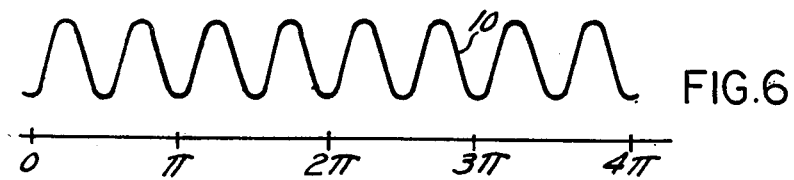

Considering 6 and 8 cylinder engines, the resultant torque impulses applied to the crankshaft will be as shown on FIGS. 5 and 6 respectively.

Figure 7:
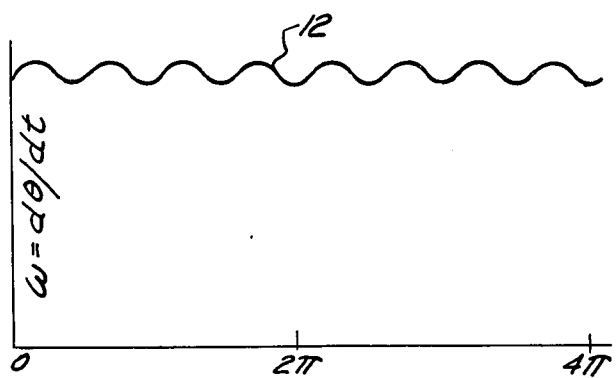
FIG. 7 is a waveform showing the instantaneous rotation velocity (w) of an eight cylinder engine's crankshaft.

The engine is normally connected to a utilization device, such as the drive wheels of an automotive vehicle which places a load on the crankshaft. The rotational velocity or speed of the crankshaft is obviously a function of both the load and the torque generated by the burning of the fuel air mixtures in the individual cylinders. Because the torque impulses, as shown on FIGS. 4-6, are periodically applied to the crankshaft, the rotational velocity of the crankshaft periodically changes in union with the torque impules. The rotational velocity of the crankshaft of an engine running at a constant speed in terms of revolutions per period of time incrementally changes within teach revolution as shown on FIG. 7. The incremental changes, $\Delta w$ in the rotational velocity of the crankshaft though small compared to the average rotational velocity are detectable. The magnitude and the time at which these incremental changes in the rotational velocity of the engine's crankshaft are a function of various engine operating parameters, and by proper analysis can be used to generate feedback signals for one or more of the engine control parameters optimizing the engine's performance.

IGNITION AND INJECTION TIMING CONTROL

The function of the timing control is to ignite the air-fuel mixture in each of the engine's cylinders (combustion chambers) or alternatively inject fuel into each cylinder at such a time that the energy produced by the burning of the air fuel mixture can be most efficiently transferred to the crankshaft. Because the propagation of the flame front through the entire volume of the combustion chamber takes a finite time, the air-fuel mixture is ignited or injected at a point in time prior to the time the piston is in a position at which the power generated by the burning of the fuel is most efficiently transferred to the crankshaft. This is conventionally referred to as ignition or injection advance, and the angle which the ignition or injection is advanced is a complex function of engine speed, engine load, temperature, humidity, how well the air and fuel are mixed (turbulence) the vaporization state of the fuel, as well as other factors including the composition of the fuel itself. In order to simplify the description of the invention, the following discussion will be directed to ignition timing. However, those familiar in the art will recognize that the disclosed closed loop timing control system is equally applicable to injection timing as applied to spark ignited and diesel engines with minor modification well within the purview of those skilled in the art.

Studies carried out at Stanford University for the Department of Transportation experimentally determined that the mean best torque (MBT) was obtained when the peak pressure in the cylinders occurred at approximately 15 degrees after the piston passed through its top dead center position. This result was independent of humidity and barometric pressure as well as other factors. Further investigations have shown that there was a direct correlation between the profile of the pressure in the combustion chamber and the profile of the incremental changes in the rotational velocity of the crankshaft.

In particular, these studies have shown that the angle at which the maximum angular velocity of the crankshaft occurs is directly related to the angle at which the peak pressure occurs.

A block diagram of a closed loop ignition timing system based on this principle is shown on FIG. 8. Referring to FIG. 8, there is shown a typical Internal Combustion Engine 20, the operation of which is subject to a variety of parameters such as a manual input indicative of the engine's desired operating speed, and various environmental parameters, such as ambient temperature and pressure and humidity, etc. The manual input may be from a hand operated throttle or a foot actuated accelerator pedal as is common on an automotive vehicle. Air and fuel in the desired ratio are provided to the engine by an airfuel ratio controller 22 in response to the manual input, environmental parameters, as well as other engine operating parameters, such as engine speed, engine temperature and the pressure in the engine's air intake manifold (MAP). Signals indicative of the manual input, environmental parameters and engine operating conditions are communicated from the engine to the Air-Fuel Ratio Controller 22 via a communication link illustrated by arrow 24. The air and fuel are supplied to the engine through a manifold symbolically illustrated by arrow 26.

The Air-Fuel Controller 22 may be a typical mechanically actuated carburetor, an electronic fuel control system, or any other type known in the art. The details of air-fuel ratio controllers are well known in the art and need not be further discussed at this time for an understanding of the closed loop ignition timing system.

The closed loop ignition timing circuit has an Ignition Timing and Distribution Controller 28, which performs two basic functions. The first function is the generation of an ignition signal computed in response to various engine and environmental parameters such that a maximum torque will be delivered to the engine's crankshaft as a result of the burning of the air-fuel mixture. The second function is the distribution of the ignition signals to sequentially energize the appropriate spark plugs in a predetermined sequence.

Various types of electronic ignition timing circuits are known in the art which are capable of performing this function. Because of the impracticality of electronically controlling ignition timing backwards from a future point in time, the ignition signals generated by the existing circuits are computed as a delay time from a reference signal generated in advance of the desired ignition time. This reference signal is usually generated at a predetermined rotational position of the crankshaft angularly advanced from a fixed position, such as the top dead center position of each piston.

The signals indicative of the information or data required to compute the desired ignition signals including the reference signal are communicated from the engine to the ignition timing and distribution controller via a communication link indicated by arrow 30. The delay from the reference signal $\theta_r$ is computed and the ignition signal generated at the end of the computed delay. The ignition signals are then transmitted via link 32 to the appropriate engine spark plugs. The distribution function may be performed by a conventional mechanical distributor or by appropriate electronic switching circuit as are known in the art.

A signal indicative of the crankshaft instantaneous velocity (w) and a signal indicative of the crankshaft's position "$\theta$" are communicated to a Position of Maximum Angular Velocity Circuit 34 which generates a signal $\theta_m$ indicative of the crankshaft angle at which the instantaneous velocity of the engine's crankshaft has a maximum value. The signal $\theta_m$ is communicated to a Comparator 36. Comparator 36 also receives a reference signal ($\theta_R$), indicative of the crankshaft angle at which maximum rotational velocity should have occurred. The Comparator 36 generates an error or correction signal communicated to the Ignition Timing and Distribution Controller 28.

The operation of the closed loop ignition timing circuit is as follows: The Ignition Timing and Distribution Controller 28 generates ignition signals which sequentially energizes the engine's spark plugs to ignite the air-fuel mixture in the engine's combustion chambers in accordance with the sensed operating parameters of the Engine 20. As the fuel is burned in each combustion chamber, a series of torque impulses are imparted to the engine's crankshaft causing the rotational velocity of the crankshaft to fluctuate as shown on FIG. 7. The signals $\theta$ and w indicative of the instantaneous rotational position and velocity of the crankshaft respectively are communicated to the Position of Maximum Angular Velocity Circuit 34 which generates the signal $\theta_m$ indicative of the crankshaft angle at which maximum crankshaft velocity occurred for each torque impulse.

Comparator 36 compares the signal $\theta_m$ with the fixed reference signal $\theta_R$ indicative of the crankshaft angle at which the maximum rotational velocity should have occurred and generates the error or correction signal $\epsilon$. The Ignition Timing and Distribution Controller 28 advances or retards the ignition signal in response to the correction signal $\epsilon$ so that the difference between subsequent $\theta_m$ and $\theta_R$ is minimized. In this way, the loop is closed through the engine so that maximum torque is delivered to the crankshaft as a result of the burning of the air-fuel mixture in each cylinder.

An analog embodiment of the closed loop ignition timing circuit is shown in FIG. 9. In FIG. 9, the Air-Fuel Ratio Controller 22 is assumed but not shown to simplify the drawing.

Referring to FIG. 9, there is shown a Crankshaft Velocity Sensor 38 which generates a signal w indicative of the instantaneous velocity of the engine's crankshaft. The signal w is differentiated by a Differentiation (dw/dt) Circuit 40 and generates a signal $\dot{w}$ which is indicative of the first derivative of with respect to time. The signal $\dot{w}$ is applied to a Zero Crossing Detector 42 which generates a signal each time $\dot{w}$ passes through zero when going from a positive to a negative value. This signal is applied to the sample input of a Sample and Hold Circuit 44.

Figure 10:
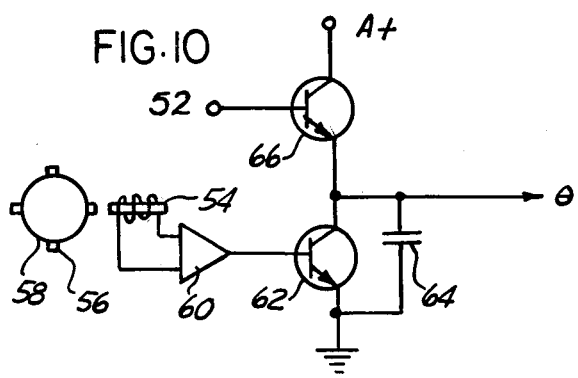
FIG. 10 is a circuit diagram of an analog $\theta_r$ generator shown on FIG. 9.

A $\theta$ Reference Generator 46 generates a signal $\theta_r$ each time the engine's crankshaft passes a predetermined rotational position in advance of the angle at which maximum rotational velocity of the crankshaft is desired. The signal $\theta_r$ may be generated at crankshaft angles indicative of when each piston assumes its top dead center position or any other desired angle. The signal $\theta_r$ and the instantaneous velocity signal w are input into a $\theta$ Signal Generator 48 which generates an analog signal $\theta$ indicative of the angular position of the crankshaft with respect to $\theta_r$. The circuit shown on FIG. 10 is an embodiment of the $\theta$ Generator 48. The signal $\theta$ is also input to the Sample and Hold Circuit 44, which outputs a signal $\theta_m$ indicative of the value of $\theta$ at the time a signal is received from the negative going Zero Crossing Detector 42. The output signal $\theta_m$ is compared in Comparator 36, with a reference signal $\theta_R$ indicative of desired value of $\theta_m$. Comparator 36 generates an error or correction signal $\epsilon$ communicated to the ignition timing and distribution circuit 28 which utilizes the correction signal to alter the time at which the ignition signal is generated to reduce the signal $\epsilon$ to zero.

Referring now to FIG. 10, there is shown the circuit details of the $\theta$ Generator 48. The circuit receives electrical power from a regulated source at the terminal designated A+ and the signal w at the terminal 52. The $\theta_r$ signal is generated by a magnetic pick-up 54 which detects the passing of each tooth 56 on a toothed wheel 58 attached to the engine's crankshaft. An amplifier 60 receives the signals generated by the magnetic pick-up 54 and generates a short positive pulse each time a tooth 56 passes the magnetic pick-up 54. The output of amplifier 60 is connected to the base of a transistor 62 having its collector connected to one electrode of a capacitance 64 and its emitter connected to the other electrode of the capacitance 64 and to a common ground. The terminal 52 is connected to the base of a transistor 66 having its collector connected to the terminal designated A+ and its emitter connected to the collector of transistor 62 and the one electrode of capacitance 64.

The operation of the circuit is as follows: When a tooth 56 passes the magnetic pick-up 54 amplifier 60 generates a short positive pulse which renders transistor 62 fully conductive discharging capacitance 64. The signal received at the base of transistor 66 controls its conductivity. The current flowing through transistor 66 charges capacitance 64 at a rate proportional to the value of the signal w so that value of the charge on capacitance 64 is indicative of the rotational position $\theta$ of the crankshaft from the reference point determined by the location of the tooth 56. Each time a tooth passes the magnetic pick-up 54, capacitance 64 is discharged and thereafter an analog signal indicative of the angle $\theta$ is generated with reference to the location of the tooth. Since the rate at which capacitance 64 is charged is proportional to the rotational speed of the crankshaft, the instantaneous value of the signal $\theta$ is a function of the angle through which the crankshaft has rotated from the preceding reference signal $\theta_r$.

Figure 11:
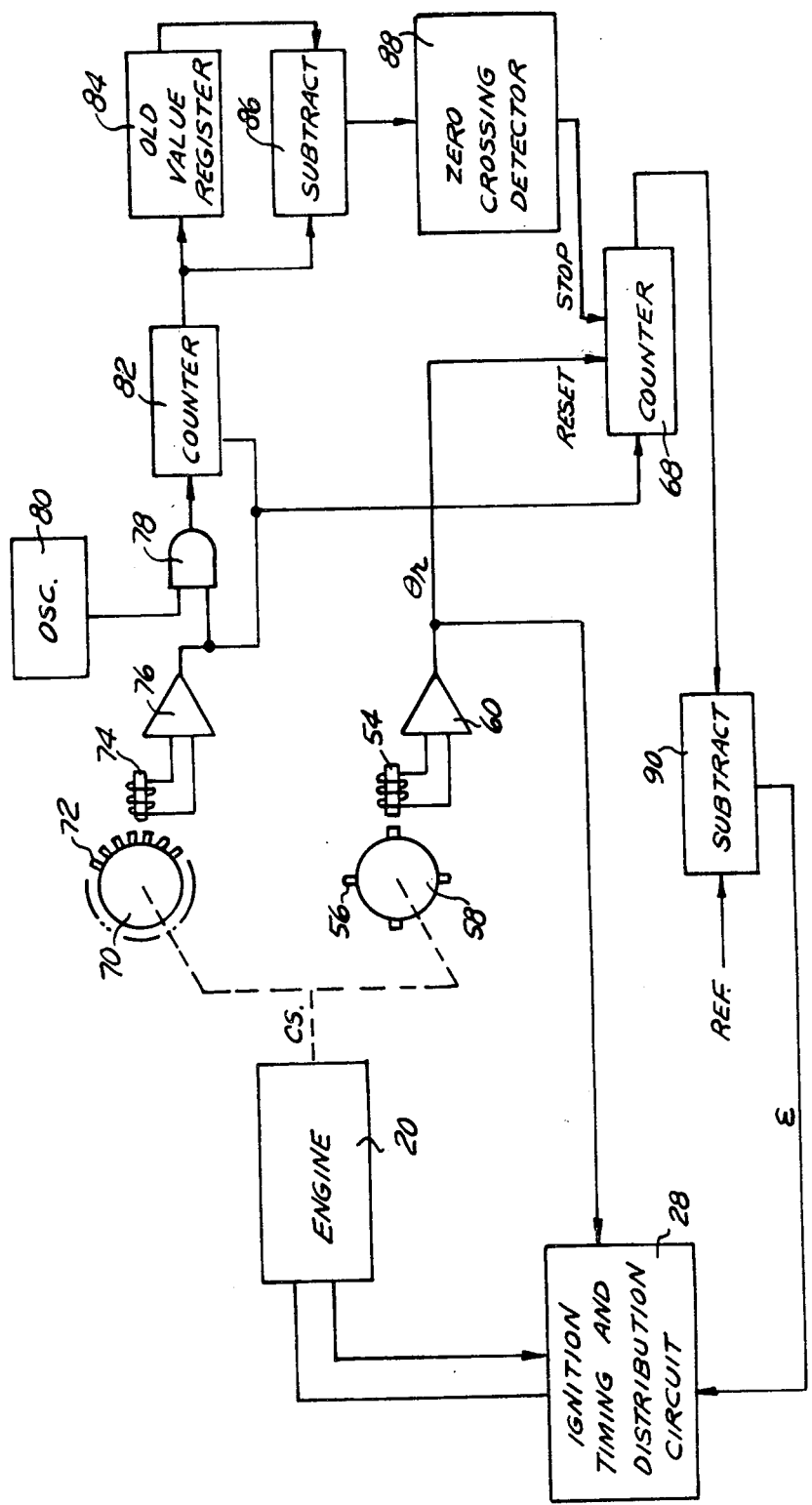
FIG. 11 is a block diagram of a digital embodiment of a Closed Loop Ignition Control.

A digital embodiment of the closed loop ignition timing circuit is shown on FIG. 11. A magnetic pickup 54 detects the passing of teeth 56 on a wheel 58 and energizes an amplifier 60 to generate a short pulse (signal $\theta_r$) each time a tooth passes the magnetic pick-up 54 as discussed relative to FIG. 10. The signal $\theta_r$ is communicated to the reset input of a Counter 68 and to the Ignition Timing and Distribution Circuit 28. A second toothed wheel 70 having a plurality of teeth 72 disposed about its periphery at small angular increments is also attached to the crankshaft and rotates therewith. For example, wheel 70 may be the ring gear attached to the engine's flywheel. A magnetic pickup 74 detects the passing of each tooth 72. Amplifier 76 receives the signals generated by the magnetic pick-up and generates a pulse signal having a duration equal to the interval between the successive teeth. The output of amplifier 76 is connected to the input of an AND gate 78 and to the count input of counter 68. The other input of AND gate 78 receives pulses generated by an Oscillator 80. The pulses generated by oscillator 80 have a significantly higher repetition rate than the rate at which the teeth 72 pass the magnetic pick-up 74. The number of pulses generated by Oscillator 80 and transmitted by AND gate 78 are stored in Counter 82. The number of pulses in Counter 82 are indicative of the time interval or period between the successive teeth on wheel 70. A period profile showing the number of pulses counted in the intervals between successive teeth on wheel 70 for a complete torque impulse cycle is illustrated on FIG. 12-A. Since the period (Y) is the reciprocal of the angular velocity w, i.e. Y=1/w, the angular velocity is maximum when the period profile has its minimum value and vice versa.

The counts stored in Counter 82 between successive teeth are transferred to an Old Value Register 84 and communicated to a Subtraction Circuit 86. The Subtraction Circuit 86 also receives the number of counts stored in the Old Value Register 84 from the preceding interval between two successive teeth on wheel 70 and outputs a number indicative of the difference between the value stored in the Old Value Register and the new value. This number is communicated to a digital Zero Crossing Detector 88 which outputs a signal when the difference between the new number and the old number goes from a negative to a positive value. The output of the Zero Crossing Detector 89 is communicated to the stop input of Counter 68. The Counter 68 is incremented each time a tooth passes the magnetic pickup 74 and outputs a number indicative of the number of teeth that have passed the magnetic pick-up 74 in the interval between receiving the signal $\theta_r$ from amplifier 60 and stop signal generated by the Zero Crossing Detector 88. The output of Counter 68 is a number indicative of the angle of the crankshaft when the time interval or period between successive teeth is a minimum. Since the period (time interval) is the reciprocal of the crankshaft speed, the stop signal is generated by the Zero Crossing Detector 88 when the angular velocity, of the crankshaft, passes through its maximum value.

The number of counts in Counter 68 are transmitted to a second Subtract Circuit 90 where they are subtracted from a reference number of counts indicative of the number of teeth that should have been counted for maximum torque to be imparted to the crankshaft. The difference E is then communicated to the Ignition Timing and Distribution Controller 28 where it is utilized to advance or retard the time at which the ignition signal is generated thereby reducing the difference signal E toward zero.

The operation of the closed loop ignition system shown on FIG. 11 is not practical since it cannot compensate for driver induced variations and requires that the counting interval of counter 82 for each angular interval of rotation of the crankshaft be accurate commensurate with the frequency of oscillator 80. This latter fact places a severe mechanical tolerance requirement on the angular separation of the individual teeth 72 on wheel 70. Actual data taken from a ring gear of a typical automotive engine has a profile comparable to that shown on FIG. 12-B where the angular difference between the individual teeth is reflected in differences in counts which may be greater than the differences in counts resulting from changes in the rotational velocity of the crankshaft. Therefore, a more accurate measure of the small angular increments is required. Optical systems capable of detecting small angular intervals of rotation with the required uniformity are known in the art and could readily be used in place of the toothed wheel 70 such as the flywheels ring gear and magnetic pick-up 74 illustrated in FIG. 11.

Figure 12A:
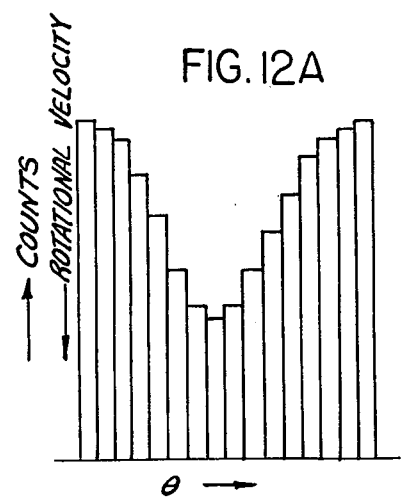
FIG. 12A is a histogram of the period data generated in accordance with the digital embodiment of FIG. 11.
Figure 12B:
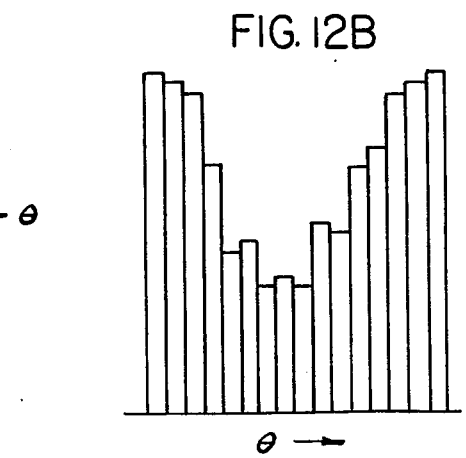
FIG. 12B is a histogram of period data generated in accordance with the digital embodiment of FIG. 11 using the teeth on a flywheel to determine period intervals.
Figure 13:
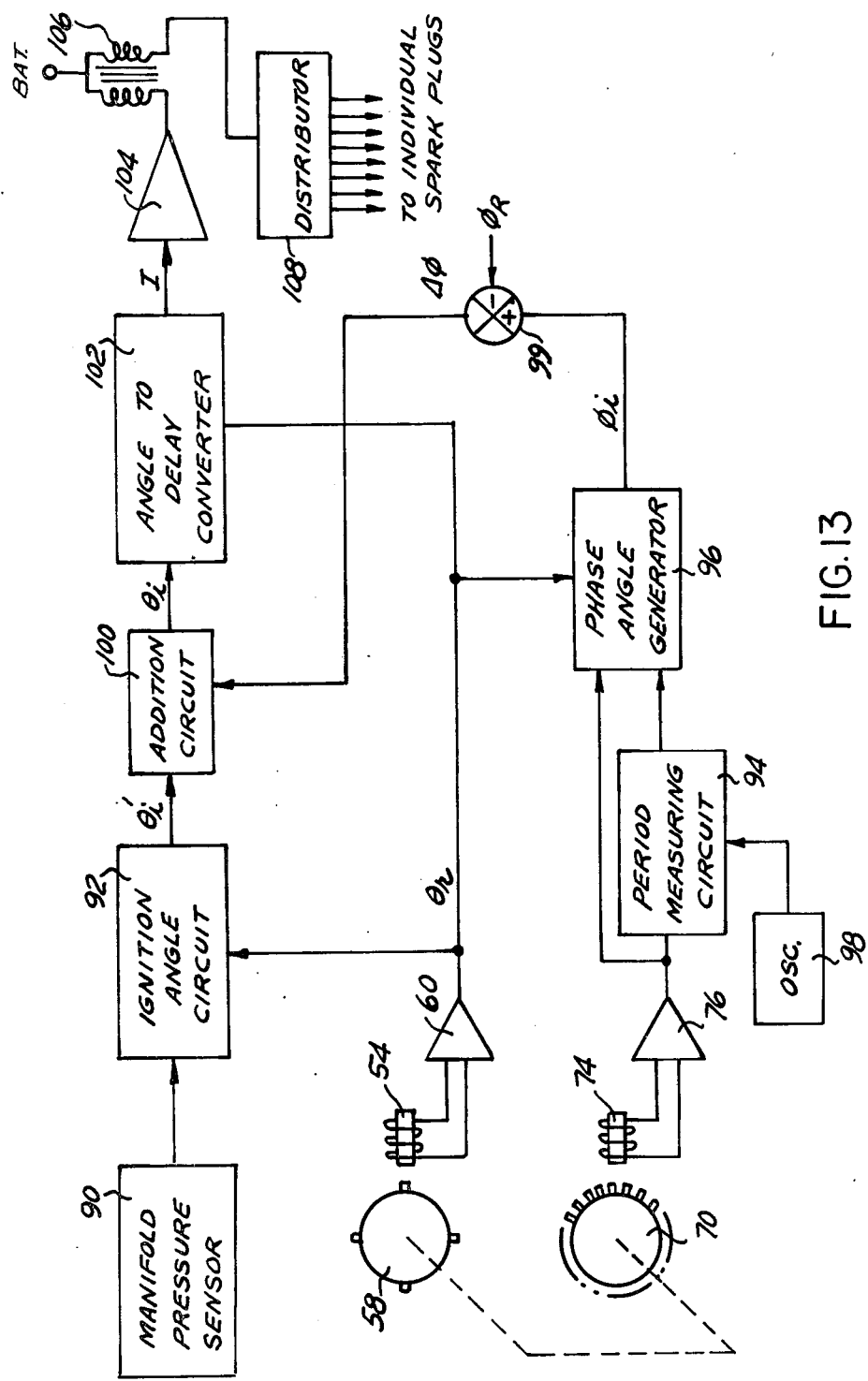
FIG. 13 is a block diagram of the preferred embodiment of the Closed Loop Ignition Control shown on FIG. 8.

A preferred embodiment of the closed loop ignition control system which is more tolerable of small differences in the angular increments between the individual teeth on the flywheel ring gears is shown on FIG. 13. Rather than detecting the position of the crankshaft at the time of maximum angular velocity, the alternate embodiment compares the phase $\phi_i$ of the generated period profile as shown on FIG. 12-A or 12-B with respect to a fixed phase angle $\phi_R$.

The profile of the period waveforms shown on FIG. 12-A or 12-B have a Fourier series representation $$f(\theta) = \sum_{i=0}^{N-1} A_i \cos(iw\theta + \phi_i)$$

where $\phi_i$ is the phase angle of the period waveform and N is the number of discrete samples or incremental period intervals $f(\theta)$.

The value of $\phi_i$ for the frequency corresponding to the cylinder firing rate will vary with the location of the combustion chamber peak pressure and therefore may be used to control spark timing.

A conventional method for computing $\phi_i$ from $f(\theta)$ is the computation $$A \sin \phi = \tfrac{1}{2}\pi \int_0^{2\pi} f(\theta) \sin w\theta \, d\theta$$

$$A \cos \phi = \tfrac{1}{2}\pi \int_0^{2\pi} f(\theta) \cos w\theta \, d\theta$$

and $\phi = \arctan(A \sin \phi / A \cos \phi)$ if $A \sin \phi \leq A \cos \phi$ or $\phi = \pi/2 - \arctan(A \cos \phi / A \sin \phi)$ if $A \cos \phi < A \sin \phi$ where $\theta$ = angular position of the crankshaft
w = angular crankshaft velocity
A = amplitude of the Fourier component
$\phi$ = relative phase angle of Fourier component Since $f(\theta)$ is set of N discrete samples $$A \sin \phi = 1/N \sum_{i=0}^{N-1} f(\theta_i) \sin(2\pi i/N)$$

$$A \sin \phi = 1/N \sum_{i=0}^{N-1} f(\theta_i) \cos(2\pi i/N)$$

This computation consists of multiplying data samples by sin and cos functions and adding the products over an interval equal to one cycle of the period waveform. Multiplying at a rate consistent with engine operating requirements (2 N multiplications for every cylinder firing) is not practical with current technology and system cost considerations.

A simplified computation consists of replacing these sin and cos functions with binary signals indicative of square waves having the same period. The amplitudes are thereby restricted to plus and minus 1. This results in the following:

$$A \sin \phi = 1/N \sum_{i=0}^{N-1} f(\theta_i) \text{ SIGN}(\sin 2\pi i/N)$$

$$A \cos \phi = 1/N \sum_{i=0}^{N-1} f(\theta_i) \text{ SIGN}(\cos 2\pi i/N)$$

Figure 14:
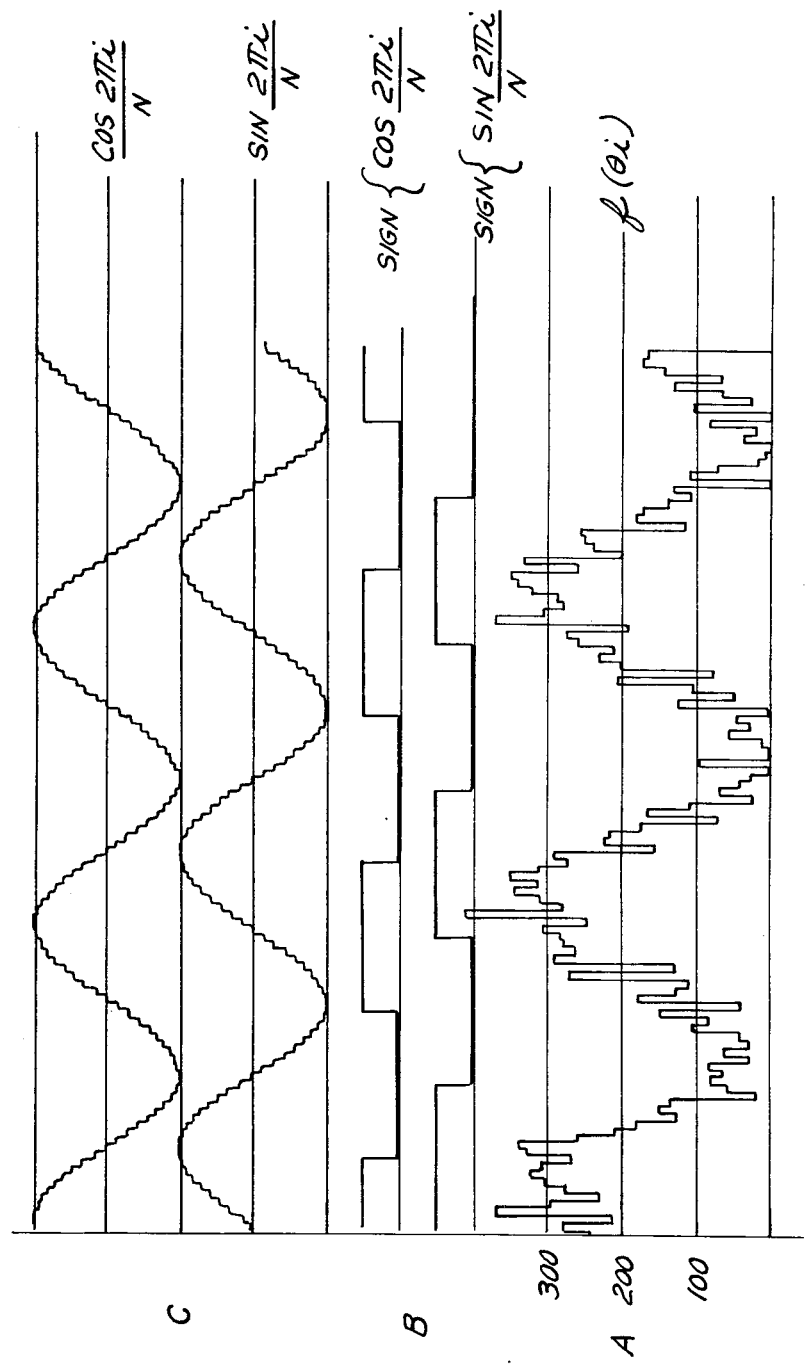
FIGS. 14 B and C illustrate the square wave function SIGN (sin 2 $\pi$ i/N) and SIGN (cos 2 $\pi$i/N) respectively.

The five functions $\cos(2\pi i/N)$, $\sin(2\pi i/N)$, SIGN $\{\cos(2\pi i/N)\}$, SIGN $\{\sin(2\pi i/N)\}$ and $f(\theta_i)$ are shown on FIG. 14.

The simplified computation produces a small error which will depend on the odd harmonics of the fundamental component of the period waveform. The error is reduced by averaging successive ($A \cos \phi$) and ($A \sin \phi$) computations.

The above mechanization requires the summing of 2 N period samples to obtain $\cos \phi$ and $\sin \phi$ terms. Thus, the multiplication and summation process has been reduced to a summation process.

A further simplification results from forming partial sums of the period data $$P_1 = \sum_{i=0}^{(N/4)-1} f(\theta_i) \quad (1)$$

$$P_2 = \sum_{i=N/4}^{(N/2)-1} f(\theta_i) \quad (2)$$

$$P_3 = \sum_{i=N/2}^{3N/4-1} f(\theta_i) \quad (3)$$

$$P_4 = \sum_{i=3N/4}^{N-1} F(\theta_i) \quad (4)$$

then $$A \cos \phi \approx 1/N \, [(P_1-P_3)=(P_2-P_4)] \quad (5)$$

$$A \sin \phi \approx 1/N \, [(P_1-P_3)-(P_2-P_4)] \quad (6)$$

and $\phi = \arctan$
$[(P_1-P_3)+(P_2-P_4)]/[(P_1-P_3)-(P_2-P_4)] \quad (7)$ when $|(P_1-P_3)-(P_2-P_4)| \leq |(P_1-P_3)+(P_2+P_4)|$ $\phi \approx \pi/2 - \arctan$
$[(P_1-P_3)+(P_2-P_4)/(P_1-P_3)-(P_2-P_4) \quad (8)$ when $|(P_1-P_3)+(P_2-P_4)| > |(P_1-P_3)-(P_2-P_4)|$ Referring back to FIG. 13, the pressure in the engine's air intake manifold is sensed by a manifold pressure sensor 90 which generates a signal indicative of the sensed manifold pressure which is communicated to an Ignition Angle Circuit 92. A toothed wheel 58, magnetic pickup 54 and amplifier 60 as previously discussed generate reference signals $\theta_r$ which are communicated to the Ignition Angle Circuit 92 to a Phase Angle Generator Circuit 96 and to the Angle to Delay Converter 102. The Ignition Angle circuit 92 computes the engine speed from the reference signal and generates a signal $\theta'_i$ from the engine speed and manifold pressure signal indicative of the crankshaft angle with respect to $\theta_r$ at which the ignition signal is to be generated.

Multi-tooth wheel 70, such as the ring gear on the flywheel magnetic pickup 74, amplifier 76, as discussed with reference to FIG. 11, generates a signal each time a tooth passes the magnetic pickup 74 which is communicated to a Period Measuring Circuit 94 which may be a counter such as counter 82 on FIG. 11 and the Phase Detector 96. Oscillator 98 supplies clock signals to the Period Measuring Circuit 94 which generates a digital period signal indicative of the number of clock signals received in the interval between the signals received from amplifier 76. The digital period signals are communicated to the Phase Angle Generator 96 which computes a phase angle $\phi_i$ from the period signals in accordance with equations 1–8. The phase angle $\phi_i$ is communicated to a comparator 98 which generates an error or correction signal $\Delta\phi$. The correction signal $\Delta\phi$ is input to an Add Circuit 100 where it is summed with the ignition angle signal $\theta'_i$ to generate a signal $\theta_i$. An Angle to Delay Converter Circuit 102 generates a signal I which is terminated at a time computed from the sum signal $\theta_i$ and the signal $\theta_r$.

The signal "I" amplified by an amplifier 104 and energizes a conventional ignition coil 106 which generate a high voltage ignition signal each time the signal I is terminated. The high voltage signal generated by Coil 106 is applied to the appropriate spark plug by a distributor 108 which may be a conventional engine driven mechanical distribution commonly used with internal combustion engines or maybe one of the more recently developed solid state switching devices.

The operation of the closed loop ignition timing system is as follows: The Ignition Angle Circuit 92 generates a signal $\theta'_i$ indicative of the crankshaft angle at which ignition should occur in response to the engine speed derived from the frequency or time interval between the reference signals $\theta_r$ and the pressure signal the Manifold Pressure Sensor 90.

The Period Measuring circuit 94 generates period signals indicative of the time between successive teeth on wheel 70 as it rotates.

This period signal is a digital number having a value indicative of the number of clock pulses generated in each time interval. The period signal and the $\theta_r$ signal are received by the Phase Angle Generator 96 which generates the phase angle $\phi_i$ in accordance with equation 7 or 8. The Phase Angle Generator is synchronized with the $\theta_r$ signal so that the generated phase angle $\phi_i$ is generated with respect to each torque impulse of the engine. As previously indicated, a $\theta_r$ signal may be generated when each piston reaches its top dead center position or at any other predetermined time.

The Phase Angle Generator 96 then sums the period signals to form the values $P_1$, $P_2$, $P_3$ and $P_4$ as the signals generated by amplifier 76 are received. The values of $P_1$ through $P_4$ are then added and subtracted to form $[(P_1-P_3)+(P_2-P_4)]$ and $[(P_1-P_3)-(P_2-P_4)]$ respectively, which are used to generate a numerical value equal to tan $\phi_i$. The signal $\phi_i$ is subsequently obtained from a look-up table which outputs the signal $\phi_i$ in response to a signal indicative of tan $\phi_i$. The signal $\phi_i$ output by the Phase Angle Generator Circuit may be the value output by the look-up table or may be a filtered value which removes the high frequency variations in each computed value of $\phi_i$.

The value of the signal $\phi_i$ is then compared in Comparator 99 with a reference signal $\phi_R$ indicative of the desired phase angle for the particular engine or type of engine to generate a correction signal $\Delta\phi$ which is indicative of the correction to the computed ignition angle $\phi'_i$. The correction signal $\Delta\phi$ is the sum of the error signals $$\Delta\phi = \sum_{i=0}^{N} (\phi_R - \phi_i)$$

such that as $\phi_i$ approaches $\phi_R$ the error signal $(\phi_R - \phi_i)$ approaches to 0, and the correction signal $\Delta\phi$ has a constant value. The value of the signal $\Delta\phi$ is an angular offset to the computed value $\theta'_i$ which causes the phase angle $\phi_i$ of the measured period profile to be equal to the desired phase angle $\phi_R$.

The correction signal $\Delta\phi$ is added to the computed ignition angle $\phi'_i$ in the Sum Circuit 100 which outputs a sum signal $\theta_i = \theta'_i + \Delta\phi$. The sum signal $\theta_i$ is received by the Angle to Delay Converter Circuit 102 which generates a signal I which is terminated at a time after the receipt of a reference signal determined by the value of the sum signal $\theta_i$. The signal I is amplified by amplifier 104 and the amplified signal energizes coil 106 which generates a high energy ignition signal capable of exciting a spark plug each time the signal I is terminated. This high energy ignition signal is communicated to the Distributor 108 which directs the high energy ignition signal to the appropriate spark plugs in a predetermined sequential order as is well known in the art.

Figure 15:
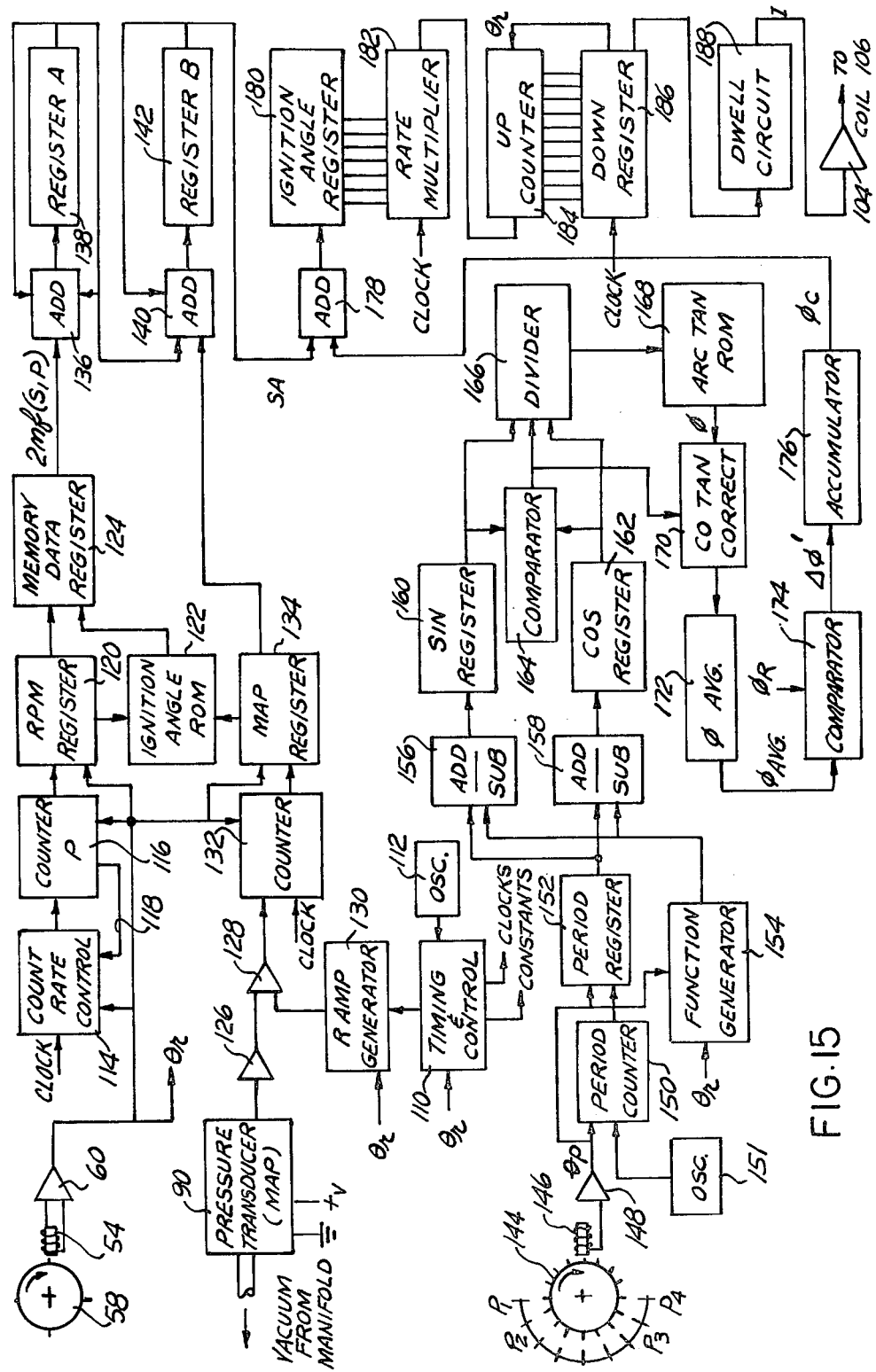
FIG. 15 is a more detailed block diagram of the preferred embodiment of FIG. 13.

A more detailed block diagram of the closed loop ignition timing circuit is shown on FIG. 15.

As previously described, the toothed wheel 58 in combination with the magnetic pick-up 54 and amplifier 60 generate reference pulse signals $\theta_r$ which are applied to the various circuits as shown. A Timing and Control Circuit 110 receives the $\theta_r$ signals and clock pulses from an Oscillator 112 and generates a variety of timing and control signals used throughout the circuit.

A Count Rate Control Circuit 114 receives the $\theta_r$ signals and clock pulses from the Timing and Control Circuit 110 and produces count pulse signals at a first rate. The count pulse signals are counted in Counter 116 between the occurrence of successive reference signals $\theta_r$. The number of counts between successive reference signals is the reciprocal of the crankshaft rotational velocity as previously described. In order to limit the number of counts being stored in Counter 116 and therefore the capacity or size of Counter 116 at low engine speeds, a signal is generated by the counter when it reaches a predetermined number which is communicated back to the Count Rate Control 114 via line 118 which causes a reduction in the rate at which count pulses are generated. If necessary, a second signal is generated when the number of counts stored in Counter 116 reaches a second predetermined number which is also communicated back to the Count Rate Control Circuit to further slow down the rate at which the count pulses are generated. Upon the receipt of the next sequential reference signal $\theta_r$, the counts stored in Counter 116 are transferred to an RPM Register 120, Counter 116 is reset to zero and the Count Rate Control 114 is reset back to its initial state generating pulse counts at the first rate. The number of counts stored in the RPM Register 120 is a digital RPM word indicative of the engine's speed. The RPM word has a predetermined number of most significant bits designated $s_i$ and a predetermined number of least significant bits $\Delta s$. For example, if the number is an eight (8) bit word $s_i$ may comprise the four (4) most significant bits and $\Delta s$ may comprise the four (4) least significant bits as shown on FIG. 16-A. The four most significant bits $s_i$ are communicated to an Ignition Angle (Read Only Memory) ROM 122 and the four least significant bits $\Delta s$ are communicated to a memory data register 124.

A signal indicative of the engine's intake manifold pressure generated by a Pressure Sensor 90 is communicated by means amplifier 126 to the positive input of a Comparator 128. The Comparator 128 receives at its negative input, a staircase ramp signal generated by Ramp Generator 130. The ramp signal turns Comparator 128 off when the value of the ramp signal exceeds the signal generated by amplifier 126 indicative of the value of the pressure in the engine's air intake manifold. The output of the Comparator 128 and clock signals are received by a Counter 132 which counts the clock pulses received during the interval the comparator has a positive output. Upon receipt of the next sequential reference signal $\theta_r$, the number of counts in Counter 132 are transferred to MAP Register 134, the Counter 132 is cleared and Ramp Generator 130 is reset to zero. The number of counts stored in the MAP Register 134 is a digital MAP word indicative of the pressure in the engine's air intake manifold. The MAP word may also be an eight bit word having a predetermined number of most significant bits designated $\Delta p_i$ and a number of least significant bits designated $\Delta p$. In the preferred embodiment, there are three (3) most significant bits and five (5) least significant bits as shown on FIG. 16-B.

The most significant bits $s_i$ and $p_i$ are used to address one of the 128 discrete memory locations in the Ignition Angle ROM 122. In each memory location is stored a digital word $f(s,p)$ indicative of ignition angle based on the values of $s_i$ and $p_i$ respectively. The digital word $f(s,p)$ is transferred to the memory data register 124 for subsequent interpolation with respect to the value of the least significant bits $\Delta s$. The digital word $f(s,p)$ is communicated to interpolation logic consisting of adders 136 and 140, shift Register A, 138 and shift Register B, 142. Multiples (power of two) of the content of the memory data register 124 are added to Register A to interpolate between stored ignition angle values in the RPM domain in accordance with $\Delta s$. A conventional double linear interpolation process is used. A memory address control logic associated with the RPM register 120 modifies the memory address to obtain stored data points needed for the interpolation computation. A similar process is used to interpolate between stored ignition angle values in the pressure domain in accordance with $\Delta p$.

Figure 17:
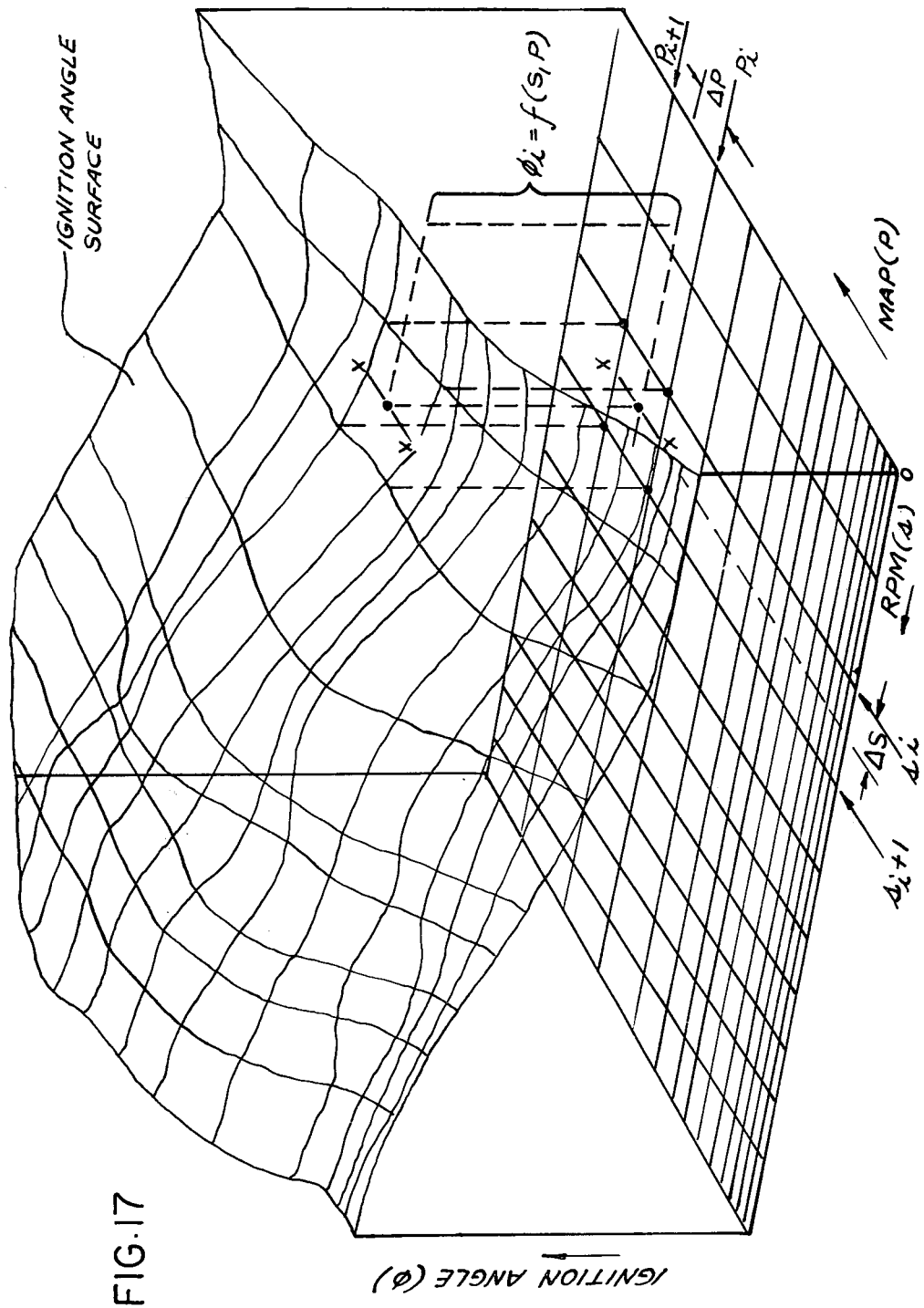
FIG. 17 is a typical RPM-manifold pressure surface representing scheduled ignition angles.

The ignition angle is computed by linear interpolation of the RPM-manifold pressure surface which represents scheduled ignition angles such as that shown on FIG. 17. The interpolation is performed in accordance with the equation:

$$\theta'_i = (32 - \Delta p)[(16 - \Delta s)f(s_i, p_i) + \Delta s f(s_{i+1}, p_i)] + \Delta p[(16 - \Delta s)f(s_i, p_{i+1}) + \Delta s f(s_{i+1}, p_{i+1})]$$

The logic first solves the equation $(16 - \Delta s) f(s_i, p_i)$ in the following steps: The content of the memory data register (MDR) 124 is placed in Register A 138. The content of Register A is then recirculated and the content of the memory data register times the complement $(\overline{\Delta s_o})$ of the first bit $s_o$ of the least significant bits $\Delta s$ of the RPM word stored in RPM register 120 is added to the content of Register A and stored in Register A. The content of Register A is again recirculated and is added to 2 times the content of the memory data register (shifted one place) times the complement $(\overline{\Delta s_1})$ of the second bit of the least significant bits $\Delta s$. This same procedure is repeated two more times with the previous content of Register A being added to 4 and 8 times the content of the memory data register times the complements $(\overline{\Delta s_2}$ and $\overline{\Delta s_3})$ of the third $\Delta s_2$ and fourth $\Delta s_3$ digits of $\Delta s$. The sequential steps for this operation in logic notation are as follows:

MDR = f(s_i, p_i)
A = MDR
$A = A + MDR \cdot \overline{\Delta s_0}$
$A = A + 2\, MDR \cdot \overline{\Delta s_1}$    A $(16 - \Delta s) \cdot f(s_i, p_i)$
$A = A + 4\, MDR \cdot \overline{\Delta s_2}$
$A = A + 8\, MDR\, \overline{\Delta s_3}$ Where:
MDR is the data stored in the memory data register
$\underline{A}$ is the current data is Register A and
$\overline{\Delta s_0}, \overline{\Delta s_1}, \overline{\Delta s_2},$ and $\overline{\Delta s_3}$ are the complements of the four least significant bits comprising $\Delta s$.

The next operation is the addition of the factor $\Delta s f(s_{i+1}, p_i)$ to $(16 - \Delta s) \cdot f(s_i, p_i)$. To accomplish this, the most significant bits in the RPM Register 120 are incremented by 1 bit and the content $f(s_{i+1}, p_i)$ of the new memory location in the ignition angle ROM 122 is placed in the memory data register 124. The interpolation with the new ignition angle data $f(s_{i+1}, p_i)$ follows the same basic procedure discussed above. The logic notation for this operation is as follows:

$MRD = (s_{i+1}, p_i)$ $A = A + MDR \cdot \Delta s_0$ $A = A + 2MDR \cdot \Delta s_1$ $A = A + 4MDR \cdot \Delta s_2$     $A = (16 - \Delta s) \cdot f(s_i, p_i) +$ $A = A + 8MDR \cdot \Delta s_3$     $\Delta s \cdot f(s_{i+1}, p_i)$ The content of Register A is now $(16 - \Delta S) \cdot f(s_i, p_i) + \Delta s f(s_{i+1}, p_i)$.

The content of Register A is now $(16 - \Delta S) \cdot f(s_i, p_i) + \Delta s f(s_{i+1}, p_i)$.

The next operation is the multiplication of the content of Register A by $(32 - \Delta p)$. This is accomplished by dividing the content of Register A by 16 (shifting 4 places) then placing the shifted content in Register B. The following logic notation gives the operations performed.

$A = A/16$ (shift 4 places)

$B = A$ $B = B + A\, \overline{\Delta p_0}$

-continued $$B = B + 2A\ \overline{\Delta p_1}$$

$$B = B + 4A\ \overline{\Delta p_2} \qquad B = (32 - \Delta p) \cdot A$$

$$B = B + 8A\ \overline{\Delta p_3}$$

$$B = B + 16A\ \overline{\Delta p_4}$$

where $\overline{\Delta p_0}$ to $\overline{\Delta p_4}$ are the complement of the least significant bits $\Delta p$ of the 8 bit pressure word stored in MAP Register 134. The content of Register B is now $(32-\Delta p)\ [(16-\Delta s)\cdot f_{s_i}p_i + \Delta s \cdot f(s_{i+1},p_i)]$.

The next operation is the solution of the equation $(16-\Delta s)\cdot f(s_i,p_{i+1})$. The most significant bits of the RPM register is decremented by one so that it is returned to its original value and the most significant bits of the MAP Register 134 are incremented by one bit. The content $f(s_i,p_{i+1})$ of the new memory location of the ignition angle ROM are then stored in the memory data register. The logic notation of the solution of the equation is basically the same as that for the solution of the equation $(16-\Delta s)\cdot f(s_i,p_i)$ and is as follows:

$$MDR = f(s_i, p_{i+1})$$

$$A = MDR$$

$$A = A + MDR\ \overline{\Delta s_0}$$

$$A = A + 2MDR\ \overline{\Delta s_1} \qquad A = (16 - \Delta s)f(s_i, p_{i+1})$$

$$A = A + 4MDR\ \overline{\Delta s_2}$$

$$A = A + 8MDR\ \overline{\Delta s_3}$$

For the solution of the equation $(16-\Delta s)\cdot f(s_i,p_{i+1})+\Delta s\cdot f(s_{i+1},p_{i+1})$, the most significant bits of the RPM register are incremented by one bit and the content $f(s_{i+1},p_{i+1})$ are placed in the memory data register (MDR). The logic notation for the solution of the equation are as follows:

$$MDR = f(s_{i+1}, p_{i+1})$$

$$A = MDR\Delta s_0$$

$$A = A + 2MDR\Delta s_1$$

$$A = A + 4MDR\Delta s_2$$

$$A = A + 8MDR\Delta s_3$$

The content of Register A is now $(16-\Delta s)\cdot f(s_i,p_{i+1})+\Delta s\cdot f(s_{i+1},p_{i+1})$.

The solution of the total equation is accomplished by the multiplication of the content of register A times $\Delta p$ and the addition of $A\cdot\Delta p$ to the content of Register B. The logic notation for this operation are as follows:

$$A = A/16\ (\text{shift A four places})$$

$$B = B + A\Delta p_0$$

$$B = B + 2A\Delta p_1$$

$$B = B + 4A\Delta p_2$$

$$B = B + 8A\Delta p_3$$

and $$B = B + 16A\Delta p_4$$

The content of Register B is now a number indicative of the interpolated value of the ignition angle $\theta_i'$ (IA) equal to $(32-\Delta p)[(16-\Delta s)\cdot f(s_i,p_i)+\Delta s\cdot f(s_{i+1},p_{i+1})]+\Delta p[(16-\Delta s)\cdot f(s_i,p_{i+1})+\Delta s\ f(s_{i+1},p_{i+1})]$.

The effect of the interpolation is pictorially illustrated in FIG. 17.

Specific circuits for performing these logic operations, including the timing and control circuit 110 are described and illustrated in Application Ser. No. 837,657 "Closed Loop Exhaust Gas Recirculation System", filed on Oct. 29, 1977 and assigned to a common assignee. Application Ser. No. 837,657 identified above is herein incorporated by reference.

Figure 16A:
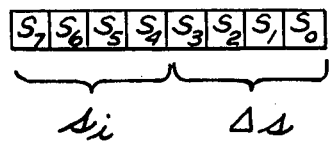
FIGS. 16A and 16B illustrate the breakdown of the contents of the RPM and MAP registers into the most significant and least significant bits.
Figure 16B:
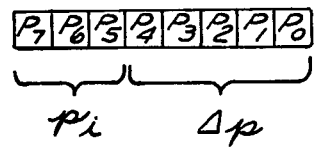
Figure 18:
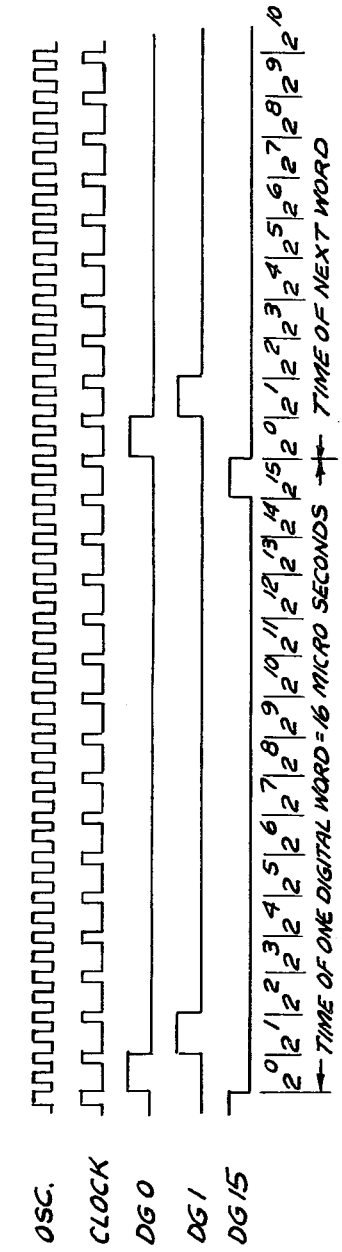
FIG. 18 is a series of waveforms showing the relationship between the oscillator and clock signals and the signals DG0 through DG15 generated by the timing and control circuit.
Figure 19:
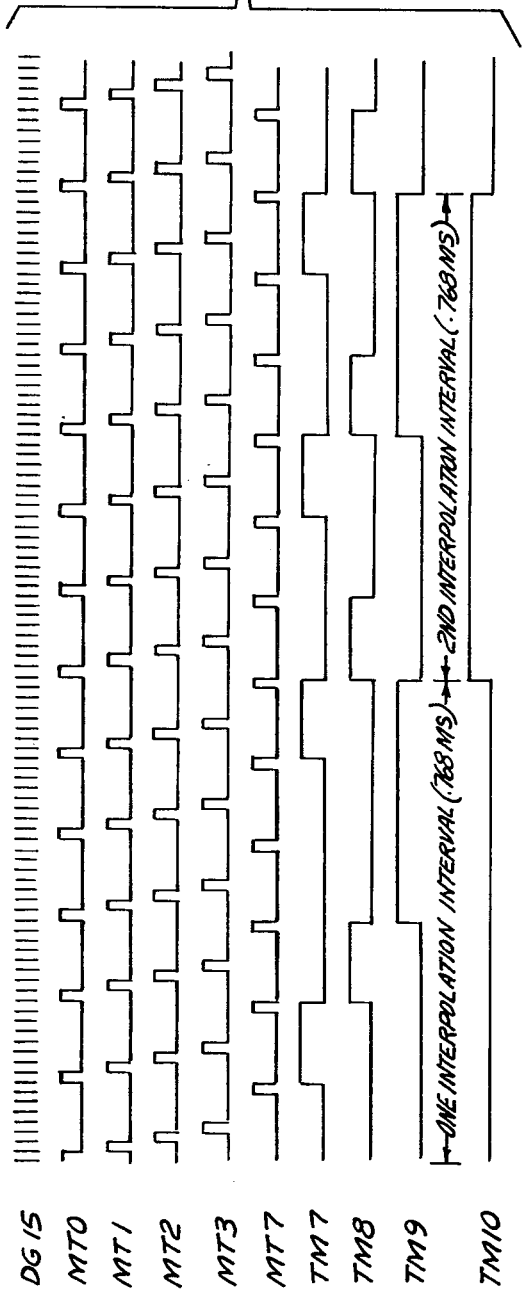
FIG. 19 is a series of waveforms showing the relationship and timing sequence of the signals MT0 through MT7 and TM7 through TM10 on a different time scale.

Because the signals generated by the timing and control circuit of the above-referenced application are also used with the phase detection portion of the ignition timing circuit, the waveforms shown on FIGS. 15 and 16 of that application are reproduced here as FIGS. 18 and 19. Referring to FIG. 18, the output of the oscillator is a two (2) MHZ signal which is divided by two ($\div 2$) to produce a one (1) MHZ clock signal as illustrated. The clock signal is used to generate digit gate signals DG0 through DG15 and are used for various timing purposes. The sixteen (16) digit gate signals DG0 through DG15 represent the 16 bits of a 16 bit digital word.

The timing diagram of FIG. 19 is illustrated on a different time scale and shows the relationships of word times to digit time and further illustrates the various signals generated which control the various computation and interpolation intervals implemented by the disclosed closed loop ignition control system of the present invention. Briefly, the signals MT0 through MT7 are sequentially generated in response to the signals DG15 and have a pulse width equal to 16 microseconds which is the time interval between 16 consecutive clock pulses and is the time required to input or read out a complete 16 digit word from any of the various registers in the circuit. The generation of the first set of signals MT0 through MT7 are initiated by the signal $\theta_r$ which is the same as the IRES signal of the referenced application, and subsequent signals MT0 through MT7 are generated at 8 word intervals as shown. A signal TM7 is generated at the termination of the first MT7 signal and has a duration equal to 8 words and repeats at 24 word intervals. The signal TM8 is generated at the termination of the TM7 signal and has a duration of 8 words. The signal TM8 also repeats at 24 word intervals. The signal TM9 is generated after 24 word intervals and has a pulse duration of a like 4 word interval. The signal TM9 is repeated at 48 word intervals as shown. The signal TM10 is generated at the end of the first TM9 signal and has a duration of 48 word intervals which repeats at 96 word intervals.

The signals MT0 through MT7 and TM7 through TM10 are the basic signals which control the timing of the various functions to be performed. The additional signals used in the phase detection portion of the ignition timing circuit will be discussed with reference to FIG. 20 and the waveforms shown on FIG. 21.

Referring now to the phase detection portion of the block diagram shown on FIG. 15, a second toothed wheel 144, having a predetermined number of teeth disposed about its periphery at equal angular intervals is attached to the engine's crankshaft and rotates therewith. The number of teeth on wheel 144 is determined from the number of cylinders, whether it is a two or four cycle engine, and the number of intervals desired for determining the phase angle. Considering an eight cylinder four cycle engine which requires 2 revolutions of the crankshaft for a complete operational cycle (each cylinder fired once) and the phase angle is to be computed in accordance with equations 7 and 8 requiring four discrete intervals for each phase computation, the number of teeth on wheel 144 would be:

$$\frac{8 \text{ cylinders/cycle}}{2 \text{ revolutions/cycle}} \times 4 \text{ periods/cylinder} =$$

16 periods/revolution

For a 6 cylinder 4 cycle engine, the number of teeth would be 12 and for a 4 cylinder engine the number would be 8. A magnetic pick-up 146 detects the passing of each tooth as the crankshaft rotates and generates period signals $\theta_p$ which are amplified by amplifier 148. Successive period signals $\theta_p$ defines the summation intervals set forth in equations 1 through 4. Alternatively, the teeth on the flywheel's ring gear may be detected as discussed with reference to FIGS. 11 and 13 and a signal $\theta_p$ generated each time a number of teeth equal to the desired angular interval are counted.

The period signals $\theta_p$ are input to a Period Counter 150, a Period Register 152 and a Function Generator 154. The Period Counter 150 also receives clock pulses generated by an Oscillator 151 and stores the number of clock pulses received between each successive period signals $\theta_p$. The number of clock pulses stored in the Period Counter 150 between successive period signals $\theta_p$ are transferred to the Period Register 152.

The Function Generator receives the period signal $\theta_p$ and reference signal $\theta_r$ and generates signals which activate Add-Subtract Gates 156 and 158 to add or subtract the content of the Period Register 152 to the sin and cos Registers 160 and 162 respectively in accordance with equations 7 and 8. At the end of each summation interval the content of the sin and cos Registers are numbers indicative of the values of sin $\phi$ and cos $\phi$ respectively. The content of the sin and cos Registers 160 and 162 are received by a comparator 164 which determines which of the two registers has the greater absolute value and generates a signal which is input to a Divider 166 along with the content of the sin and cos registers. The signal generated by the Comparator 164 selects the content of the register having the smaller absolute value as the numerator in the divide operation to be performed. The output of the Divider 166 is a number indicative of the tan $\phi$ or cot $\phi$ depending whether the absolute value of the sin Register 160 was smaller or larger than the absolute value of the content of the cos Register 162 or vice versa. The output of the Divider 166 addresses an Arctan (Read Only Memory) ROM 168 which outputs a signal having a value indicative of the angle $\phi$. The Arctan ROM 168 is basically a look-up table storing the values of $\phi$ as a function of tan $\phi$ generated by the division of the content of the sin Register 160 by the content of the cos Register 162. The output of the Arctan ROM is received by a Cotangent Correction Circuit 170 which performs the function:

$$\phi = \pi/2 - \arctan(A \cos \phi/A \sin \phi)$$

when the Divider 166 divides the content of the cos Register 162 by the content of sin Register 160.

The output of the Cotangent Correction Circuit 170 is received by a $\phi$ Averaging Circuit 172 which effectively filters the computed phase angle $\phi$. Comparator 174 compares the average value of $\phi'$ with a reference signal, $\phi_R$, and outputs an error signal, $\Delta\phi'$, indicative of the difference between the computed phase angle $\phi'$ and $\phi_R$.

The error signal $\Delta\phi'$ is received by an Accumulator 176 which outputs a correction signal $\phi_c$ indicative of the sum of the error signals $\Delta\phi'$. The correction signal $\phi_c$ is then input to Adder 178 where it is added to the content of Register B 142 indicative of the computed ignition angle $\phi'_i$ and the sum of $\phi'_i$ and $\phi_c$ are stored in the Ignition Angle Register 180. The content of the Ignition Angle Register 180 are placed in a rate multiplier 182 which adds the content of the ignition angle register 180 to itself at a rate determined by clock signals received from the Timing and Control Circuit 110. Each time the Rate Multiplier 192 overflows, a pulse signal is generated, therefore, the rate at which the pulse signals are generated is proportional to the content of the Ignition Angle Register 180. The pulse signals generated by the Rate Multiplier 182 are counted in an Up-Counter 184 in the interval between successive crankshaft reference angle signals $\theta_r$ so that the content of the Up-Counter 184 at the end of each counting interval is directly proportional to the computed ignition angle and inversely proportional to the engine speed. This corrects the computed ignition angle as a function of engine speed. The ignition angle is converted to the time domain by transferring the content of the Up-Counter 184 to a Down-Counter 186 where the content is counted down at a fixed rate by clock signals received from the Timing and Control Circuit 110. The Down-Counter 186 generates a signal which is terminated when the number of counts reaches zero.

The signal generated by the Down-Counter 186 is transmitted to a Dwell Circuit 188. The signal generated by the Dwell Circuit turns amplifier 104 off in response to the termination of the signal generated by the Down-Counter 186, then turns amplifier 104 back on after a predetermined "off" time. The dwell time is computed as a function of the interval between ignition signals such that the ratio between off and on time of amplifier 104 is a fixed value independent of engine speed.

Figure 20:
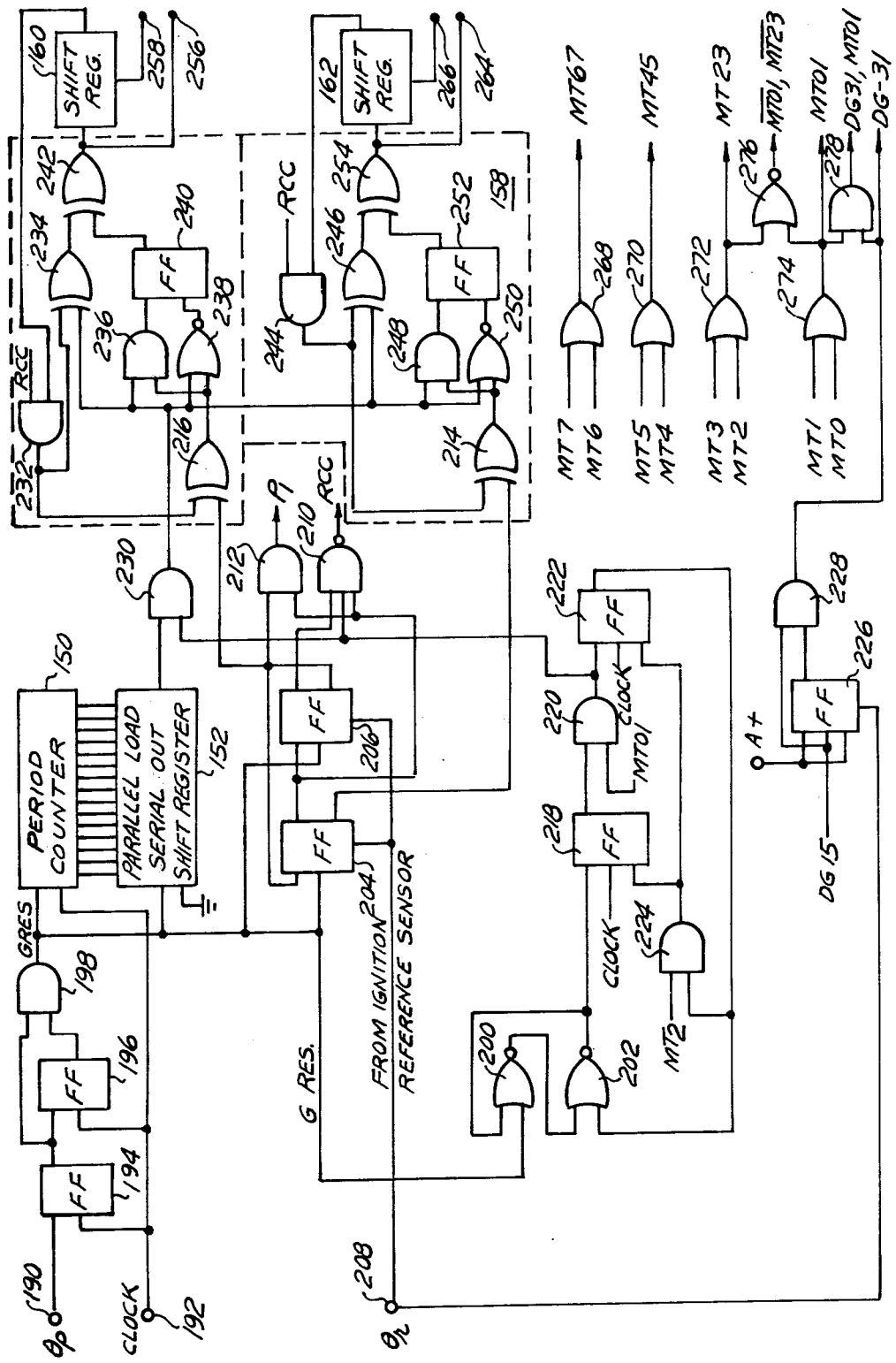
FIG. 20 is a circuit diagram of the Function Generator and a first portion of the Phase Detection circuit shown on FIG. 15.

The circuit details of the phase detection and the portion of the ignition timing circuit not described in previously cited patent application Ser. No. 837,657 filed Oct. 29, 1977 are shown in FIGS. 20 through 26. Referring first to FIG. 20, the phase reference signals $\theta_p$ are received at terminal 190 and a 10 MHZ clock signal generated by the Oscillator 151 are received at terminal 192. Terminal 190 is connected to the set input of Flip-Flop 194 while terminal 192 is connected to the trigger or toggle input of Flip-Flops 194, and 196 and the count input of the period counter 150. The Q output of Flop-Flop 194 is connected to the set input of Flip-Flop 196 and an input to AND gate 198. The Q output of Flip-Flop 196 is connected to the input of AND gate 198. The output of AND gate 198 is connected to the reset input of period counter 150, the load input of parallel load serial output shift 152, the toggle inputs of Flip-Flops 204 and 206 and an input of NOR gate 200.

The crankshaft position reference signal $\theta_r$ is received at terminal 208. Terminal 208 is connected to the reset inputs of Flip Flops 204, 206 and 226. The set input of Flip-Flop 204 is connected to the $\overline{Q}$ output of Flip-Flop 206 and the inputs to AND gate 212 and exclusive OR gate 216. The Q output of Flip-Flop 204 is connected to the set input of Flip-Flop 206 and to inputs to NAND gate 210 and AND gate 212. The $\overline{Q}$ output of Flip-Flop 204 is connected to an input to exclusive OR gate 214. The Q output of Flip-Flop 206 is connected to an input of NAND gate 210.

The output of NOR gate 200 is connected to one input of NOR gate 202. The output of NOR gate 202 is connected back to the other input to NOR gate 200 and to the set input of Flip-Flop 218. The Q output of Flip-Flop 218 is connected to one input of AND gate 220 having its output connected to the set input of Flip-Flop 222 to an input of NAND gate 212 and to one input of AND gate 230. AND gate 220 receives a signal MT01 at its other input. The Q output of Flip-Flop 222 is connected to the other input of NOR gate 202 and to one input of AND gate 224 having its output connected to the reset inputs to Flip-Flops 218 and 222. AND gate 224 also receives a signal MT2 generated by the Timing and Control Circuit 110.

The output of NAND gate 210 is connected to one input of AND gates 232 and 244 respectively. The output of AND gate 232 is connected to the input of exclusive OR gates 216 and 234.

The serial output of shift register 152 is connected to an input of AND 230. The output of AND gate 230 is connected to the inputs of AND gates 236 and 248, NOR gates 238 and 250 and exclusive OR gates 234 and 246. The output of exclusive OR gate 216 is connected to the input of AND gate 236 and NOR gate 238. The outputs of AND gate 236 and NOR gate 238 are connected to the set and reset inputs of Flip-Flop 240 respectively. The Q output of Flip-Flop 240 is connected to one input of exclusive OR gate 242. The alternate input of exclusive OR gate 242 is connected to the output of exclusive OR gate 234. The output of exclusive OR gate 242 is connected to the terminal 256 and the input of 32 bit shift register 160 which is the sin Register as indicated on FIG. 15. The output of the shift register 160 is connected to the alternate input of AND gate 232.

The output of AND gate 244 is connected to the inputs of exclusive OR gates 214 and 246. The output of exclusive OR gate 214 is connected to the inputs to AND gate 248 and NOR gate 250. The output of AND gate 248 and NAND gate 250 are connected to the set and reset inputs of Flip-Flop 252 respectively. The Q output of Flip-Flop 252 is connected to one input of exclusive OR gate 254. The other input to exclusive OR gate 254 is connected to the output of exclusive OR gate 246. The output of exclusive OR gate 254 is connected to terminal 264 and to the input to a 32 bit shift register 162 which is the cos Register 162 identified in FIG. 15. The output of cos Register 162 is connected to the alternate input to AND gate 244. Terminals 258 and 266 are connected to intermediate bit locations of shift registers to facilitate the subsequent divide operation to compute tangent $\phi$.

The set and reset inputs to Flip-Flop 226 are connected to a source of positive voltage designated A+ as shown. The signal DG-15 generated by the Timing and Control Circuit 110 (FIG. 15) is received at the toggle input of Flip-Flop 226 and one input to AND gate 228. The Q output of Flip-Flop 226 is connected to the alternate input to AND gate 228. The output of AND gate 228 is a signal designated DG31.

Figure 21:
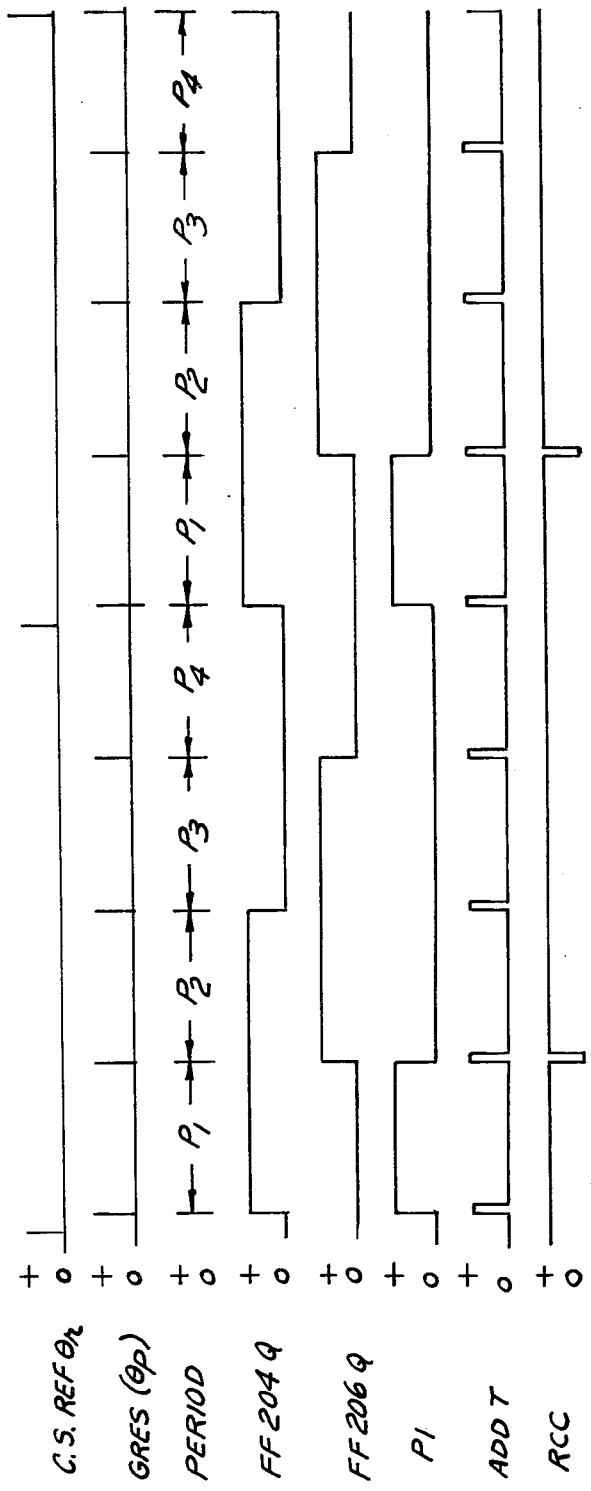
FIG. 21 shows the basic timing waveforms used in FIG. 20.

OR gates 268, 270, 272 and 274 receive the signal MT0 through MT7 generated by the Control and Timing Circuit 110 shown on FIG. 15 and generate the signals MT-01 through MT-67 as shown on FIG. 21. The outputs of OR gates 272 and 274 are connected to the inputs of NOR gate 276 which generates a signal $\overline{MT01}$, $\overline{MT23}$. The outputs of OR gate 274 and AND gate 228 are connected to the inputs of AND gate 278 which generates a signal DG-31, MT01. A signal $P_1$ is generated at the output of AND gate 212 and is indicative of the period $P_1$ as shall be discussed hereinafter.

Referring to FIG. 21, there is shown the crankshaft position signal $\theta_r$ which is generated at the output of amplifier 60 as shown on FIG. 15 and discussed relative thereto. Briefly, the signal $\theta_r$ is generated at a predetermined angle prior to each cylinder reaching its top dead center position and is the reference signal from which the ignition delay time is calculated. The GRES is obtained from the output of AND gate 198 and is the $\theta_p$ signal generated at the output of amplifier 148 (FIG. 15) synchronized with the 10 MHZ signal generated by oscillator 151. The GRES signal determines the end of each counting period $P_1$ through $P_4$. Four GRES signals are generated between each $\theta_4$ signal dividing each torque impulse in four equal angular increments of crankshaft rotation.

The signals FF204 and FF206 are the signals appearing at the Q outputs of Flip-Flops 204 and 206 respectively. The signal $P_1$ is the signal appearing at the output of AND gate 212 and is indicative that the data from the period $P_4$ has been read out of shift register 152 and is present in the sin and cos Registers 160 and 162 respectively. The signal ADDT is the signal generated at the output of AND gate 220 and enables AND gate 230 to transmit the data stored in Shift Register 152 to the Add/Subtract Circuits 156 and 158. The signal RCC is the signal generated at the output of NAND gate 210 and disables AND gates 232 and 244 blocking the recirculation of the data in the sin and cos registers 160 and 162 respectively while the new data generated during the period $P_1$ is being entered into the sin and cos registers respectively.

Figure 22:
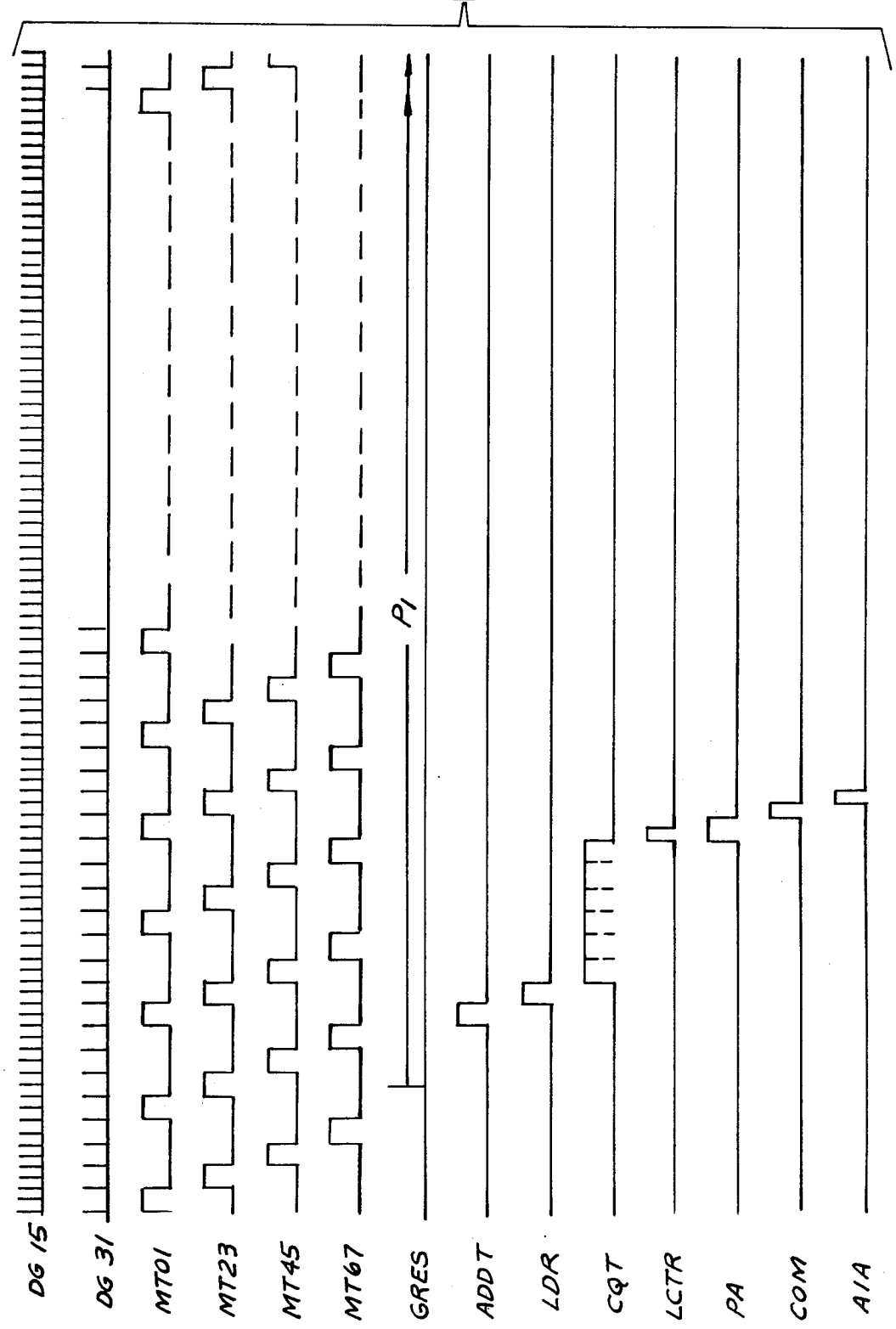
FIG. 22 shows the waveforms controlling the computation of the phase angle and the correction of the advance angle.

Referring now to the waveforms shown on FIG. 22, the signal DG15 is generated by the Timing and Control Circuit 110 (FIG. 15) and are the same as shown on FIG. 19. The signal DG31 is the signal DG15 divided by two (2) and is the output signal generated by AND gate 228. This is the timing reference signal for the 32 bit registers used in the computation of the phase angle $\phi_i$ as shall be hereinafter described. The signals MT01, MT23, MT45 and MT67 are the signals at the outputs of OR gates 268 through 274 and are the respective combinations of the signals MT0 through MT7 shown on FIG. 19. The GRES signal is the same as shown on FIG. 21 and in particular, the GRES signal signifying the end of period $P_4$ and the beginning of period $P_1$. The ADDT signal is the first MT01 signal generated after each GRES signal and enables AND gate 230 to transfer the content of shift register 152 to the sin and cos registers through Add/Subtract Circuits 156 and 158. The load divider register (LDR) signal is generated in coincidence with the sequential MT23 signal and enables the add/substract to load the smaller value of sin and cos Register, 150 and 162 respectively into register 318 in the Divider 166. The Compute Quotient (CQT) signal are the sequential signals, MT45, MT67, MT01, through MT67 during which time the Divider 166 computes the quotient indicative of the arctangent of $\phi$. The load cotangent register (LCTR) signal enables the cotangent register 358 in the cotangent correction circuit 170 to load the content of arc tangent ROM 168. The phase angle averaging (PAA) signal enables the Phase Angle Averaging Circuit 172 to average the newly-computed phase angle $\phi$ with the previously computed phase angle. The compare (COM) signal enables the Comparator 174 to compare the computed phase angle with a reference phase angle and add the error signal to prior computed error in Accumulator 176. The add to ignition angle enables Adder 178 to add the error signal of Accumulator 176 to the computed advance angle stored in Register B, 180, (FIG. 15).

With the crankshaft rotating at a maximum speed of 6,000 RPM, there are approximately 600 microseconds between the GRES signals. The maximum time for the computation of the phase angle, error signal and the addition of the error signal to the computed advance angle is 450 microseconds. Therefore, the computation and correction is capable of being completed during the period $P_1$ before new data from the next torque impulse is entered into the system.

Referring back to FIG. 20, the operation of the circuit shown is as follows: the phase reference signal $\theta_p$ is applied to the circuit comprising Flip-Flops 194, 196 and AND gate 198 and generates a reset signal GRES synchronized with the clock signals received at input terminal 192. The signal GRES resets Counter 150, activates the load input of Shift Register 152 and toggles the inputs to Flip-Flops 204 and 206. The time interval or period between successive reset signals is measured by counting the clock signals in Counter 150. At the end of each period, the GRES signal activates the parallel load input of Shift Register 152 which transfers the content Counter 150 to Shift Register 152 and resets counter 150. The ADDT signal enables AND gate 230 and the contents of Register 152 is added to or subtracted from the sin and cos Registers 160 and 162 respectively according to the states of the Flip-Flops 204 and 206. The sin and cos Registers 160 and 162 are 32 bit registers, therefore, during the time interval ADDT, the parallel loaded content of shift register 202 followed by 16 zeroes (0) are transferred to both registers 160 and 162. Gates 216, 232, 234, 236, 238 and 242 and Flip-Flop 240 comprise the add/subtract circuit 158. Gate 216 controls the add and subtract function and gate 232 provides a means for initializing the content of the sin register 160 by presenting a zero input to the adder when the output of NAND gate 210 is negative in response to the states of Flip-Flops 204 and 206. Gates 214, 244, 246 248, 250 and 254 in combination with Flip-Flop 252 comprise add/subtract circuit 158 and performs the same function with respect to the cos shift register 162.

The Flip-Flops 204 and 206 provide a square wave used as a reference for the phase detection process. The states of the flip-flops are related to the time intervals $P_1$ through $P_4$ as shown on FIG. 21.

From equation 5, a quantity proportional to the sin of the phase angle is obtained from $P_1+P_2-P_3-P_4$. Flip-Flop 206 and gate 216 cause the one bit adder associated with sin shift register 160 to provide an add function when the Q output of Flip-Flop 206 is a logic zero (0) and a subtract function when the Q output of Flip-Flop 206 is a logic one (1). It is to be noted that the clock pulses counted in counter 150 during the period $P_1$ are read out of shift register 152 during the period $P_2$, and the clock pulses counted in period $P_2$ are read out during the period $P_3$, etc. In a like manner, the cos of the phase angle is obtained from the equation $P_1-P_2-P_3+P_4$. Flip-Flop 204 and exclusive OR gate 214 cause the one bit adder associated with cos shift register 162 to perform an add function when the $\overline{Q}$ output of Flip-Flop 204 is a logic zero (0) and a subtract function when the output of Flip-Flop 204 is a logic one (1).

The operation of Flip-Flops 204 and 206 generating the signal controlling the operation of Add/Subtract Circuits 156 and 158 (FIG. 15) are as follows. The $\theta_r$ signal received at terminal 208 resets Flip-Flops 204 and 206, so that the Q output of both flip-flops are logic 0's. The two flip-flops remain in this state until toggled by the signal GRES signalling the beginning of period $P_1$. Flip-Flop 204 changes state since it is receiving a logic 1 input at its set input from the $\overline{Q}$ output of Flip-Flop 206. Flip-Flop 206 remains in its reset state since the signal at its set input was the logic 0 received from the Q output of Flip-Flop 204. The next GRES signal indicative of the end of the second period $P_1$ again toggles both flip-flops. Flip-Flop 204 remains in its set state because the signal at its set input is still a logic 1 received from the $\overline{Q}$ output of Flip-Flop 206. Flip-Flop 206 will change state since the signal received at its input from the Q output of Flip-Flop 204 has changed to a logic 1. The next reset signal indicative of the end of the second counting Period $P_2$, toggles both flip-flops. Flip-Flop 204 changes state producing a logic 0 at its Q output in response to the signal at the $\overline{Q}$ output of Flip-Flop 206 being a logic 0. Flip-Flop 206 remains in its set state producing a logic 1 at its Q output since the signal at its set input was a logic 1 received from the Q output of Flip-Flop 204. At the end of the third period $P_3$, the GRES signal again toggles both flip-flops, and Flip-Flop 206 changes state. The Flip-Flops 204 and 206 are now in their original reset state completing the cycle.

NAND gate 210 receives the signals present at the $\overline{Q}$ output of Flip-Flop 204 and the Q output of Flip-Flop 206 and the ADDT signal generated the output of AND gate 220 and generates a RCC (logic 0) signal during the Period $P_2$ when the data in shift register 152 indicative of the time of Period $P_1$ is being transmitted to the Add/Subtract Gates 156 and 158. The RCC signal disables AND gates 232 and 244 blocking the recirculation of the old data stored in the sin and cos Registers 160 and 162 respectively. At the end of the data transfer, the only data stored in Registers 160 and 162 is the data generated during the period $P_1$. For all successive periods, $P_2$ through $P_4$, the output of NAND gate 212 becomes positive enabling both AND gates 232 and 244.

The operation of the add and subtract circuits associated with the sin register 160 and cos register 162, are well known in the art and need not be discussed for an understanding of the invention.

It is sufficient to state that when the inputs to exclusive OR gates 214 and 216 are logic o's, the add/subtract circuits 156 and 158 will add the content of shift register 152 to the recirculated content of sin and cos Register 160 and 162, and when the inputs to exclusive OR gates 214 and 216 are positive (logic 1), the content of Register 152 will be subtracted from the recirculated contents of the sin and cos Registers 160 and 162.

It should further be noted that the final output of exclusive OR gates 242 and 254 are indicative of whether the final content of Register 160 and 162 are a positive or negative (carry 1) value. The signal indicative of whether the sum is positive or negative is taken from the output of exclusive OR gate 242 and 254 and are output on terminal 256 and 264 respectively. A final logic 0 output is indicative that the sum stored iin registers is a positive value and a logic 1 is indicative of the sum in registers is a negative value.

The content of Register 160 and 162 are output at terminal 258 and 266 and are taken from and intermediate bit location shifting the data by 5 places.

The GRES signal received by NOR gate 200 causes its output to become a logic 0 which causes NOR gate 202 to generate a logic 1 signal at its output. NOR gates 200 and 202 form an electronic latch which will remain in this latched state until unlatched by a logic 1 signal received at the alternate input from the Q output of Flip-Flop 222. The logic 1 output of NOR gate 202 is applied to the set input of Flip-Flop 218 which assumes the set state when toggled by a clock signal producing a logic 1 at its Q output. The logic 1 at the Q output of Flip-Flop 218 enables AND gate 220 to pass the first MT01 signal received at its alternate input. The MT01 signal passed by AND gate 220 is the ADDT signal applied to the set input of Flip-Flop 222, AND gate 230 and NAND gate 210. The ADDT signal applied to the set input of Flip-Flop 222 causes it to assume the set state when toggled by a clock pulse and generate a logic 1 signal at its Q output. The logic 1 signal generated at the Q output of Flip-Flop 222 unlatches NAND gates 200 and 202 which remain in the unlatched state until the next GRES signal is received by NAND gate 200. The logic 1 signal from the Q output of Flip-Flop 222 enables AND gate 224 which passes the next MT2 received at its alternate input. The MT2 signal passed by AND gate 224 is applied to the reset inputs of Flip-Flops 218 and 222 which assume the original reset state when toggled by the clock pulses. The ADDT signal is generated only once during each period and is coincident with the first MT01 signal generated after each GRES signal.

The DG15 signal is applied to the toggle input of Flip-Flop 226 causing it to alternately change state. The DG15 signal and the Q output of Flip-Flop 222 are applied to the alternate inputs of AND gate 228 which generates a signal DG31 at its output. The DG31 signal is a 1 microsecond pulse occuring at 32 microsecond intervals and is the control signal for the 32 bit shift registers used in the divide operation to be discussed with reference to FIG. 22.

Figure 23:
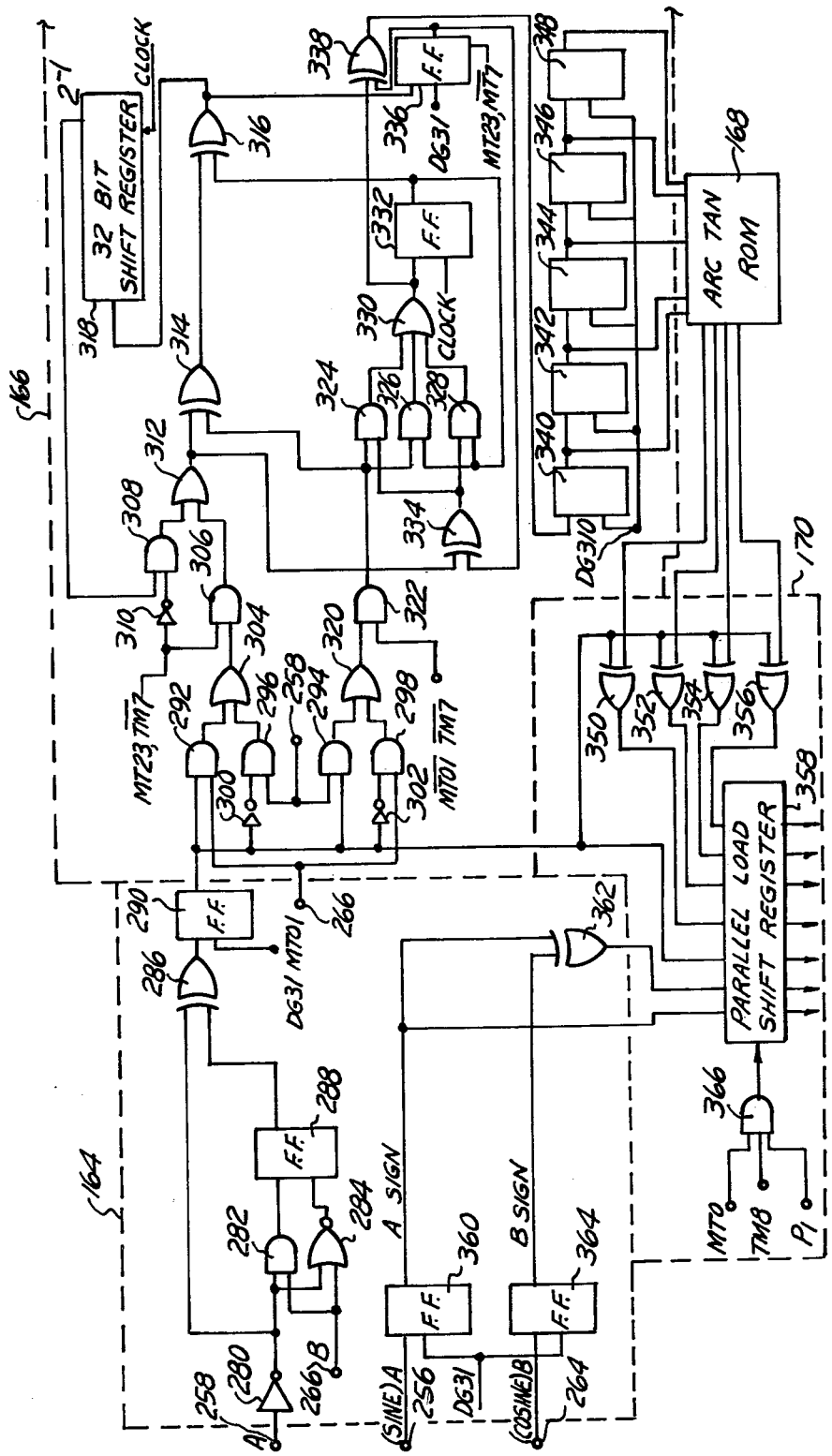
FIG. 23 is a circuit diagram of the Comparator Divider, Arctangent ROM and Cotangent Correction Circuit shown on FIG. 15.

The circuit details of the Comparator 154, Divider 166, Arctangent ROM 168 and Cotangent Correction Circuit 170 are shown on FIG. 23. Referring to FIG. 23 terminal 258 (FIG. 20) is connected to the alternate inputs of AND gates 282, NOR gate 284 and exclusive OR gate 286 through inverter 280. The outputs of AND gate 282 and NOR gate 284 are connected to the set and reset inputs of Flip-Flop 288 respectively while the Q output of Flip-Flop 288 is connected to the alternate input of exclusive OR gate 286. Flip-Flop 290 receives the output of exclusive OR gate 286 at its set input and the signal DG31, MT01 at its toggle input. The Q output of Flip-Flop 290 is connected to the inputs of AND gates 292 and 294, to AND gates 296 and 298 through inverters 300 and 302 respectively, to the inputs of exclusive OR gates 350, 352, 354, and 356, and to the third most significant bit of Shift Register 358. The alternate inputs of AND gates 292 and 298 are connected to terminals 266 and the alternate inputs of AND gates 294 and 296 are connected to terminal 258.

The outputs of AND gates 292 and 296 are connected to the input of OR gate 304 having its output connected to an input to AND gate 306. A signal $\overline{MT23}$, $\overline{TM7}$ is received at the alternate input of AND gate 306 and an input to AND gate 308 through inverter 310. The alternate input to AND gate 308 is connected to the $2^1$ bit location of a 32 bit shift register 318. The outputs of AND gates 306 and 308 are connected to the input of OR gate 312 having its output connected to an input to exclusive OR gates 314 and 334.

The outputs of AND gates 294 and 298 are connected to the inputs of OR gate 320 having its output connected to an input of AND gate 322. The alternate input of AND gate 322 receives the signal $\overline{MT01}$, $\overline{TM7}$. The output of AND gate 322 is connected to an alternate input of exclusive OR gate 314 and to inputs to AND gates 324 and 326. The output of exclusive OR gate 334 is connected to an alternate input of AND gate 324 and the input of AND gate 328. The outputs of AND gates 324, 326, and 328 are connected to inputs of an OR gate 330 having its output connected to the set input of Flip-Flop 332 and an input of exclusive OR gate 338. The toggle input of Flip-Flop 332 receives the clock signal. The Q output of Flip-Flop 332 is connected to an input to exclusive OR gate 316 and to the alternate inputs of AND gates 326 and 328.

The output of exclusive OR gate 314 is connected to the alternate input of exclusive OR gate 316 having its output connected to the input of a 32 bit shift register 318 and to the set input of Flip-Flop 336. Flip-Flop 336 receives the signal DG31 at its toggle input. The $\overline{Q}$ output of Flip-Flop 336 is connected to the alternate inputs of exclusive OR gates 334 and 338.

The output of exclusive OR gate 338 is connected to the set input of Flip-Flop 340 which in combination with series connected Flip-Flops 342, 344, 346 and 348 form a quotient register storing the output of quotient of the divide operation appearing at the output of exclusive OR gate 338.

The Q outputs of Flip-Flops 342 through 348 are connected to the address inputs of the Arctan ROM 168. Exclusive OR gates 314, 316, 334 and 338, AND gates 306, 308, 322, 324, 326 and 328, OR gates 312 and 330, inverter 310, Flip-Flops 332 and 336 and shift register 318 comprise the divider circuit which along with the quotient register comprising Flip-Flops 340 through 348 is the Divider 166 shown on FIG. 15.

The four bit word output of the Arctan ROM 168 Arctan/ROM 168 connected to the alternate inputs of exclusive OR gates 350 through 356. The outputs of the exclusive OR gates 350 through 356 are connected to the four least significant bit inputs of Shift Register 358. The parallel load input signal is received from the output of AND gate 366 receiving at its inputs the signals MT0, TM8, and the signal $P_1$ indicative of the end of the fourth counting period $P_4$.

The terminal 256 and 264, receiving the signals indicative of the sign of the content of shift registers 160 and 162 (FIG. 21) are connected to the set inputs of Flip-Flops 360 and 364 respectively. The Flip-Flops 360 and 364 are toggled by the signal DG31. The Q outputs of Flip-Flops 360 and 364 are connected to alternate inputs of exclusive OR gate 362 having its output connected to the second most significant bit input of parallel load shift register 358. The Q output of Flip-Flop 360 is also connected to the first most significant bit of shift register 358. Exclusive OR gates 350 through 356 and 362, Flip-Flops 360 and 364, AND gate 366 and parallel load shift register 358 comprise the Cotangent Correction Circuit 170 shown on FIG. 15.

Figure 24:
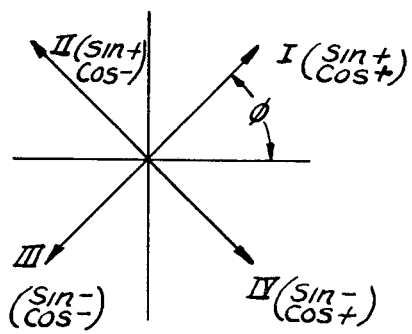
FIG. 24 is a diagram illustrating the four quadrants in which the phase angle $\phi$ may lie.
Figure 26:
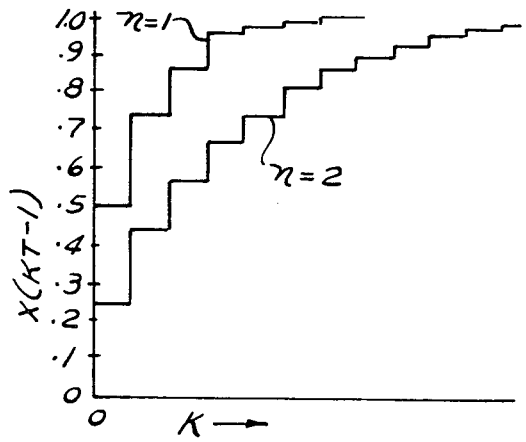
FIG. 26 is a graph showing the output of the Phase Angle Averaging Circuit of FIG. 15.

The operation of the circuit is discussed with reference to FIG. 23 and the coordinate graph of FIG. 24, the waveforms shown on FIGS. 19, 21 and 22 and Table 2. Referring first to FIG. 24 which shows the four possible quadrants in which the phase angle φ may occur, in the first quadrant, quadrant I, the value of the sin and cos are both positive, i.e. the signal present at the outputs of exclusive OR gates 242 and 254 (FIG. 20) and appearing at terminals 256 and 264 respectively during DG31 are both logic 0's. Therefore, Flip-Flops 360 and 364, in combination with exclusive OR gate 362 will present logic 0's to the two most significant bit inputs to parallel load shift register 358. When the phase angle φ lies in quadrant II, the signals at terminals 256 and 264 are a logic 0 and a logic 1 respectively and the signals presented at the most significant inputs are a logic 0 and a logic 1 respectively. For quadrant III, the signals are a logic 1 and a logic 0 and for quadrant IV, both signals are a logic 1. Therefore, the first two most significant bits are indicative of the value of the phase angle φ.

The content of the sin and cos shift registers 160 and 162 are received at terminals 258 and 266 respectively. When the absolute value of the content of the sin register 160 is smaller than the absolute value of the cos register 162, the Q output of Flip-Flop 288 is a logic 1 and the output of inverter 280 is a logic 1 which causes the outputs of exclusive OR gate 286 and the Q output of Flip-Flop 290 to become a logic 0. The logic 0 at the output of Flip-Flop 290 is transmitted to both the Divider 166 and the Cotangent Correction Circuit 170. The logic 0 output of Flip-Flop 290 causes the content of the sin register 160 to be entered into the Divider 166 as the numerator and the content of the cos register to be entered as the denominator. The logic 0 output of Flip-Flop 290 indicative that the input to the Arctan-ROM 168 is the tan φ, therefore the value of φ output by the ArctanROM 168 is in accordance with equation 7. The logic 0 is presented at the third most significant bit input of register 358 and at the inputs of exclusive OR gates 350 through 356. The exclusive OR gates 350 through 356 will pass the outputs of the Arctan/ROM 168 directly to the 4 least significant bit inputs of Shift Register 358.

When the absolute content of the sin register 160 is larger than the absolute content of the cos register, the output of Flip-Flop 290 is a logic 1 which enters the content of the cos register 162 into the Divider 166 as the numerator. The logic 1 is also presented at the third most significant bit input of Shift Register 358 and is indicative that the input to the Arctan/ROM 168 is cot φ. The logic 1 input to exclusive OR gates 350 through 356 causes the complement of the the output from Arctan ROM 168 to be present at the four least significant bit inputs to Shift Register 358. The content of parallel load shift register will then be in accordance with equation 8, i.e., $$\phi = \pi/2 - \arctan(A\cos\phi/A\sin\phi)$$

The signals present at the parallel inputs of shift register 358 are entered into the register in response to an output signal from AND gate 366 which is activated by the MT0, TM8 and P₁ signals which signify the end of the division operation after the data from the fourth period P₄ has been shifted out of the shift registers 160 and 162.

The operation of the Divider 166 is as follows: A logic 0 output from Flip-Flop 290 enables AND gate 296 and the data from the sin Register 160 appearing at terminal 258 is serially transmitted to one input of exclusive OR gate 314 through OR gate 304 and AND gate 306 enabled by the signal MT23, $\overline{TM7}$. The MT23, $\overline{TM7}$ signal inverted by inverter 310 disables AND gate 308 blocking the data being recirculated from Shift Register 318.

At the end of the signal MT 23, $\overline{TM7}$ AND gate 306 is disabled and AND gate 308 is enabled permitting the data stored in shift register to be recirculated through AND gate 308.

Simultaneously AND gate 322 is enabled by the $\overline{MT01}$, $\overline{TM7}$ signal and the content of cos Register 162 received at terminal 266 is input through AND gates 298, OR gate 320 and AND gate 322 to the add/subtract circuit comprising exclusive OR gates 314, 316, and 334, AND gates 324, 326 and 328, OR gate 330 and Flip-Flops 332 and 336. Since Flip-Flop 336 is reset by the MT23, $\overline{TM7}$ signal, a logic 1 is applied to the alternate input to exclusive OR gate 344 which places the add/subtract circuit in the subtract mode, the data from cos Register 162 is subtracted from the data being received from sin Register 160 and the remainder is placed in shift register 318. At the end of the period MT23, $\overline{MT7}$ AND gate 306 is disabled blocking further entry of the data from the sin register 160 from being entered into the Divider until the divide operation is completed. During subsequent operations, the data from cos Register 162 is added or subtracted from the recirculated remainder stored in Shift Register 318. If the remainder stored in Shift Register 318 is larger than the denominator, the last digit entered in shift register is a logic 0 and Flip-Flop 336 remains in its reset state when toggled by the signal DG31. However, when the denominator is larger than the remainder, Flip-Flop 332 has a logic 1 (carry 1) output and the last digit enter into shift register 318 is a logic 1. This causes Flip-Flop 336 to change state and produce a logic 0 at its $\overline{Q}$ output which will cause the add/subtract circuit to add the content of cos Register 162 to the remainder during the next operation. The add/subtract circuit is functionally the same as the add/subtract circuits 156 and 158 discussed relative to FIG. 21 and need not be repeated here.

A quotient signal is generated at the output of exclusive OR gate 338 at the end of each operation and is stored in a quotient register comprising serially-connected Flip-Flop 340 through 348. When the output of OR gate 316 is different from the $\overline{Q}$ output of Flip-Flop 336, a logic 1 signal is transmitted to the set input of Flip-Flop 340 which causes it to assume a set state producing a logic 1 at its output when it is toggled by the signal DG31. At the end of the next operation, the signal present at the output of exclusive OR gate 338 determines the state of the Flip-Flop 340 and the prior state of Flip-Flop 340 is transferred to Flip-Flop 342 etc. This operation continues until 6 add or subtract operations are completed such that the signal generated at the output of exclusive OR gate 338 at the end of the last 5 operations are serially stored in Flip-Flops 340 through 348. Since the numerator was selected as being the smaller of the two values stored in the sin and cos registers 160 and 162 respectively, the result of the first operation at the output of exclusive OR gate 338 is always a logic 0 which is discarded.

The operation of the Divider is explained by following through a typical division as shown on Table II. Consider, for example, the value of the data in the sin Register 160 being the number 33 and the value of the data in the cos Register 162 being a number 57. These numbers multiplied by 32 (shifted 5 places) are shown in digital form on the first two lines of Table II.

Flip-Flops 340 through 348 stores the quotient of the division in digital form.

If the content of the sin Register 160 had been larger than the content of the cos Register 162, the output of Flip-Flop 290 would have been a logic 1 and the content of the cos register would have been entered into the Divider 166 as the numerator through AND gate 294.

TABLE II

Divide Example

| | | DIGIT | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | --- | 30 | 31 | | |
| 0    | 0 | 0 | 0 | 0 | 0 | 1 | 0 | 0 | 0 | 0 | 1 | 0 | 0 | 0 | --- | 0 | 0 | | N(33×32) |
| 0  − | 0 | 0 | 0 | 0 | 0 | 1 | 0 | 0 | 1 | 1 | 1 | 0 | 0 | 0 | --- | 0 | 0 | | D(57×32) |
| | | | | | | | | | | | | | | | | | | 1 | 0 |
| 1    | 0 | 0 | 0 | 0 | 0 | 0 | 0 | 0 | 0 | 1 | 0 | 1 | 1 | 1 | --- | 1 | 1 | | R |
| 1  + | 0 | 0 | 0 | 0 | 0 | 1 | 0 | 0 | 1 | 1 | 1 | 0 | 0 | 0 | --- | 0 | 0 | | D(57×32) |
| | | | | | | | | | | | | | | | | | | 1 | 1 |
| 2    | 0 | 0 | 0 | 0 | 0 | 0 | 1 | 0 | 0 | 1 | 0 | 0 | 0 | 0 | --- | 0 | 0 | | R |
| 2  − | 0 | 0 | 0 | 0 | 0 | 1 | 0 | 0 | 1 | 1 | 1 | 0 | 0 | 0 | --- | 0 | 0 | | D(57×32) |
| | | | | | | | | | | | | | | | | | | 1 | 0 |
| 3    | 0 | 0 | 0 | 0 | 0 | 0 | 1 | 0 | 0 | 1 | 1 | 0 | 1 | 1 | --- | 1 | 1 | | R |
| 3  + | 0 | 0 | 0 | 0 | 0 | 1 | 0 | 0 | 1 | 1 | 1 | 0 | 0 | 0 | --- | 0 | 0 | | D(57×32) |
| | | | | | | | | | | | | | | | | | | 0 | 0 |
| 4    | 0 | 0 | 0 | 0 | 0 | 0 | 1 | 1 | 0 | 1 | 0 | 1 | 1 | 1 | --- | 1 | 1 | | R |
| 4  + | 0 | 0 | 0 | 0 | 0 | 1 | 0 | 0 | 1 | 1 | 1 | 0 | 0 | 0 | --- | 0 | 0 | | D(57×32) |
| | | | | | | | | | | | | | | | | | | 1 | 1 |
| 5    | 0 | 0 | 0 | 0 | 0 | 0 | 1 | 1 | 1 | 1 | 0 | 0 | 0 | 0 | --- | 0 | 0 | | R |
| 5  − | 0 | 0 | 0 | 0 | 0 | 1 | 0 | 0 | 1 | 1 | 1 | 0 | 0 | 0 | --- | 0 | 0 | | D(57×32) |
| | | | | | | | | | | | | | | | | | | 1 | 0 |

In the initial step (0), the data from the cos register (denominator "D") is subtracted from the data in the sin register (numerator "N") and the remainder "R" is stored in shift register 318. The outputs of OR gate 330 and Flip-Flop 332 are a logic 1 indicating a carry 1, since the numerator was selected as being the smaller of the two values. The output of Flip-Flop 336 is also a logic 1 therefore the quotient output "Q" of exclusive OR gate 338 is a logic 0 which is input to Flip-Flop 340. At the end of the period MT23, Flip-Flop 336 is toggled by the signal DG31 and changes state due to the logic 1 output of exclusive OR gate 316. The signal applied to the alternate input of exclusive OR gate 334 is now a logic 0 which causes the add/subtract circuit to add the content of the denominator "D" to the remainder "R" stored in Register 318 during the next step.

In the next step (step 1), the content of shift register 318 shifted by one place is added to the denominator "D" and the result "R" is placed in shift register 318. At the end of this step, the output of OR gate 330 is a logic 1 (carry 1) and the output of Flip-Flop 336 is a logic 0. The quotient output Q of exclusive OR gate 330 becomes logic 1 which is entered into Flip-Flop 340 when toggled by the signal DG31. The logic 0 stored in Flip-Flop 340 from the prior step is now transferred to Flip-Flop 342. The same procedure is repeated for Steps 2 through 5 as indicated on Table II. At the end of the fifth step (Step 5), the quotient register consisting of the division operation would take place as previously described.

Referring now to FIG. 25, there is shown a detailed circuit implementation of the Phase Angle Averaging Circuit 172, the Comparator 174 and the Accumulator 176 shown on FIG. 15. The function of the Phase Angle Averaging Circuit 172 is to insure that the angular correction of the spark advance is spread out over a series of adjustments, rather than a single adjustment, to avoid the effects of cycle to cycle variations for improving drivability, etc. This is accomplished as hereinafter described, by averaging the computed phase angle so that the detected error and computed correction signal $\phi_c$ is computed on the basis of the average detected phase angle.

The logic accomplishes averaging the phase angle signal by a low pass digital filter technique. The operation of the filter may be described by the linear first order difference equation:

$$x(kT) = au(kT) + (1-a)x(kT-T)$$

where "T" is the rate at which the computations are made, which in the preferred embodiment of the present invention is the cylinder firing rate of the internal combustion engine. "k" is a running index of integers, "(kT)" is the input to the digital filter during the "k"th "T" interval, "x(kT−T)" is the output of the digital filter during the "(k−1)"th "T" interval and "a" is a programmable constant.

The value of the programmable constant "a" may be a fixed number or may be a variable selected from a pre-programmed look-up table of stored values of engine operating parameters such as the manifold pressure (MAP), engine speed, (ROM) air flow, throttle position, coolant temperature, etc.

The value of "a" determines the filter "time constant". For example, let the input to the filter be a unit step function at k=0 and assume "a" equals $\frac{1}{4}$ i.e. (a=$2^n$), then the successive values of the filter output (x(kT−T) are $\frac{1}{4}$, $\frac{1}{4}+\frac{3}{4}(\frac{1}{4})$, $\frac{1}{4}(\frac{3}{4})+\frac{1}{4}(1-\frac{3}{4})$——. The output of the filter is graphically shown on FIG. 26 for the values a=$\frac{1}{2}$ (n=1) and a=$\frac{1}{4}$ (n=2) and x=1.

Referring back to FIG. 25, the parallel output of Shift Register 358 of the Cotangent Correction Circuit 170 shown on FIG. 23 is input to a Multiplier 368 which has its output connected to one input to AND gate 372. The Multiplex such as RCA CD-4051 manufactured by Radio Corporation of America also receives the value "a" from the Time Constant Control 370. As previously indicated, the Time Constant Control 370 may be a look-up table, comparable to the arctangent ROM 168 which outputs a signal in response to engine operating parameters such as engine speed, manifold pressure, air flow throttle position, etc. which controls the filter time constant. The output of AND gate 372 is connected to the input of a 16 bit Shift Register 388 through OR gate 376 and exclusive OR gates 378 and 386. The parallel output of shift register 388 is connected to the parallel input of a second Multiplexer 390, which is identical to Multiplexer 368, and also receives an input from the Time Constant Control 370. The serial output of Multiplexer 390 is connected to an input to AND gate 374 having its output connected to an input of OR gate 376. AND gate 372 receives the signal MT1 and TM8 at its alternate inputs while AND gate 374 receives the signal MT0 and TM8 at its alternate inputs. Exclusive OR gate 392 receives the signal MT0 at its alternate input and has its output connected to the inputs to AND gate 380 and NOR gate 282. The alternate inputs to AND gate 380 and NOR gate 382 are connected to the output of OR gate 376. The outputs of AND gate 380 and NOR gate 382 are connected to the set and reset inputs of Flip-Flop 384 having its Q output connected to an input of exclusive OR gate 386. The circuit described thus far comprises the Phase Angle Averaging Circuit 172 of FIG. 15.

The serial output of Shift Register 388 is also connected to the inputs of exclusive OR gate 396 AND gate 406 and NOR gate 408 through AND gate 394 AND gate 394 also receives the signal MT2 and TM8 at its alternate inputs. The output of exclusive OR gate 396 is connected to the input of a 16 bit Shift Register accumulator 422 through exclusive OR gates 398, 412, and 418, and to the inputs of AND gate 414 and NOR gate 416. A 16 bit shift register 400 storing a number indicative of the reference angle $\phi_R$ has its output connected to its input and to an input to AND gate 402. The signals MT2 and TM8 are received at the alternate inputs of AND gate 402. The output of AND gate 402 is connected to an alternate input of exclusive OR gate 396 and to the inputs of AND gate 406 and NOR gate 408 through inverter 404. The outputs of AND gate 406 and NOR gate 408 are connected to the set and reset inputs respectively of Flip-Flop 410 having its Q output connected to the alternate input of exclusive OR gate 398.

The circuit comprising gates 394, 396, 398, 402, 406 and 408, shift register 400, inverter 404 and Flip-Flop 410 comprises Comparator 174 on FIG. 15.

The output of shift register 422 is connected to add circuit 178 (FIG. 15) and the inputs to exclusive OR gate 412, AND gate 414 and NOR gate 416. The alternate inputs to AND gate 414 and NOR gate 416 are connected to the output of exclusive OR gate 398. The outputs of AND gate 414 and NOR gate 416 are connected to the set and reset inputs respectively of Flip-Flop 420 having its output connected to the alternate input of exclusive OR gate 418. Gates 412, 414, 416 and 418, Flip-Flop 420 and shift register 422 comprise the Accumulator 176 shown on FIG. 15.

The operation of the circuit shown on FIG. 25 is as follows: Gates 372, 374, 376, 378, 380, 382, 386 and 392 along with Flip-Flop 384 form an add/subtract circuit as previously described with reference to FIG. 20 which is operative to subtract during the period MT0 and add during the period MT1. Multiplexer 368 performs the function a u (kT) and multiplexer 390 performs the function a x (kT) as described above. When a is a constant, the time constant control 370 may be eliminated and Multiplexers 368 and 390 may be shift registers in which the data is stored in a shifted relationship representing the constant "a" such that when a=1, the data is shifted 1 place, when a=2, the data is shifted 2 places, etc.

During the time MT0 TM8 the data ax (kT−T) from multiplex 390 is subtracted from the content of shift register 388 recirculated through OR gate 378, and the data from shift register 358 is loaded into multiplexer 368. During the time MT1, TM8, the data au(kT) is added to the new content of shift register 388. At the end of MT1, TM8, the content of the shift register 388 is x(kT)=a (kT)+(1−a)×(kT−T).

The filtered phase angle or $\phi$avg is subtracted from the reference phase angle $\phi_R$ stored in shift register 400 during the time period MT2, TM8 by the subtract circuit comprising gate 396, 402, 406, and 408, inverter 404 exclusive OR gates 396 and 398 and Flip-Flop 410 and outputs at the output of exclusive OR gate 398 the difference signal $\phi$ to Shift Register 422 in the Accumulator 176. In the accumulator circuit, the difference signal $\Delta \phi$ is added to the content of shift register 422 by means of the add circuit comprising gates 412, 414, 416, and 418 and Flip-Flop 420. The sum of the difference signals $\phi_C$ is out from the output of shift register 422 to adder 178 shown on FIG. 15 where it is added to the content of Register B 142.

Figure 27:
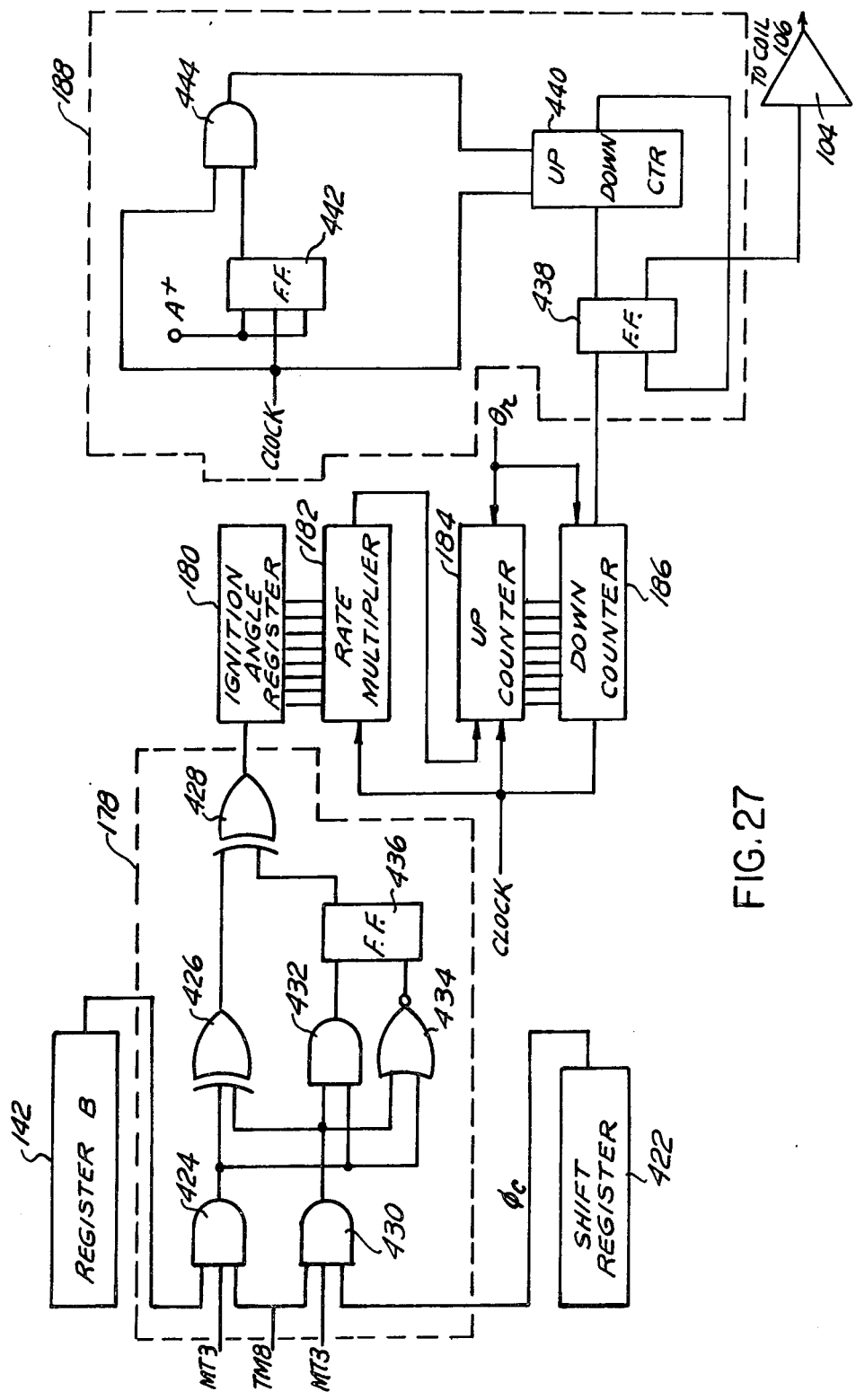
FIG. 27 is a circuit diagram of the circuit for generating the injection signal including the Dwell Circuit.

The circuit details of Add circuit 178, Ignition Angle Register 180, Rate Multiplier 182, Up Counter 184, Down counter 186 and Dwell circuit 188 are shown on FIG. 27. The signal from Register B 142 (FIG. 15) is received at the input of AND gate 424 whose output is connected to an input of the Ignition Angle Shift Register 180 through exclusive OR gates 426 and 428 and to an input of AND gate 432 and NOR gate 434. The signal $\phi_C$ from the output of Shift Register 422 (FIG. 25) is received at an input of AND gate 430. The output of AND gate 430 is connected to the alternate inputs of exclusive OR gate 426, AND gate 432 and NOR gate 434. The outputs of AND gate 432 and NOR gate 434 are connected to the set and reset inputs respectively of Flip-Flop 436. The Q output of Flip-Flop 436 is connected to the alternate input of exclusive OR gate 428. AND gates 424 and 430 receive at their alternate inputs the signals MT3 and TM8. Gates 424, 426, 428, 430, 432 and 434 and Flip-Flop 436 form a conventional add circuit. The parallel output of Shift Register 180 is input to Rate Multiplier 182 which generates an output signal having a frequency proportional to the data received from the Ignition Angle Register 180. The output of the Rate Multiplier 182 is received by Up-Counter 184. The parallel output of Up-Counter 184 is connected to the input of Down-Counter 186. Counters 184 and 186 also receive the signal $\theta_r$ which periodically resets counter 184 and transfers the counts in counter 184 to counter 186. Counter 186 is counted down by clock pulses. The zero (0) count output of Down-Counter 186 is connected to the set input of Flip-Flop 438 which has its Q output connected to the down input of Up-Down counter 440. The zero (0) count output of UpDown Counter 440 is connected to the reset input of Flip-Flop 438. The ignition signal "I" output of the $\overline{Q}$ output of Flip-Flop 438 is transmitted to Amplifier 104 (FIG. 15). The clock signals are received directly at the down clock input of the Up-Down Counter 440 and at the toggle input of Flip-Flop 442 which in combination AND gate 444 comprises a divide by two circuit. The clock signal, divided by two, from the output of AND gate 444 is connected to the up clock input of the Up-Down Counter 440.

Figure 28:
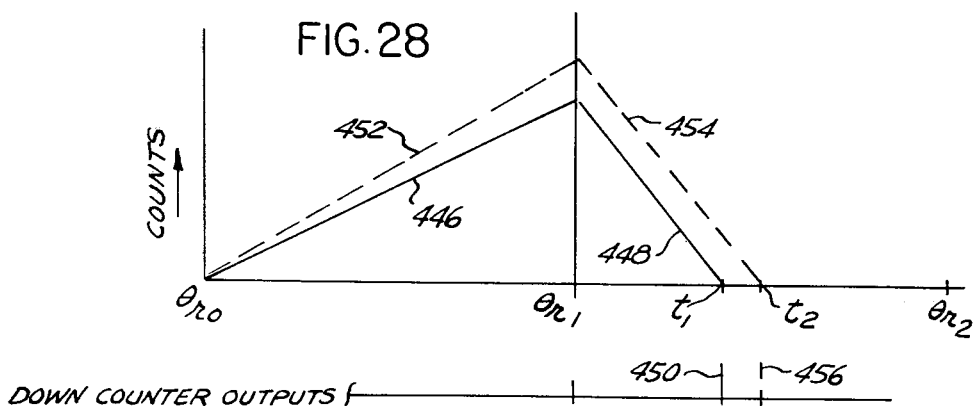
FIG. 28 is a graphical illustration of the conversion from ignition angle to time delay.

The operation of the circuit is as follows: During the time MT3, TM8 the correction signal $\phi_C$ from Accumulator 176 is added to the content of Register B 142, through the Add Circuit 178 and stored in Ignition Angle Register 180. The content of the Ignition Angle Register 180 is transmitted to the Rate Multiplier 182 which generates output pulse signals having a frequency determined by the value of the data received from the Ignition Angle Resister 180. The pulse signals generated by the Rate Multiplier 182 are received by the Up-Counter 184 which counts up the number of pulses received during the interval between two successive crankshaft reference signals $\theta_r$. The number of pulses stored in the Up-Counter is proportional to the content of the Ignition Angle Reference Register 180 and inversely proportional to the engine speed. The crankshaft reference signal $\theta_r$ signifies the end of the count up period and transfers the number of stored pulses to the Down-Counter 186 then resets the Up-Counter 184 back to zero. In the next interval, the Down-Counter 186 is counted down by clock signals and generates a signal when it reaches zero counts. The operation of the Up-Counter 184 and Down-Counter 186 is graphically illustrated on FIG. 28. In the first interval from $\theta_{r0}$ to $\theta_{r1}$, the number of counts stored in the Up-Counter 184 increases at a rate proportional to the content of the ignition angle register 180 as illustrated by the solid line 446. At the time $\theta_{r1}$ coincident with the next sequential crankshaft reference signal $\theta_r$, the content of the Up-Counter 184 is transferred to the Down-Counter 186 which counts down at a fixed rate determined by the frequency of the clock pulses as illustrated by solid line 448. At a time "$t_1$" after the signal $\theta_{r1}$, the Down-Counter 146 reaches zero counts and generates an ignition signal 450 as illustrated. The dashed lines 452 and 454 represent the content of the Up-Counter 184 and Down-Counter 186 for an increased value of the content of Ignition Angle Register 180 such as may be occasioned by the addition of the phase correction signal $\phi_c$ to the content of Register B 142. The Down-Counter 186 reaches a zero (0) count at a time "$t_2$" and generates an ignition signal 456 which occurs at a time later than $t_1$. In this manner, the ignition angle stored in the ignition angle Register 180 is converted to a time delay from the crankshaft reference signal $\theta_{r1}$.

It is obvious that as the engine speed increases, the time between $\theta_{r0}$ and $\theta_{r1}$ decreases, and therefore, the number of counts transferred from the Up-Counter 184 to the Down-Counter 186 is decreased resulting in a decrease in the time between the crankshaft reference signal $\theta_{r1}$ and the time when the Down-Counter 186 reaches zero (0) counts, retarding the time at which the ignition signal is generated.

The operation of the Dwell Circuit 188 is as follows: Prior to the generation of the signal at the output of the Down-Counter 186, Flip-Flop 438 is in its reset state generating a positive signal at its Q output permitting amplifier 104 to energize the coil 106. The pulse signal from Down-Counter 186 triggers Flip-Flop 438 to change state, terminating the signal at its Q output de-energizing amplifier 104 and coil 106 causing the field in coil to collapse and generate a high voltage signal energizing the spark plug as is known in the art.

Figure 29:
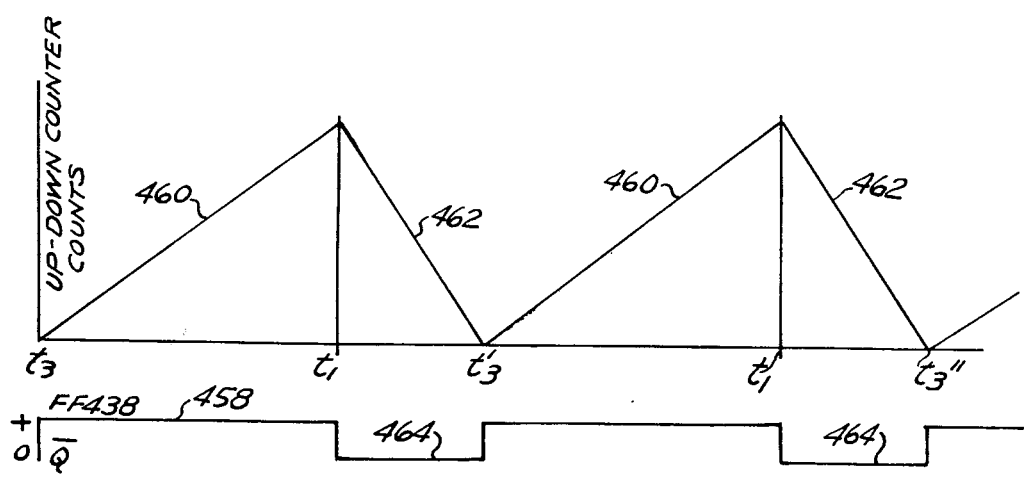
FIG. 29 is a graphical illustration of the operation of the dwell circuit.

In the reset state, Flip-Flop 438 also generates a logic 0 signal at its Q output which causes the Up-Down Counter 440 to count up response to the pulses generated at the output of AND gate 444. As previously indicated, the signal at the output of AND gate 444 is the clock signal divided by 2. The Up-Down Counter counts up until Flip-Flop 438 receives at its set input the ignition signal generated at the output of Down-Counter 186. The ignition signal places Flip-Flop 438 in the set state terminating the signal generated at the $\overline{Q}$ output as previously described and generates a positive or logic 1 signal at its Q output. The logic 1 signal causes Up-Down Counter 440 to start counting down in response to the clock pulses. When the Up-Down Counter 440 reaches zero (0) counts, it generates a pulse which resets Flip-Flop 438 terminating the logic 1 signal at its Q output and generates a positive signal at its $\overline{Q}$ output re-energizing amplifier 104 and coil 106. The dwell circuit remains in this state until the DownCounter 186 once more generates an ignition signal when it reaches zero (0) counts. In this manner, amplifier 104 is de-energized after each ignition signal for a period proportional to the engine speed. The operation of the dwell circuit is illustrated on FIG. 29. Referring to FIG. 29, Flip-Flop 438 is reset at time $t_3$ which causes its $\overline{Q}$ output 458 to become positive energizing amplifier 104 and coil 106. At the same time, Up-Down Counter 440 starts to count at one half ($\frac{1}{2}$) the rate of the clock as illustrated by line 460. The ignition signal "I" generated at the time $t_1$ sets Flip-Flop 438 and its $\overline{Q}$ output goes to a logic 0 as indicated by line segment 464, simultaneously Up-Down Counter starts to count down at the clock rate until it reaches zero (0) counts at $t_3'$. The Up-Down Counter now generates a signal resetting Flip-Flop 438 so that its $\overline{Q}$ output becomes a positive or logic 1 signal once again re-energizing amplifier 104 and coil 106. The dwell circuit remains in this state until the next ignition signal occurs at time $t'_1$ which resets Flip-Flop 438 until the Up-Down Counter again reaches zero (0) counts at time $t'_3$. In this manner, the ratio of time "on" to time "off" of amplifier 104 remains a fixed number. In the preferred embodiment, this ratio is 2:1, however, by appropriate selection of different rates of the clock signals counting the Up-Down Counter 440 up and down, other time ratios can be obtained.

It would be obvious to one skilled in the art that the parameters of the circuit could be adjusted such that instead of generating an ignition signal for energizing the spark plugs in a spark ignited engine; the circuit is capable of generating injection timing signals for either a spark ignited or diesel engine. The disclosed closed loop timing circuit could advance or retard the time at which the fuel is injected into the engine so that the phase angle of the generated period waves would be optimized.

CLOSED LOOP FUEL CONTROL SYSTEM

Figure 30:
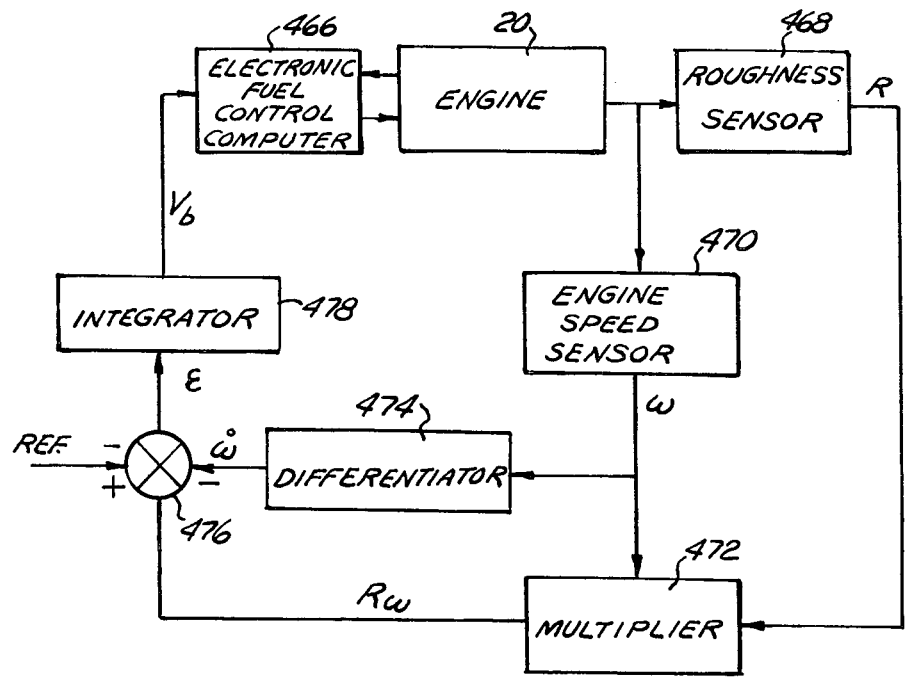
FIG. 30 is a block diagram of the Closed Loop Engine Roughness Control.

The disclosed fuel control system is closed about the engine by detecting the cylinder to cylinder variations in the rotational velocity of the flywheel and is an improvement over the lean limit roughness control system disclosed by Taplin et al in U.S. Pat. No. 3,789,816 discussed in the prior art section. The Taplin et al patent, having a common assignee is expressly incorporated by reference herein. The basic structure of the closed loop fuel control system is shown in FIG. 30. Referring to FIG. 30, an Engine 20 receives air and fuel in response to manual inputs and environmental parameters as discussed with reference to FIG. 8. The Engine 20 may be a diesel or spark ignited internal combustion engine having one or more cylinders. The quantity of fuel being supplied to the engine is calculated by an Electronic Fuel Control Computer 466, of conventional design, in response to inputs received from engine. A Roughness Sensor 468 generates a roughness signal "(R)" having a value indicative of the variations in the rotational velocity of the engine's flywheel on a cylinder to cylinder basis. An Engine Speed Sensor 470 generates a speed signal (w) indicative of the engine's speed. The roughness signal R and the engine speed signal w are multiplied in a Multiplier circuit 472 to generate a normalized roughness signal R (w) having a value indepedent of engine speed. The engine speed signal w is also differentiated in a Differentiator Circuit 474 to generate a transient mode correction signal $\dot{w}$. The speed normalized roughness signal R(w) and the transient mode correction signal w are summed with a reference signal (Ref) in a Sum Circuit 476 to generate a sum signal $\epsilon$ indicative of the sum of the speed normalized roughness signal R(w), the reference signal and the first derivative of the speed signal $\dot{w}$. The sum signal $\epsilon$ is received by an Integrator 478 which outputs a bias signal $V_b$ which is indicative of the integrated value of the sum signal $\epsilon$. The Electronic Fuel Control Computer 466 responds to the value of the bias signal $V_b$ and increases or decreases the quantity of fuel being delivered to the engine to maintain the engine roughness at a predetermined value. For fuel economy, the predetermined roughness value may be a roughness indicative of the engine operating at its lean limit, or any other value desired such as may be required for the efficient operation of a catalytic converter.

Figure 31:
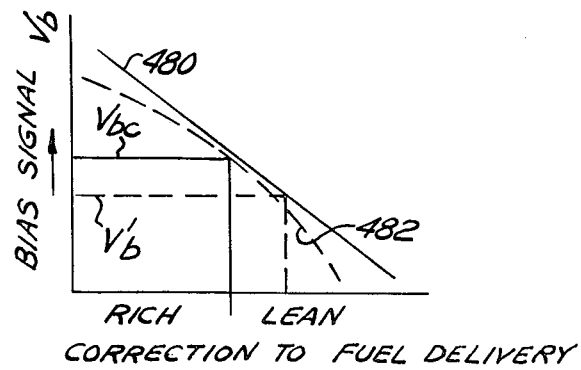
FIG. 31 is a graph showing the effect of the bias signal on the fuel delivery.

The operation of the closed loop system shown on FIG. 30 will be discussed with reference to the graph shown on FIG. 31. Referring first to the graph shown on FIG. 31, the Electronic Fuel Conrol Computer 466 is calibrated to deliver a predetermined quantity of fuel to the engine in response to the various inputs including the bias signal $V_b$ having a predetermined value $V_{bc}$ as indicated on the graph of FIG. 31. The quantity of fuel delivered to the engine in response to the value of the bias signal $V_b$ will increase or decrease the quantity of fuel delivered to the engine as shown by the line 480. The line 480 may be a linear function of $V_b$ as shown or may be a nonlinear function of $V_b$ as illustrated by dashed line 482. At the predetermined value $V'_b$ of the bias signal $V_b$, the engine operates at a desired roughness level. A bias signal $V_b$ having a value less than $V'_b$ is indicative of a smooth running engine receiving a quantity of fuel greater than desired. The electronic fuel control computer responds to the lower value of the bias signal $V_b$ and decreases the quantity of fuel being delivered to the engine. Conversely, when the value of the bias signal $V_b$ is greater than the value $V'_b$, the quantity of fuel being delivered to the engine is less than desired and causes the electronic fuel control computer to increase or enrich the air fuel mixture being delivered to the engine.

Returning now to FIG. 30, the engine receives signals from the Electronic Fuel Control Computer 466 which causes a quantity of fuel to be delivered to the engine determined by the manual, operational, and environmental inputs received as well as the value of the bias signal $V_b$. The fuel burned in each of the cylinders generates torque impulses which incrementally change the rotational velocity of the engine's crankshaft as shown on FIG. 7. The Roughness Sensor 468, sensing the rotational velocity of the crankshaft over identical angular increments for each torque impulse generated by firing of the individual cylinders, generates the roughness signal R. The roughness signal R is indicative of the difference in the rotational velocity of the crankshaft resulting from sequential torque impulses.

The value of the roughness signal R varies inversely as a function of engine speed, therefore, roughness signal R is multiplied in Multiplier 472, with the speed signal (w) received from the Engine Speed Sensor 470 to generate a speed normalized roughness signal R(w). The reference signal (REF) is then subtracted from the roughness signal to generate a sum signal $\epsilon$ indicative of the difference between the measured roughness level and a predetermined roughness level. The predetermined roughness level of the reference signal may be the measured roughness with the Electronic Control Unit 466 delivering fuel to the engine at its calibration point or any other selected value of roughness including the roughness level of the engine operating at its lean limit. The sum signal $\epsilon$ is then integrated in Integrator 474 which generates the bias signal $V_b$ having a value indicative of the integrated value of the sum signal. The bias signal $V_b$ is received by the Electronic Fuel Control Computer 466 and causes the electronic fuel control computer to increase or decrease the quantity of fuel being delivered to the engine in accordance with the value of the bias signal as shown on FIG. 31.

Figure 32:
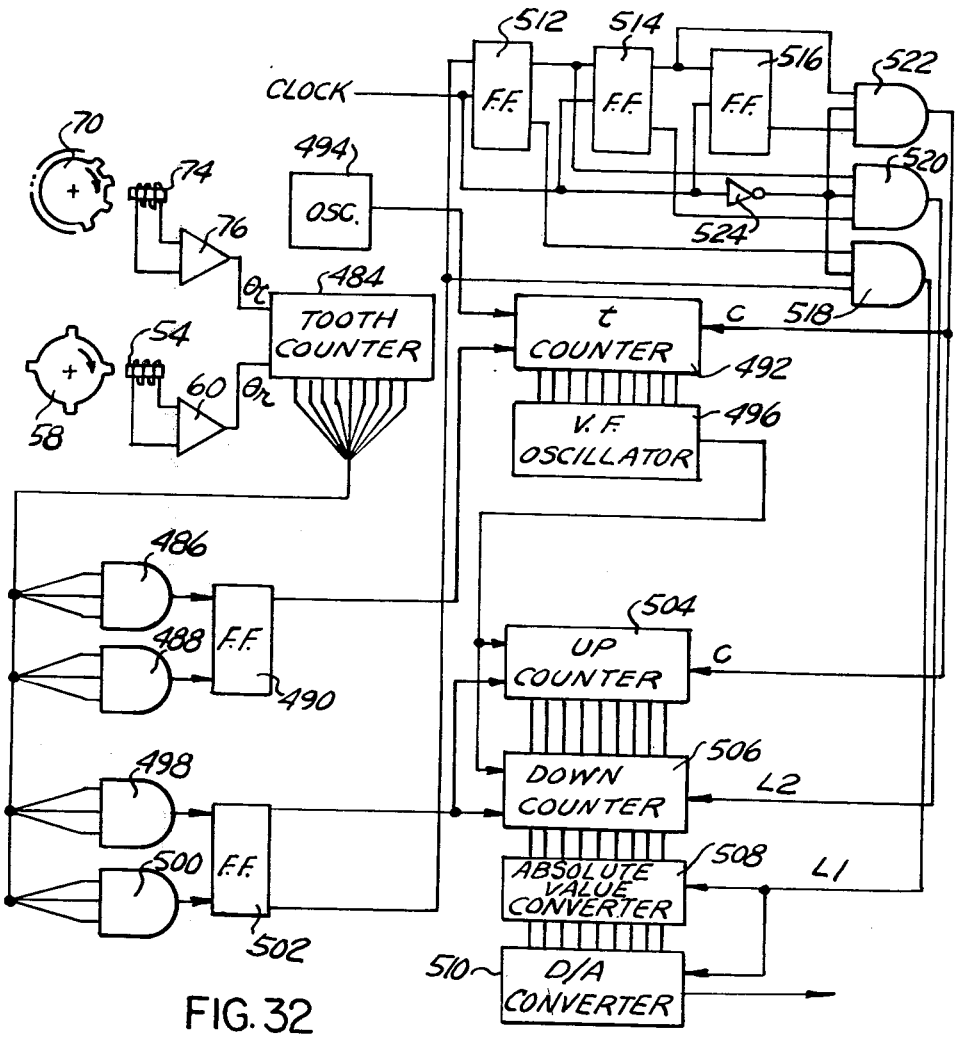
FIG. 32 is a circuit diagram of the Roughness Sensor.

The details of the roughness sensor 468 are shown on FIG. 32. As previously described with reference to FIG. 11, a reference signal $\theta_r$ is generated at the output of amplifier 60 in response to each tooth on wheel 58 attached to the engine's crankshaft passing magnetic pickup 54. An eight cylinder engine is assumed therefore wheel 58 has four teeth spaced 90 degrees apart such that a reference signal $\theta_r$ is generated once for each cylinder as the crankshaft rotates makes two complete revolutions. For a 6 or 4 cylinder engine, the number of teeth on wheel 58 would be 3 or 2 respectively. The reference signal $\theta_r$ may be generated as each cylinder reaches its top dead center position prior to the power stroke or at any other predetermined angle. In a like manner, amplifier 76 generates a tooth signal $\theta_t$ each time a tooth on the engine's ring gear 70 passes magnetic pickup 74. The ring gear may have for example 160 teeth such that 40 tooth signals will be generated between each referenc signal $\theta_r$. Each tooth signal represents a 2.5 degree rotation of the crankshaft.

A tooth counter 484 is cleared by each reference signal $\theta_r$ and thereafter counts the number of tooth signals received from amplifier 76. AND gates 486, 488, 498 and 500 are connected to predetermined bit locations in the tooth counter in a known manner and generate output signals when predetermined number of tooth signals $\theta_t$ are counted. The outputs of AND gates 486 and 488 are connected to the set and reset inputs of Flip-Flop 490 while the outputs of AND gates 498 and 500 are connected to the set and reset inputs of Flip-Flop 502. The output of Flip-Flop 490 is a positive signal during the angular interval "a" while the Q output of Flip-Flop 502 is a positive signal during the angular interval "A" as shall be explained hereinafter. AND gates 486, 488, 498 and 500 along with Flip-Flops 490 and 492 comprise a conventional decoder which may be purchased commercially or fabricated from discrete components as shown.

The Q output of Flip-Flop 490 is connected to enable the input of a Time t counter 492. High frequency clock signals generated by Oscillator 494 are counted in the Time t Counter during the angular interval "a". The content of the Time t Counter 492 is transmitted in parallel to a Variable Frequency (V.F.) Oscillator 496 of a type known in the art which generates an output signal having a frequency "f" inversely proportional to the content of the Time t Counter 492. The output of the V.F. Oscillator 496 is connected to the count inputs of Up-Counter 504 and 506 respectively. The Q output of Flip-Flop 502 is connected to enable the inputs of Up-Counter 504 and Down-Counter 506 respectively. The content of Up-Counter 504 is connected in parallel to Down-Counter 506 and the content of Down-Counter 506 is connected in parallel to an Absolute Value Converter 508. The output of the Absolute Value Converter is connected in parallel to a Digital to Analog (D/A) Converter 510.

The $\overline{Q}$ output of Flip-Flop 502 is connected to an input to AND gate 518 and to the D input of Flip-Flop 512. Flip-Flop 512 has its Q output connected to the D input of Flip-Flop 514 and an input to AND gate 520 and its $\overline{Q}$ output connected to an an alternate input of AND gate 518. The Q output of Flip-Flop 514 is connected to the D input of Flip-Flop 516, and an input to AND gate 522. Its $\overline{Q}$ output is connected to an alternate input of AND 520. The Q output of FlipFlop 516 is connected to an alternate input to AND gate 522. Flip-Flops 512, 514 and 516 are "D" type flip-flops toggled by a clock signal generated elsewhere in the system. The complement of the clock signal is applied to alternate inputs of AND gates 518, 520 and 522 from the output of inverter 524. The output of AND gate 518 is connected to the load input of the Absolute Valve Converter 508 and the D/A Converter 510, the output of AND gate 520 is connected to the load input of Down-Counter 506 and the output of Flip-Flop 522 is connected to the clear input of Tooth Counter 492 and Up-Counter 504.

Figure 33:
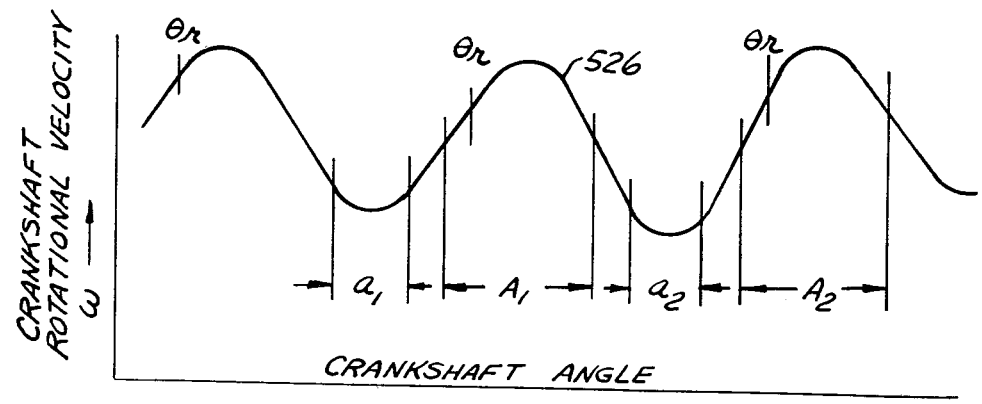
FIG. 33 is a waveform used in the description of the Roughness Sensor.

The operation of the Roughness Sensor 468 is discussed with reference to FIG. 32 and the waveform shown on FIG. 33. Referring first to FIG. 33, the sinusoidial wave 520 represents the incremental changes in the rotational velocity (w) of the crankshaft as each cylinder is fired producing a torque impulse. Engine roughness is the difference between the incremental changes in the rotational velocity of the crankshaft resulting from each torque impulse. The burning rate of a air/fuel mixture at or near stoichiometric is comparatively uniform therefore, torque impulses produced by the individual cylinders are approximately equal. As the air fuel mixture is progressively leaned out the burning rate of the air fuel mixture becomes progressively more irregular resulting in detectable differences in the incremental changes in the rotational velocity of the crankshaft resulting from the individual torque impulses.

The incremental changes can readily be detected by measuring the time T it takes the crankshaft to rotate through a predetermined angle "A" as shown on FIG. 33. The time T is a function of both the average rotational velocity of the crankshaft and the incremental change due to the torque impulse. The magnitude of the incremental changes in the rotational velocity caused by the torque impulses can be normalized by dividing the measured incremental velocity of the crankshaft in the angular interval A by the average rotational velocity. The average rotational velocity is determined by detecting the time t it takes the crankshaft to rotate through a predetermined angle "a" just prior to the angular interval A. The quotient T/t is a normalized value of the rotational period of the crankshaft in the angular interval A produced by the individual torque impulses. The incremental change in the rotational periods between two sequential torque impulses T or roughness R can be computed with reasonable accuracy from either:

$$R = |(T_1/t_1) - (T_2/t_2)|$$

or $$R = |(T_1 - T_2)|/t_{avg}$$

where $$t_{avg} = (t_1 + t_2)/2$$

Referring now to FIG. 32, the reference signal $\theta_r$ and the tooth signal $\theta_t$ generated at the outputs of amplifiers 60 and 76 respectively are received at enable and count inputs of Tooth Counter 484. The Tooth Counter 484 counts the number of teeth that pass magnetic pickup 76 after each reference signal $\theta_r$. After counting a number of teeth indicative of the beginning of the angular interval "a", AND gate 486 is enabled generating a signal placing Flip-Flop 490 in the set state. This causes a signal to be generated at the Q output of Flip-Flop 490 enabling Time t Counter 492. When the tooth count in Tooth Counter 484 reaches a number indicative of the end of angular interval "a" AND gate 488 generates a signal resetting Flip-Flop 490 terminating the enable signal being applied to the Time t Counter. In a like manner AND gate 498 sets Flip-Flop 502 at the beginning of the angular interval A and AND gate 500 resets Flip-Flop 502 at the end of angular interval A. The Q output of Flip-Flop 502 enables Up-Counter 504 and Down-Counter 506 during the angular interval "A".

When enabled the Time t Counter 492 receives clock pulses from Oscillator 494 and stores a number indicative of the time (t) it took the crankshaft to rotate through the angular interval $a_1$. This number is transferred to the Variable Frequency Oscillator 496 which generates an output signal having a pulse frequency "f" inversely proportional to time "t"; i.e. f=K/t.

The output pulses of the Variable Frequency Oscillator are counted and stored in Up-Counter 504 during the angular interval A, in response to the enable signal generated at the Q output of Flip-Flop 502. At the end of the angular interval A, the content of the Up-Counter 504 is a number indicative of the value of $T_1/t_1$, which is transferred to the Down-Counter 506 in response to a load signal $L_2$ generated at the output of AND gate 520.

During the next torque impulse, the Time t Counter 492 stores a number indicative of the time $t_2$ it took the crankshaft to rotate through angle $a_2$ and the output frequency of the Variable Frequency Oscillator 496 is inversely proportional to $t_2$. Up-Counter 504 is again counted up during the angular interval $A_2$ and stores a number indicative of the value $T_2/t_2$ while Down-Counter 506 previously loaded with the number indicative of $T_1/t_1$ is counted down at a rate proportional to $K/t_2$ during the same interval. At the end of the angular interval $A_2$ the content of Down-Counter 506 is a number indicative of $(T_1/t)-(T_2/t_2)$ which is converted to an absolute value in the Absolute Value Converter 508 then transferred to the Digital to Analog convertor 510 in response to a signal from the output $L_1$ of AND gate 518. The Digital to Analog Converter 510 converts the digital number to an analog signal having a value indicative digital number received.

The load sequencing signals $L_1$ and $L_2$ and clear signal C generated at the outputs of AND gates 518, 520, and 522 are respectively initiated at the end of each angular interval A. Flip-Flop 502 is reset at the end of each rotational interval A and generates a signal at its $\overline{Q}$ output which is applied to the D input of D type Flip-Flop 512 and an input to AND gate 518. AND gate 518 also receives an input at one of its alternate inputs from the $\overline{Q}$ output of Flip-Flop 152 prior to being toggled by the leading edge of clock signal and the inverted input of the clock signal from inverter 524. AND gate 518 therefore will generate load signal $L_1$ causing the content of the Absolute Value Converter 508 to be loaded into the D/A Converter 510 and the content of Down-Counter 506 to be loaded into the Absolute Value Counter 508 during the first negative or logic 0 clock pulse following the end of the rotational interval A. The leading edge of the first positive clock pulse toggles Flip-Flop 512 terminating the output signal at its $\overline{Q}$ output disabling AND gate 518 until Flip-Flop 502 is once again reset from its set to its reset state. The Q output of Flip-Flop 512 is now a positive signal which enables one input to AND gate 520, which also receives the positive signal at one of its alternate inputs from the $\overline{Q}$ output of Flip-Flop 514. The next sequential negative or logic 0 clock signal is inverted by inverter 524 and enables AND gate 520 to generate load signal $L_2$ causing Down-Counter 506 to be loaded with the content of Up-Counter 504.

AND gate 522 is energized by the outputs of inverter 524, the Q output Flip-Flop 514 and the $\overline{Q}$ output of Flip-Flop 516 to generate a clear signal "c" in response to the third negative clock pulse following the end of interval "A". The output of AND gate 522 clears the Time t Counter 492 and Up-Counter 504 after the data transfer is complete.

An alternative circuit for performing the same function is shown in FIG. 34. A signal generator 528 receives the reference signal $\theta_r$, the tooth signal $\theta_t$ and clock signal and generates the required sequencing signals such as the load and clear signals as well as the signal t and T as described with reference to FIGS. 32 and 33. The t signals are applied to two Up-Counters 530 and 532. The parallel output of Up-Counter 532 is connected to the parallel input of Shift Register 534. The serial output of Shift Register 534 taken from the $n-1$ bit location is connected to the denominator input of a Divide Circuit 538. Divide Circuit 538 is of the type illustrated on FIG. 23 and discussed relative thereto. As previously discussed relative to FIG. 32, the T signal is applied to the enable inputs of Up-Counter 504 and Down-Counter 506 which in this particular arrangement receives clock signals at their respective count inputs. The parallel output is connected to the parallel inputs to Absolute Value Converter 536 which has its serial output connected to the numerator input to the Divide Circuit 538. The quotient of the divide operation is stored in a Quotient Register 540 having its parallel output connected to a Digital to Analog (D/A) Converter 510 which performs the same function as discussed relative to FIG. 32.

The operation of the circuit is discussed with respect to the waveform shown on FIG. 33.

Referring to FIG. 33, the signal t is generated by the Signal Generator 528 during the angular interval "a" and Up-Counter 530 stores a number $t_1$ indicative of the time it took the crankshaft to rotate through the angle $a_1$. Subsequently, the T signal is generated during the angular interval "A", and stores a number $T_1$ indicative of the time it took the crankshaft to rotate through the angular interval "$A_1$". At the end of the angular interval "$A_1$", the content of Up-Counter 530 is transferred in parallel to Up-Counter 532 and the content of Up-Counter 504 is transferred to Down-Counter 506 in response to a load signal generated by the Signal Generator 528. During the angular interval "$a_2$", Up-Counter 530 is again counted up and stores a number $t_2$ indicative of the time it took the crankshaft to rotate through angular interval "$a_2$". Up-Counter 532 is also counted up during the angular interval "$a_2$" and stores a number $t_1+t_2$ indicative of the time it took the crankshaft to rotate through the angular intervals "$a_1$", and "$a_2$". In a like manner, the content of Up-Counter 504 is a number indicative of the time $T_2$ it took the crankshaft to rotate through the angular interval "$A_2$" and the content of Down-Counter 506 is a number $T_1-T_2$ indicative of the difference between $T_1$ and $T_2$.

The content of Down-Counter 506 $T_1-T_2$ is converted to an absolute value in Absolute Value Converter 536 then divided by the content of Shift Register 534 divided by two in the Divide Circuit 538. The content of Shift Register 534 is divided by two (2) by serially extracting the content of Shift Register 534 from the $n-1$ bit location. The value entered into the denominator of the Divide Circuit is the average value of t in the two interval "$a_1$" and "$a_2$" such that $t_{avg}=(t_1+t_2)/2$. Although this average value of t has been found to be adequate in practical applications. If desired, the average of 4 consecutive angular intervals "a" may be taken by adding more Up-Counters, such as Counters 530 and 532, and taking the output from the appropriate bit location of Shift Register 534. For example, the average of 4 angular intervals "a" would be taken from the $N-2$ bit location, etc. The quotient of the divide operation is stored in the Quotient Register 540 and is transferred to the Digital to Analog Converter 510 at the completion of the divide operation.

In particular applications directed to specific engines, it is desirable to use a roughness signal which is a second difference of the roughness signals generated by the circuits shown on FIGS. 32 and 34. Considering the roughness signals $R_1=(T_1-T_2)/t_{avg}$ and $R_2=(T_2-T_3)/t_{avg}$, the second difference is the difference between $R_1$ and $R_2$ such that the roughness is $R=(R_1-R_2)$ The circuit for generating a roughness signal indicative of the second difference is shown on FIG. 35. Referring to FIGS. 32 and 35, the first difference, i.e. $(T_1-T_2)/t_{avg}$, is stored in the Down-Counter 506 as shown on FIG. 32. As would be obvious to one skilled in the art, the first difference would be stored in the Quotient Register 540 of FIG. 34. The number indicative of the first, first difference $R_1$ is transferred in the parallel to shift register 542 where it is temporarily stored. The second first difference $R_2=(T_2-T_3)\ t_{avg}$ is generated and stored in the Down-Counter 506 at the end of the third interval $A_3$. The serial outputs of the Down-Counter 506 and Shift Register 542 are input to a Subtract Circuit 544 having its output connected to a Shift Register 546. The parallel output of the Shift Register 546 is connected to an Absolute Value Converter 548 having its serial output connected to a Digital Low Pass Filter 550. The output of the Digital Low Pass Filter 550 is connected in parallel to the input of the Digital to Analog Converter 510.

The operation of the circuit is as follows: first difference $R_1=(T_1-T_2)/t_{avg}$ is transferred to the first difference store, Shift Register 542. At the end of a third rotational interval $A_3$, the Down-Counter 506 stores the second first difference $R_2=(T_2-T_3)/t_{avg}$ which is subtracted from the first first different $R_1=(T_1-T_2)/t_{avg}$ in the Subtraction Circuit 544 and the second difference $R^*=R_1-R_2$ is stored in the second difference store, Shift Register 546. Shift Register 542 is then cleared and the new content of Down-Counter 506 is placed in Shift Register 542.

Since the second difference number may have a positive or negative value, it is converted to an absolute value in the Absolute Value Converter 548. Basically, the Absolute Value Converter 548 is of a known type which converts a negative value to a positive value by storing the complement of the negative values. The absolute value of the second difference $R^*$ may be filtered to remove erratic changes in its value or to smooth out oscillatory fluctuation by the digital low pass filter 550 of the type illustrated on FIG. 25 and discussed relative thereto. The filtered second difference may then be converted to an analog signal by the Digital to Analog Converter 510.

It is to be noted, that where the Roughness Feedback Loop shown on FIG. 30 digitally performs the illustrated functions, the Analog to Digital Converter 510 would not be required.

Figure 36:
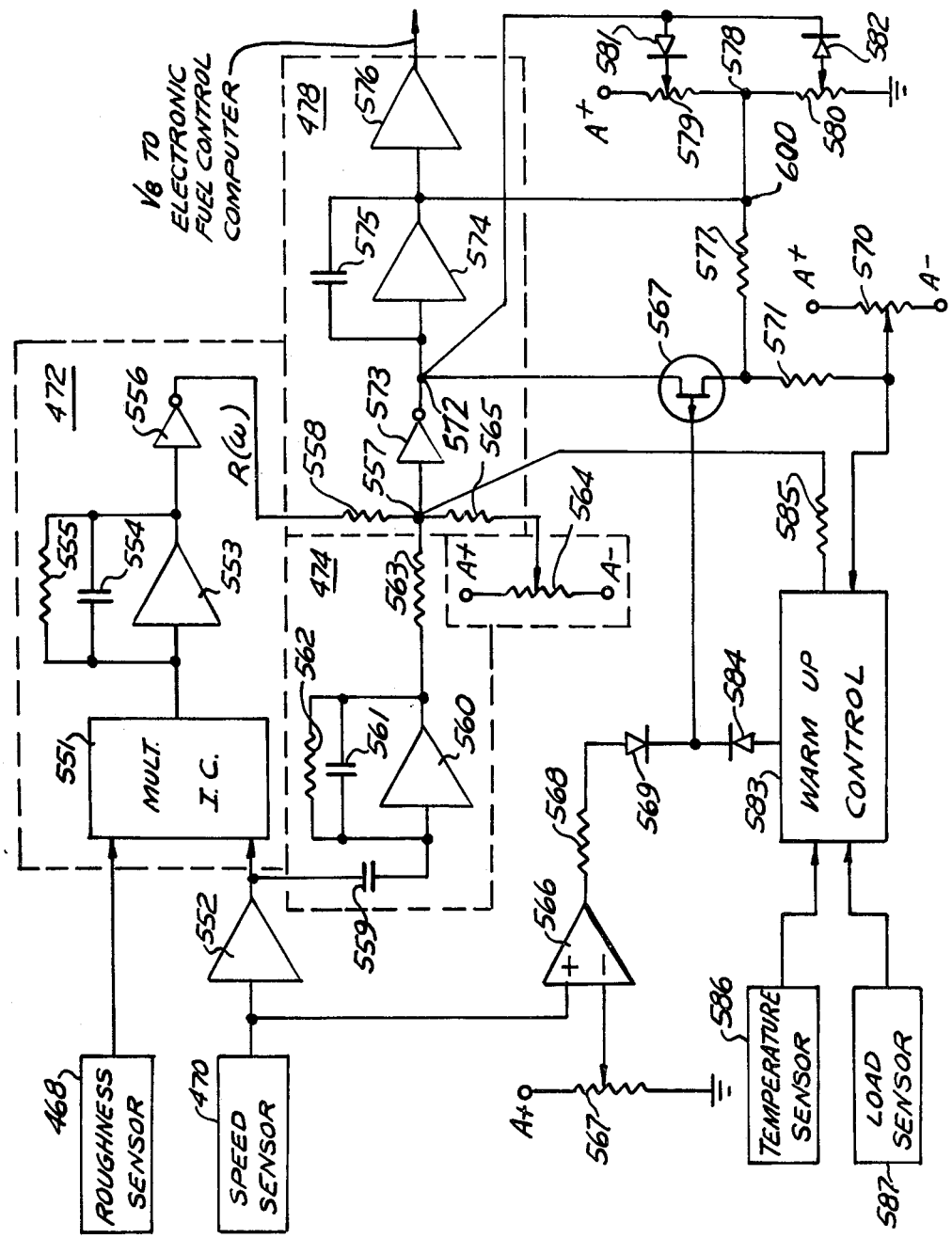
FIG. 36 is an analog circuit implementation of the Closed Loop Engine Roughness Control.

The details of an analog roughness feedback loop of the type shown on FIG. 30 are illustrated on FIG. 36. Referring to FIG. 36, the output of the roughness sensor 468, such as shown on FIGS. 32, 34 and 35, is connected to one input of an integrated circuit Multiplier 552, such as Monolythic 4 Quadrant Multiplier, type MC 1949 manufactured by Motorola Corporation of Schaumburg, Ill. The output of the Speed Sensor 470 is connected to the other input of the integrated circuit Multiplier 551 through a non-inverting amplifier 552. The output of the Multiplier 551 is connected to a current to voltage circuit comprising amplifier 553, capacitance 554 and resistance 555. The output of amplifier 553 is connected to an inverter 556 having its output connected to summation junction through a resistance 558.

The output of amplifier 552 is also connected through capacitance 559, to the input of differentiator circuit 474 comprising amplifier 560, capacitance 561 and resistance 562. The differentiated output of amplifier 560 is also connected to the summation junction 557 through a resistance 563. A reference signal generating potentiometer 564 connected between positive and negative terminals designated A+ and A−, of a voltage source has its tap or slider connected to the summation junction 557 through a resistance 565. The symbols A+, A− and ground as used here and other places in the circuit diagram have their conventional meaning and denote fixed potentials received from a regulated source of electrical power having the designated polarity.

The output of the Speed Sensor 470 is also connected to the positive input of a comparator 566 The slider of a speed reference potentiometer 567 connected between A+ and ground is connected to the negative input of Comparator 566. The output of the Comparator 566 is connected to the gate of a p channel FET transistor 567 through a current limiting resistance 568 and a diode 569. The source electrode of the FET transistor 567 is connected to the slider of an initial condition potentiometer 570 connected between A+ and A− through a resistance 571. The drain electrode of the FET transistor 567 is connected to a second summation junction 572. An inverter 573 is connected between summation junctions 557 and 572.

The summation junction 572 is connected to integrator circuit 478 comprising amplifier 574 and capacitance 575. The output of amplifier 574 is connected to non-inverting amplifier 576 and to the slider of the initial condition potentiometer 571 through feedback resistance 577 and resistance 571. The output of amplifier 574 is also connected to a junction 600 between potentiometers 579 and 580 serially connected between A+ and ground. The sliders of potentiometers 579 and 580 are connected to the summation junction 572 through diodes 581 and 582 respectively. The gate of FET transistor 567 is also connected to a Warm Up Control 583 through a diode 584. A second output of the Warm Up Control 583 is connected to junction 557 through a resistance 585.

The Warm-Up Control 583 receives inputs from a Temperature Sensor 586, a Load Sensor 587 and from the slider of the initial condition Potentiometer 570. The details of the Warm-Up Control 583 are shown on FIG. 37 and shall be discussed relative thereto. Briefly the Warm-Up Control 583, in response to signals from the Temperature Sensor 586 indicative of a temperature below a predetermined temperature increases the value of the signal at the summation junction 557 as a function of the engine's temperature such that output signal $V_b$ will cause the electronic fuel control computer to deliver an increased quantity of fuel to the engine when its temperature is below the predetermined temperature. The Warm Up Control 584 further in response to the Load SEnsor 587 will change the value of the bias signal $V_b$ such that the engine will receive a greater quantity of fuel during the warm upperiod when a load is applied to the engine than the engine receives when it is operating under a no load condition.

Returning to FIG. 36 the operation of the circuit is as follows: The output of the Roughness Sensor 468 and the output of Speed Sensor 470 amplified by noninverting amplifier 552 are multiplied in Multiplier 551 which generates a current signal having a value indicative of the product of the two input signals. The current signal is converted to a voltage signal at the output of amplifier 553 having a value inversely proportional to the received current signal. The inverted voltage signal is reinverted by inverter 556 to generate at its output a roughness signal R(w) having a value directly proportional to the product of the roughness and speed signals. The roughness signal R(w) is summed with the negative reference signal generated at the slider of potentiometer 564. The circuit constants, such as the gain of amplifier 553 and inverter 556 and the value of the reference signal generated at the slider of Potentiometer 564 are selected to provide a sum signal having a predetermined value when the engine roughness signal is indicative of the engine operating at a predetermined roughness level, such as the lean limit. This sum signal is inverted by inverter 573 and integrated by the integrator circuit 478 comprising amplifier 574 and capacitance 575. The output of amplifier 574 is a signal indicative of the integrated value of the sum signal. The integrated sum signal is summed with the initial condition signal generated slider of the initial condition potentiometer 570, then amplified by operational amplifier 576 to generate the bias signal $V_b$. The magnitude of the input signal to amplifier 574 is limited by diodes 581 and 582 connected to the sliders on potentiometers 579 and 580 respectively. When the voltage at summation point 572 exceeds the potential at the sliders of potentiometer 579, diode 581 conducts preventing the signal from exceeding the preselected value. In a like manner, when the signal at summation point 572 is less than a predetermined value, diode 582 conducts maintaining the value of the signal at the preselected value. This prevents the output signals from the electronic control unit from being driven beyond the limits engine operability by the bias signal $V_b$.

During acceleration, the increasing output of amplifier 552 is passed by capacitance 559 to the input of amplifier 560 which in combination with capacitance 561 and resistance 562 form differentiator 474. The increasing signal is differentiated and a decreasing signal is generated at the output of amplifier 560 having a value proportional to the engine speed rate of change. The gain of amplifier 560 is adjusted by means resistance 562 to be equal to, but of opposite polarity to the increase in the signal received at summation junction 557 due to the false roughness signal generated by the roughness sensor 468, during the acceleration interval. In a like manner, the differentiator circuit will generate a positive signal compensating for the false roughness signal generated by the roughness sensor 468 during deceleration.

When the engine speed signal is below a predetermined speed, such as during cranking to start the engine and has a value less than that, the output of Comparator 566 is lower than the potential applied to the source electrode of FET transistor 567 forward biasing the gate of FET transistor 567 causing the transistor to conduct, placing the potential at the slider of the initial condition Potentiometer 570 at the summation junction 572 and the input to Amplifier 574. Feedback resistance 577 is also placed in parallel with Amplifier 574 between its input and output and controls the gain of the integrator to generate a fixed bias signal $V'_b$ at the output of Amplifier 576. This fixed bias signal $V'_b$ may have a value which causes the electronic control unit to operate at its basic calibration $V_{bc}$ and provide a rich air fuel mixture to the engine during the start attempt. Once the engine has started and its speed exceeds the predetermined speed, the output of Compator 566 goes high and back biases the gate of FET terminating the transmission of the potential at the slider of the initial calibration Potentiometer 570 to the summation Junction 572, and opens the circuit by which Resistance 577 provides a feedback signal to Amplifier 574, restoring its gain to its normal value. The circuit thereafter generates a bias signal $V_b$ as a function of the engine roughness and engine speed as previously described.

WARM UP CONTROL

Figure 37:
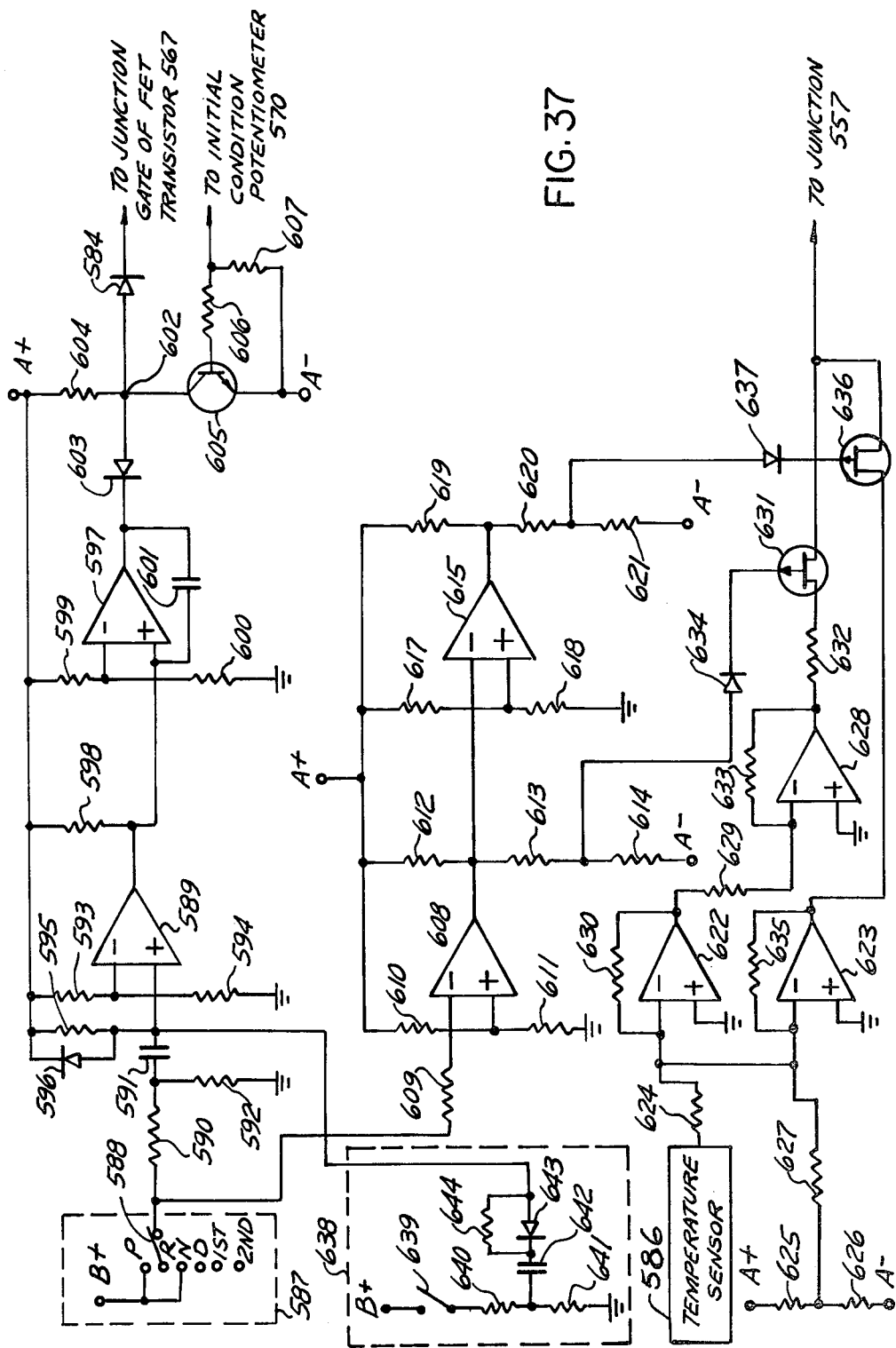
FIG. 37 is a circuit diagram of the Warm-Up Control illustrated in block form on FIG. 36.

As previously indicated, the details of the Warm Up Control 583 are shown on FIG. 37. Referring to FIG. 37, the Load Sensor 587 is shown as a switch 588 such as that associated with the gear shift lever for an automatic transmission of a conventional automobile. The switch receives a potential designated B+ at its Park (P) and Neutral (N) contacts. All of the other contacts such as Drive (D), First Gear (1st) and Second Gear (2nd) are floating or may be connected to a ground potential. The symbol B+ designates a positive potential derived from an unregulated source of electrical power such as a battery or an alternator being driven by the engine. The symbols designated A+ and A− are positive and negative potentials repectively derived from a regulated source of electrical power as discussed with reference to FIG. 36. The ground symbol indicated a common intermediate potential. The pole of switch 588 is connected to the positive input to Differential Amplifier 589 through a resistance 590 and capacitance 591. The junction between resistance 590 and capacitance 591 is connected to ground through a resistance 592. The positive input of Differential Amplifier 589 is also connected to the terminal designated A+ through parallel connected resistance 595 and divide 596. The negative terminal of the Differential Amplifier 589 is connected to the center junction of a voltage divider comprising resistances 593 and 594 connected between A+ and ground. The output of Differential Amplifier 589 is connected to the positive input of a second Differential Amplifier 597 and to A+ through a resistance 598. The negative input to Differential Amplifier 597 is connected to the center junction of a voltage divider comprising resistances 599 and 600. The output of Differential Amplifier 597 is connected back to the positive input of Differential Amplifier 597 through capacitance 601, and the junction 602 through diode 603. Junction 602 is connected to the input terminal A+ through resistance 604 and to the collector of transistor 605. The base of transistor 605 is connected to the slider of Initial Condition Potentiometer 570 (FIG. 36) through resistance 606, and to the terminal A− through resistance 607. The emitter of transistor 605 is connected directly to the A− terminal.

The pole of switch 588 is also connected to the negative input of a third Differential Amplifier 608 by means of a resistance 609. The positive input of Differential Amplifier 608 is connected to the center junction of a voltage divider comprising resistances 610 and 611 connected between A+ and ground. The output of Differential Amplifier 608 is connected directly to the negative input of a fourth Differential Amplifier 615, to A+ through resistance 612 and to A− through serially connected resistances 613 and 614. The positive input to Differential 615 is connected to the center junction of a voltage divider comprising resistances 617 and 618 connected between A+ and ground. The output of Differential Amplifier 615 is connected to A+ through resistance 619 and to A− through serially connected resistance 620 and 621.

The output of a Temperature Sensor 586 is connected to Differential Amplifiers 622 and 623 through a resistance 624. The center junction of a temperature reference voltage divider comprising resistances 625 and 626 connected between A+ and A− also is connected to the negative inputs of Differential Amplifiers 622 and 623. The positive inputs of both Differential Amplifiers 622 and 623 are connected to ground. The output of Differential Amplifier 622 is connected to the negative input of Differential Amplifier 628 through a resistance 629. A feedback resistance 630 connected between the output and negative input of Differential Amplifier 622 controls the amplifiers gain. The positive input to Differential Amplifier 628 is connected to ground. The output of Differential Amplifier is connected to the source electrode of a Field Effect Transistor (FET) transistor 631 through resistance 632. A feedback resistance 633 is connected between the output and negative input of Differential Amplifier 628. The gate of FET 631 is connected to the junction between resistances 613 and 614 by means of diode 634. The output of Differential Amplifier 623 is connected to the source electrode of a Field Effect Transistor (FET) 636.

A feedback resistance 635 is connected between the output and negative input of Differential Amplifier 623. The gate of FET 636 is connected to the junction between resistances 620 and 621 by means of diode 637. The drain electrode of FET 631 and 636 are connected together and to the summation junction 557 as shown on FIG. 36. The Differential Amplifiers 589, 601, 608 and 615 are of the type having uncommitted emitters in their output circuits such that when the value of signals at their positive inputs are high than the signals at their negative inputs, their output is indicative of an open circuit. When the polarity of the input potentials are reversed, their output is a signal indicative of a ground potential.

The operation of the Warm Up Control circuit shown on FIG. 37 is as follows. When the gear shift lever is in Park or Neutral, indicative of no load on the engine, the switch 588 applies the positive B+ potential to the negative input of Differential Amplifier 608 which causes its output to be a signal indicative of a ground potential. The ground potential at the output of Differential Amplifier 608 applied to the negative input of Differential Amplifier 615 causes its output to become uncommitted, therefore the junction between resistances 613 and 614 become a negative signal which when applied to the gate of FET causes it to be conductive transmitting the signal at the output of Differential Amplifier to junction 557 (FIG. 36). At the same time, the output of Differential Amplifier 615 is uncommitted and the potential at the junction between resistances 620 and 621 is a positive signal which when applied to the gate of FET 636 through diode 63; remders FET 636 non-conductive blocking the signal generated at the output of Differential Amplifier 623.

When the gear shift lever is placed in Reverse (R), Drive (D), First Gear (1st) or Second Gear (2nd) indicative of a load being applied to the engine the pole of Switch 588 assumes a ground potential through resistances 590 and 592 placing ground potential at the negative input of Differential Amplifier 608 causing its output to become uncommitted and assumes the positive potential at junction between resistances 612 and 613. This positive potential applied to the negative input of Differential Amplifier 615 is higher than the input applied to its positive input from the junction between resistances 617 and 618. This causes the output of Differential Amplifier to assume a ground potential. The reversal of the outputs of the Differential Amplifiers 608 and 609 also reverses the conductance of FET's 631 and 636 so that FET 636 becomes conductive and FET 631 is non-conductive.

Simultaneously, the removal of the B+ signal from the pole of Switch 588 causes capacitance 591 to discharge causing the positive input to Differential Amplifier 589 to momentarily become more negative than the potential applied to the negative input. This causes the output of Differential Amplifier 589 to assume a ground potential which discharges capacitance 601 and places a negative signal at the positive input to Differential Amplifier 597. This causes the output of Differential Amplifier 597 to assume a ground potential. The ground potential at the output of Differential Amplifier transmitted to the gate of the FET 567 (FIG. 36) causes FET 567 to become conductive. As previously discussed, the conductance of FET 567 in the Closed Loop Engine Roughness Control, applies the potential at the slider of Initial Condition Potentiometer 570 to be applied to the junction 572 and connects feedback resistance 577 in parallel with amplifier 574. In this state the output signal of the Closed Loop Engine Roughness Control assumes the value $V_i'$ which when applied to the Electronic Engine Fuel Control Computer 466 cause the fuel delivery to the engine to be increased. The ground signal is generated by Differential Amplifier 597 until capacitance 601, charged through resistance 598 again applies a potential to the positive input of Differential Amplifier 597 greater than the value of the signal applied to the negative input from the junction between resistance 599 and 600.

The time the output of Differential Amplifier 597 remains at a ground potential is determined by the values of resistance 598, capacitance 601 and the value of the signal applied to the negative input of Differential Amplifier 597. In a practical application, the values of theses components are selected so that the output signal of Differential Amplifier 597 remains at a ground potential from 1 to 2 seconds. The function of this portion of the circuit is to provide the engine with a rich air fuel mixture immediately upon the application of a load and for a short time thereafter to prevent the engine from stumbling or possibly stalling, such as changing the gear shift lever from Park or Neutral (indicative of a light engine load) to one of the driving gears.

Returning now to the warm up portion of the circuit shown on the bottom of FIG. 37, the reference signal comprising resistances 625 and 626 from the temperature reference voltage divider has a negative value with respect to ground, equal to, but of opposite polarity of the signal generated by the Temperature Sensor 586 when the engine has a predetermined temperature. This predetermined temperature is normally selected within the engine's normal operating temperature range. For engine temperatures below the predetermined temperature, the sum signal generated at the inputs to Differential Amplifiers 622 and 623 has a negative value with respect to ground and has a value proportional to the difference between the actual engine temperature and the predetermined temperature. For engine temperatures above the predetermined temperature, the sum signal has a positive value which also has a value proportional to the difference between the actual engine temperature and the predetermined reference temperature. The sum signal is amplified and inverted by the two differential amplifiers and the magnitude or value inverted signals generated at the output of the two Differential Amplifiers 622 and 623 are determined by the value of the sum signal and the values of the feedback resistances 630 and 635 respectively. The output of Differential Amplifier 623 is directly communicated to the summation junction 557 (FIG. 36) through FET 636 while the output of Differential Amplifier 622 is further amplified and reinverted by Differential Amplifier 628. The gain of Differential Amplifier 628 is controlled by feedback resistance 633. The output of Differential Amplifier 628 is directly communicated to the summation junction 557 (FIG. 36) through FET 631.

As previously discussed, when the gear shift lever is in Park of Neutral, the pole of Switch 588 is at ground potential which makes FET 631 conductive and GET 636 nonconductive. Therefore, when the engine is cold, i.e. below the reference temperature, the output signal generated by Differential Amplifier 623 is blocked by FET 636 however, negative sum signal at the input of Differential Amplifier 622 produces an amplified negative output signal at the output Differential Amplifier 628 which is communicated to the summation junction 557 in the Closed Loop Engine Roughness Control. This negative signal reduces the value of the summation signal at junction 557 which as previously descussed with reference to the Closed Loop Engine Roughness Control is indicative of an engine receiving a rich air fuel mixture. This reduces the value of the generated bias signal $V_b$ which as discussed relative to FIG. 38 decreases the current sunk by transistor 674 (FIG. 38) increasing the rate at which capacitances 618 and 620 are charged, thereby reducing the length of the generated fuel injection pulse. Therefore, the circuit operates to decrease the quantity of fuel being supplied to the engine in the absence of a load such as when the gear shift lever is in Park or Neutral.

Conversely, when the gear shift lever is in one of the drive gears indicative of an increased load on the engine, the output stales of Differential Amplifiers 608 and 615 are reversed, therefore, FET 631 becomes nonconductive and FET 636 becomes conductive.

With FET 636 conductive, the positive output of Differential Amplifier 623 in response to a negative sum signal at its input is transmiited to the summation signal at junction 557 larger which is indicative of a engine receiving a lean air fuel mixture. The value of the bias signal $V_b$ increases, increasing the current being sunk by transistor 674 (FIG. 38) causing the length o of the generated enjection signals to be increased supplyin an additional quantity of fuel to the engine. Therefore when the load on the engine is increased, such as when the gear shift lever is placed in a drive gear, the quantity of fuel delivered to the engine is increased in proportion to the difference between the reference temperature and the actual engine temperature when the actual engine temperature is less than the predetermined reference temperature.

Since the engine's temperature can exceed the reference temperature under conditions, the polarity of the signals transmitted to the junction 557 from the Warm Up Control could possibly reverse. However, the reference temperature is selected so that the magnitude of these reversed signals will be small. Compensation of this possible reversal in the received signals can be accommodated in the Closed Loop Engine Roughness Control by an appropriate adjustment of potentiometer 564.

The circuit shown at the top of FIG. 37 which enables the Closed Loop Engine Roughness Control to generate a bias signal having a value $V_b'$ when the gear shift lever is moved from Park or Neutral to a drive gear, could also be modified to respond to a signal indicative of the opening a throttle, a closed position, normally referred to as "tin-in". The opening of the throttle from a closed position causes a transition of fuel delivery schedule from an idle to a drive condition. Such a modification is illustrated by the circuit shown in dashed box 638. In the modification, a switch 639 attached to the throttle or a pressure switch in the engine's air intake applies B+ to one side of a capacitance 642 through a resistance 640. The junction between capacitance 642 and resistance 640 is connected to ground through resistance 641. The other electrode of capacitance 642 is connected to the positive input to Differential Amplifier 589 through resistance 644 and diode 643 connected in parallel.

The operation of this addition is as follows: Switch 639 is closed when the throttle is in the closed or idle position and B+ is applied to one side of capacitance 643. When the throttle is removed from the idle position, Switch 639 opens and capacitance 642 is discharged to ground through resistance 641. The discharge of capacitance 642 decreases the potential at the positive input to Differential Amplifier 589 causing its output to assume a ground potential as previously discussed with reference to changing the gear shift lever from Park or Neutral to a drive position. The operation of the circuit is thereafter the same as previously described.

It is recognized than when the tip-in circuit is included, a parallel connected diode and resistance, such as diode 643 and resistance 644 must be included after capacitance 591 to isolate the two capacitances from each other such that the discharge current of either capacitance will cause a current flow through resistance 595 sufficient to drop the potential at the positive input of Differential Amplifier 589 below the potential applied to the negative input.

When a pressure switch in the intake manifold is used, a second switch responsive to the engine speed would be required to prevent the circuit from becoming responsive to a deceleration condition as is known in the art. This concept may also be used in combination with the throttle switch for the same purpose.

Figure 38:
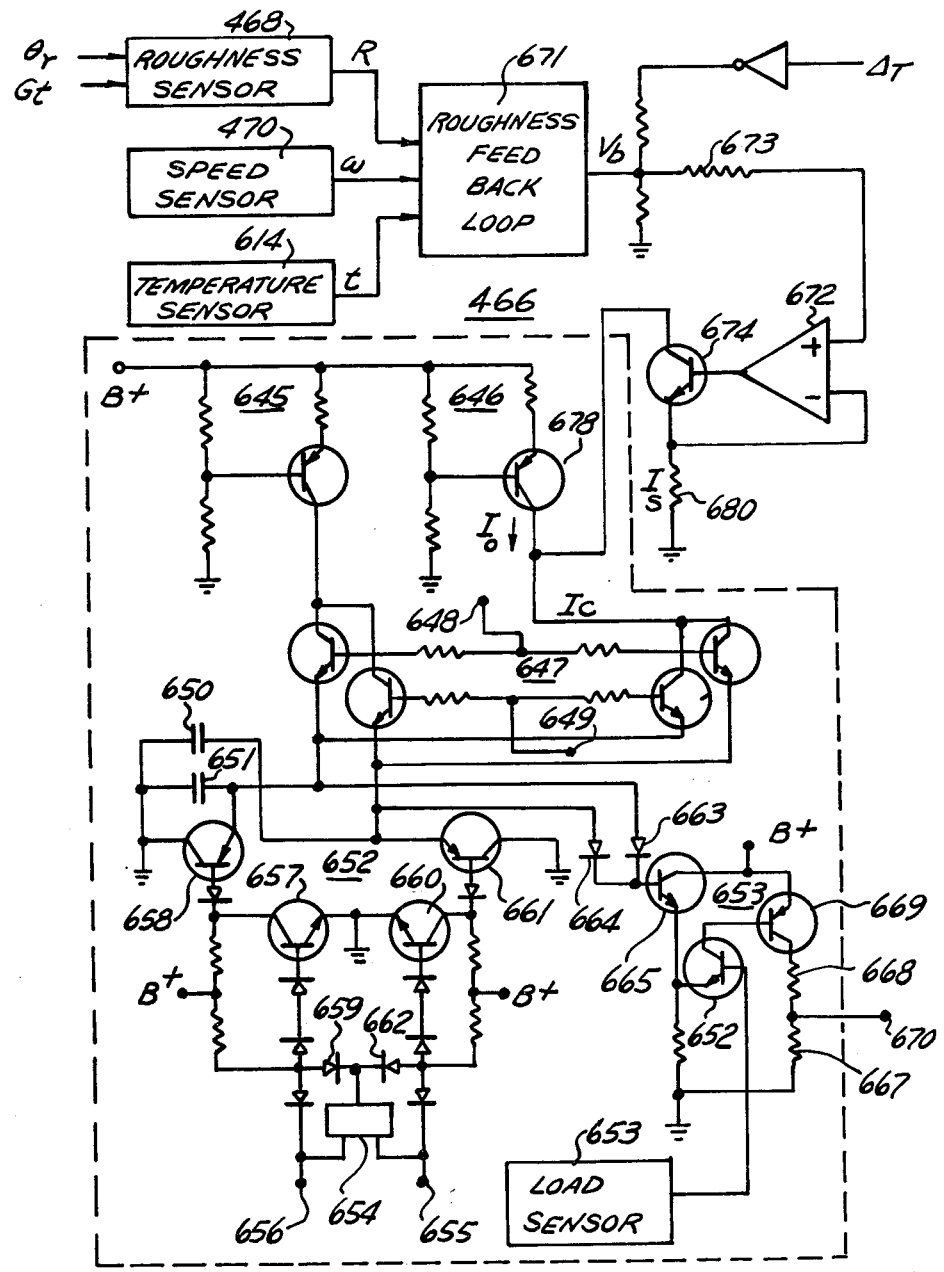
FIG. 38 is a circuit of a typical Electronic Fuel Control Computer adapted to receive the roughness signal generated by the Closed Loop Engine Roughness Control.

A circuit implementation of the roughness sensor and the roughness feedback loop illustrated in FIGS. 32 and 36 respectively in combination with an Electronic Fuel Control Computer 466 of the type disclosed by Reddy in U.S. Pat. 3,734,068 "Fuel Injection Control System", is shown in FIG. 38. The circuit is powered from a regulated source of electrical energy designated at various points on the diagram as A+. The source of electrical power may be derived from a battery or engine driven source, such as an alternator or generator conventionally associated with an internal combustion engine. The electronic control unit 466 has two capacitors 650 and 651 alternately charged by means of a pair of Current Sources 645 and 646 under the control of a Switching Network 647. The Switching Network receives trigger signals at input terminals 648 and 649 from a timing circuit (not shown), synchronized with the reaction of the engine.

The Pulse Generating Circuit comprises a Discharge Circuit 652 and a Comparator Circuit 653. The Discharge Circuit 652 receives timing signals from the timing circuit at input terminals 655 and 656 while the Comparator Circuit 653 receives a load signal from a Load Sensor 653, such as a signal from a pressure sensor generating a signal indicative of the pressure in the engine's air intake manifold. The Comparator 653 generates an output pulse signal, the duration of which is indicative of the engine's fuel requirements in response to the potentials on capacitors 650 and 651 and the value of the pressure signal. This output pulse signal energizes a fuel delivery device, such as an electronic carburetor or one or more fuel injector values, causing the computed quantity of fuel to be delivered to the engine.

The operation of the Electronic Fuel Control Computer is discussed with reference to FIG. 38 and the waveforms shown in FIG. 39. Current Source 645 is a constant current source capable of charging capacitors 650 and 651 at a redetermined rate to a predetermined value. Current Source 646 is also a constant source having a constant current output signal operative to charge capacitors 618 and 620 at a predetermined rate to potentials well above the predetermined value of current source 622. The trigger signals TR1 and TR2 in the form of two alternating square waves, as illustrated in FIG. 38, are respectively applied to input terminals 628 and 630 of switch 628 and control the sequential charging of the capacitors 618 and 620 by the two current sSources 645 and 646. In the internal when the signal TR1 is positive and the signal TR2 is negative or a ground potential, capacitor 651 is charged by Current Source 645 and Capacitor 651 is charged by Current Source 646. When the trigger signals reverse polarity, the two capacitors are charged by the alternate current sources.

The leading edges of the trigger pulses TR1 and TR2 applied to the input terminals 655 and 156 of Discharge Circuit 652 activates a Delay Pulse Generator 654 such as a single shot multivibrator which generates a delay pulse "p" having a predetermined pulse width significantly shorter than pulse width of the trigger pulse. A positive trigger signal on input terminal 656 coincident with the positive delay pulse signal "p" removes the effective ground potential on the base of Transistor 657 causing it and Transistor 658 to conduct. Transistor 658 discharges Capacitor 651 to near ground potential during the period of the delay pulse. Termination of the delay pulse returns a ground potential at the output of the Delay Pulse Generator 654 which is applied to the base of Transistor 657 through Diode 659. The ground signal at the base blocks Transistor 657 which in turn blocks Transistor 658 permitting Capacitor 651 to be charged by Current Source 645 to the predetermined value. When the trigger signals TR1 and TR2 change polarity, a positive potential is applied to Terminal 655 causing Transistors 600 and 661 to be forward biased and Capacitor 650 is discharged by means of transistor 661 in a manner equivalent to the way Capacitor 651 was discharged. The Switching Network 647 also changes state in response to the inversion of the trigger signals and Capacitor 651 is charged from Current Source 646 and Capacitor 650 is charged from Current Source 645.

The load signal applied to Comparator 653 forward biases Transistor 666 which in turn forward biases Transistor 669. The conductance of transistor 669 produces a positive potential at output terminal 670 which is connected to the junction between resistances 667 and 668 forming a voltage divider network between the collector of Transistor 669 and ground. The conductance of Transistor 666 also biases the emitter of transistor 665 to a potential approximately equal to the value of the load signal received from the Pressure Sensor 653. The charge signals on Capacitor 650 and 651 are applied to the base of Transistor 665 through Diodes 663 and 664 respectively. When the signals on both capacitors have a potential value below the value of the pressure signal, Transistor 665 is blocked. However, when the potential value on either Capacitor 650, 651 or both exceed the value of the pressure signal, transistor 665 conducts. Conductance of Transistor 655 raises the value of the potential appearing at the emitter of Transistor 666 above the value of the pressure signal applied to its base thereby blocking Transistor 666. Blocking of Transistor 666 blocks Transistor 669 and with Transistor 669 in the blocked state, the potential at output terminal 620 assumes a ground potential terminating the output signal.

Figure 39:
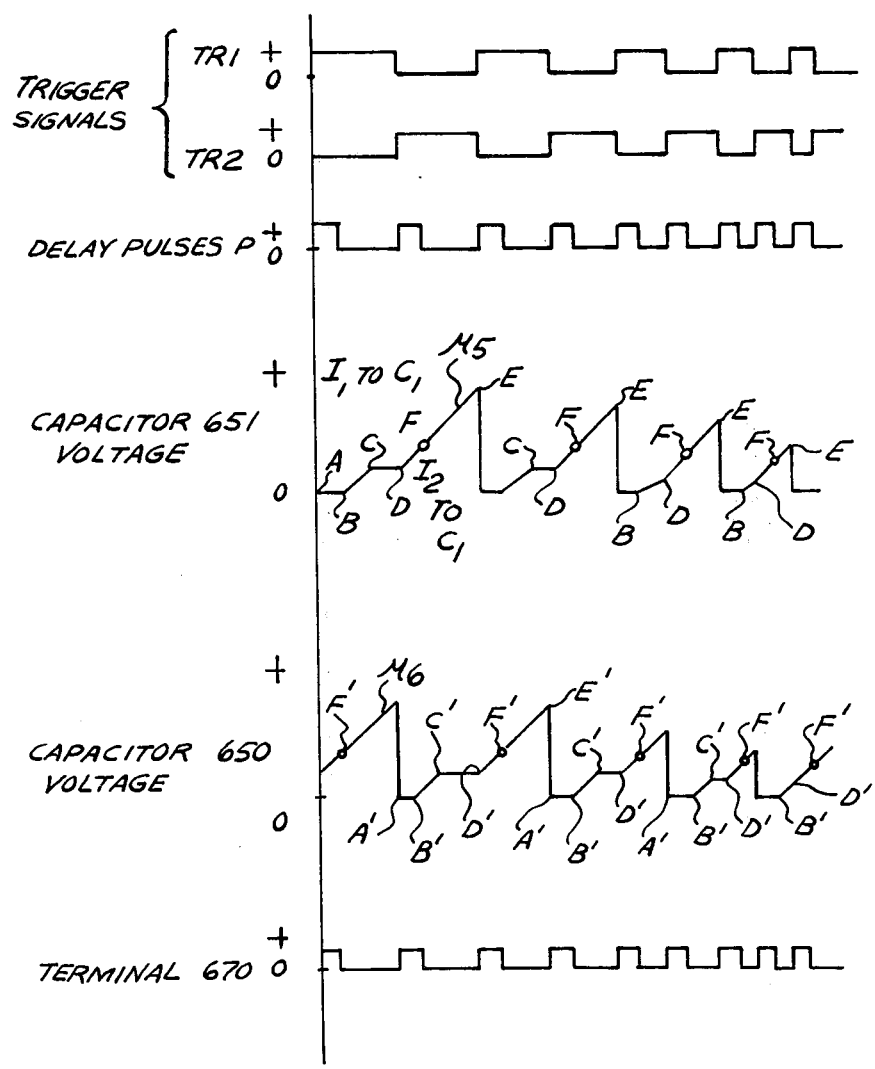
FIG. 39 is a series of waveforms used in explaining the operation of the Electronic Fuel Control Computer shown on FIG. 38.

The voltage waveforms generated across capacitors 650 and 651 in response to a series of trigger signals TR1 and TR2 and the delayed pulse "p", are shown in FIG. 39. The decreasing period of the sequential trigger signals illustrated is an exaggerated example of the change in the pulse width of the trigger signals as a function of engine speed. Referring to the waveform for Capacitor 651, the initial segment from A to B is generated when TR1 is positive and the delay pulse generating circuit is producing a delay pulse "p" discharging capacitor 651. Upon termination of the delay pulse "p", point B, Capacitor 651 begins to charge at a rate determined by Current Source 645 to its predetermined value indicated as point C. The charge on Capacitor 651 remains at the predetermined value for the remainder of the positive portion of the trigger signal TR1. At point D, the trigger signals TR1 and TR2 reverse polarity and capacitor 651 is now charged by the Current Source 646 during the interval from D to E which is equal to the interval when the trigger pulse TR2 is positive.

When the charge on either Capacitor 650 and 651 reaches the value of the signal applied to the emitter of Transistor 665 point F, the signal at the output Terminal 670 is a ground potential. At the occurrence of a trigger signal, the capacitor which was being charged by Current Source 646 is dicharged to approximately ground potential by the Discharge Circuit 652 and the and the charge on the capacitor being charged by current source 645 is below the value of the signal applied to the emitter of the Transistor 665, which is indicative of the value of the pressure signal. Since the charge on both capacitors is below the value of the pressure signal, Transistor 665 is blocked, which renders transistors 666 and 669 conductive generating a positive signal at output terminal 670 having a value determined by the respective value of resistances 667 and 668. The signal at output Terminal 670 remains positive until the charge on the capacitor being charged by current source 646 exceeds the value of the pressure signal. When the charge on the capacitor exceeds the value of the pressure signal, point F on the segment DE, transistors 666 and 669 become blocked and the signal at the output terminal 670 returns to ground potential. The time interval when the signal at output Terminal 670 is positive, is indicative of the engine's fuel requirements as a function of engine speed and the pressure in the intake manifold.

Referring back to FIG. 38, the Roughness Sensor 468 shown on FIG. 32 and close loop engine roughness Control Loop 671 shown on FIG. 36, will be explained. The Roughness Sensor 468 the reference signal $\phi_r$ and the tooth signal $\phi_t$ respectively and generates a roughness signal R. The Speed Sensor 470 as described with reference to FIG. 32 generates a signal w indicative of the engine's speed which along with the roughness signal R are input to the closed loop engine Roughness Control 671. The signals from the Temperature Sensor 586 and the Load Sensor 587 are also applied to the input of the close loop engine Roughness Control 671 when the cold engine disablement of the Roughness Loop is incorporated. The Roughness Feed Back Loop 668 generates the bias signal $V_b$ as explained with reference to FIG. 36 which is applied to the positive or noninverting input to a Differential Amplifier 672 through a limiting resistance 673. The output of the Differential Amplifier 672 is applied to the base of a transistor 674 through a limiting resistance 676. The collector of transistor 674 is connected to the collector of transistor 678 in the current source 646. The emitter of transistor 674 is connected to ground through a limiting resistance 680. The junction between the emitter of transistor 674 and resistance 680 is connected to the negative or inverting input of Differential Amplifier 672.

The effect of the bias signal on the operation of the electronic fuel control circuit is as follows: Transistor 674 and resistance 680 function as a current sink, sinking part current generated by the current source 646 output from the emitter of transistor 678. The electronic fuel control unit is calibrated such that the current generated by the current source 646 minus a predetermined current sunk by the current sink, comprising transistor 674 and resistance 680 charges capacitances 650 and 651 at a predetermined rate. At the calibration point, the electronic fuel control unit generates pulse signals at the output terminal 670, having a pulse duration which is a function of both engine speed and engine load as previously described. The quantity of current sunk by the current sink is a function of the bias signal $V_b$ applied to the positive input of Differential Amplifier 672. Differential Amplifier 672, transistor 674 and resistance 680 effectively form a voltage follower circuit in which the potential across resistance 680 is proportional to the value of the bias signal $V_b$ applied to positive input of the differential amplifier. The current being sunk by the current is the current flowing through resistance 680 which is therefore inversely proportional to the value of resistance 680 and directly proportional to potential across it. The gain of the circuit and the value of resistance 680 are selected such that the predetermined current is sunk when the potential of the bias signal $V_b$ has the calibration value $V_{bc}$ as discussed with reference to FIG. 36. The calibrated bias signal $V_{bc}$ has a value which is larger than the bias signal generated by the closed loop engine roughness control with the engine operating at its desired air/fuel ratio.

Figure 40:
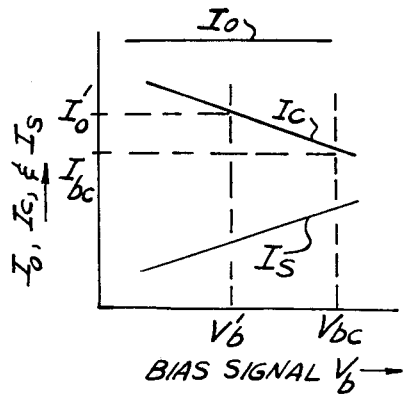
FIG. 40 is a graph showing the sink and charging currents as a function of the bias signal $V_b$.

The response of the electronic fuel control unit to the bias signal $V_b$ is discussed with reference to FIG. 38, 40 and 41. Referring first to FIG. 40, there is shown a graph which shows the output current $I_o$ of the current source 646, the relative change in the sink current $I_s$ and the relative change in the charging current $I_c$ charging capacitance 650 and 651 as a function of the bias signal $V_b$.

The output current $I_o$ of the current source 646 is a constant and does not change with the bias signal as indicated by the line $I_o$, the sink current $I_s$ is the current flowing through resistance 678 and varies as a function of $V_b$. This may be a linear function of $V_b$ or be a nonlinear function of $V_b$ due to gain non-linearities in the Differential Amplifier 672 and transistor 674. The current $I_c$ charging capacitances 650 and 651 is the difference $I_c = I_o - I_s$ and varies as an inverse function of $V_b$ as shown. Relative values of the calibration bias signal $V_{bc}$ and the value of the bias signal $V_b'$ with the engine operating at its lean limit are as shown. When the bias signal has the calibration value $V_{bc}$, the current $I_c$ charging the capacitances 650 and 651 is less than the current $I_c$ charging the two capacitances at the point of lean limit operation $V_b'$. The capacitances 650 and 651 will therefore be charged at a slower rate when the bias signal $V_b$ has the value $V_{bc}$ than they would be charged when the value of $V_b$ is $V'_b$.

Figure 41:
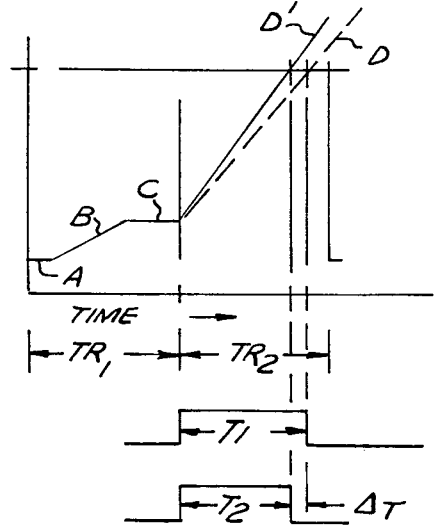
FIG. 41 is a graph showing the waveforms of the charge on the capacitor of the electronic control unit for two valves of the bias signal $V_b$ and the change in the injection signals generated by the electronic fuel control unit.

Referring now to FIG. 41, there is shown the charge on either capacitance 650 and 651 as a function of time. As previously discussed, during the first interval between trigger signals indicated as TR1, the capacitance will charge to a speed dependent value indicated by segments A, B and C by current source 645. As the engine speed increases, the time between trigger pulses becomes shorter so that the value of the charge on the capacitance will vary as a function of the engine speed. For explanation purposes, it will be assumed that the charge on the capacitance will have the value indicated by segment C. At the end of the trigger signal TR1, Switch 647 changes state and the capacitance is thereafter charged by current $I_c$ which is the output current $I_o$ of transistor 678 in current source 646 minus the sink current $I_s$ flowing through resistance 680. When the bias signal has the value $V_{bc}$, the capacitance is charged at a rate indicated by the dashed line segment D. Simultaneous with the termination of TR1 and the beginning of TR2, the other capacitance is discharged back biasing transistor 665 in Comparator 653 (FIG. 38) which forward biases transistors 666 and 669. This initiates the generation of the pulse signal at the output terminal 670 as indicated. Transistor 665 remains back biased until the capacitance is charged by the current $I_c$ to a value equal to the value of the load signal from Load Sensor 653. At this point, transistor 665 is forward biased again and transistors 666 and 669 are back biased, terminating the signal at the output terminal 670. The resulting fuel injection pulse on terminal 670 has a time duration $T_1$.

As previously indicated, the calibration bias signal $V_{bc}$ produces a rich air fuel mixture so that the engine would be operating at a roughness level which is less than the roughness level of the engine running at the desired air/fuel mixture. The value of the roughness signal generated by the roughness sensor 468 would be small, causing a decrease in the value of the bias signal $V_b$. A decrease in the value of the bias signal $V_b$ would result in an increase in the charging current $I_c$ as indicated on FIG. 40 causing the capacitance to charge at a faster rate. The bias signal has a value $V_b'$ when the engine is operating at the desired air fuel mixture and the current charging the capacitance is $I_c'$ which is greater than $I_{bc}$. The capacitance will therefore charge at a faster rate as indicated by solid line D' and reach a value equal to the value of the load signal in a shorter time. The pulse signal generated at the output terminal 670 will have a duration $T_2$ which is shorter than $T_1$ by a factor T.

It is obvious that as engine roughness increases as the result of receiving a fuel air ratio leaner than the predetermined value, the value of the roughness signal generated by the roughness sensor and the value of the bias signal $V_b$ increases causing the current charging the capacitance to decrease. A decrease in the current charging the capacitance increases the time duration of the pulse signal at the output of the electronic control unit increasing fuel delivery to the engine. Conversely, as the engine roughness decreases as a result of receiving an air fuel mixture richer than the predetermined value, the value of the bias signal decreases, causing an increase in the current charging the capacitance. The increase charging current, decreases the duration of the signal generated at the output of the electronic control unit, decreasing the quantity of fuel being delivered to the engine. The pulse signals generated at the output of the electronic control unit may be used to directly energize electrically actuated fuel injector valves or to control fuel delivery in a carburetor type fuel delivery systems.

The disclosed Closed Loop Engine Roughness Control is applicable to diesel as well as spark ignited internal combustion engines. It is further noted that the Closed Loop Engine Roughness Control is not limited to the illustrated type of electronic fuel control system and is applicable to other types of fuel control systems known in the art. Those skilled in the art will recognize that the Closed Loop Engine Roughness Control illustrated in analog form herein may also be embodied in digital form or in the form of a programmed computer, such as a microcomputer.

CLOSED LOOP FUEL DISTRIBUTION CONTROL

The closed loop fuel distribution control system trims the quantity of fuel being delivered to each cylinder in a multi-cylinder engine, so that the torque output from each cylinder is approximately the same. Although this closed loop system is primarily directed to multipoint fuel injection systems, it is equally applicable to single point fuel injection systems as well as electronically controlled carburetors. In multi-point fuel injection systems, the fuel is supplied to each cylinder, or group of cylinders, by an electrically actuated fuel injector valve. Because of mechanical tolerances on the size of the valve orifices, as well as other valve elements, the quantity of fuel delivered in response to a given signal will vary from valve to valve. Therefore some cylinders may receive a richer or leaner air/fuel mixture than the others, causing variations in their individual output torques. The maximum power efficiency of the engine is decreased when the mixture to one or more cylinders is too lean and the maximum fuel efficiency of the engine is decreased when the mixture to one or more cylinders is too rich. This same effect may also be encountered in single point fuel injection systems as well as carburetor type systems for other reasons known in the art. For example, geometry of the intake manifold or the fuel distribution in intake manifold may result in different cylinders receiving different air/fuel mixtures. The disclosed closed loop fuel distribution control automatically compensates for these differences as well as differences in the cylinders themselves and corrects the quantity of fuel being delivered to individual cylinders such that the torque produced by each cylinder is approximately the same. Therefore, the disclosed closed loop system is capable of adaptively compensating for the mechanical differences between injector valves, non-uniform distribution of the fuel to the individual cylinders resulting from design or mechanical tolerances as well as differences between the cylinders themselves. The system permits the mechanical tolerances on the various elements to be relaxed, significantly reducing costs while improving the overall performance and efficiency of the engine.

Figure 42:
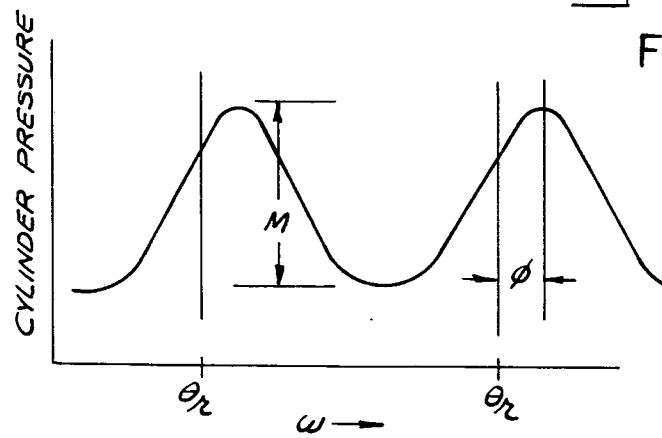
FIG. 42 waveform showing the pressure profile in a cylinder used in explaining the operation of the closed loop distribution system.

Referring now to FIG. 42, there is shown the pressure profile in the individual cylinders resulting from the combustion of an air-fuel mixture. The amplitude or magnitude M of the pressure is indicative of the torque generated by the combustion process. The larger the value of M, the greater the torque produced. The phase angle $\phi$ of the resulting sinusodial wave is the same as that generated in the Closed Loop Ignition and/or Injection Timing circuit previously discussed. The phase angle $\phi$ is indicative of the effective torque when the period wave rather than the pressure wave is detected. The phase angle $\phi$ has a predetermined value when an optimum torque is produced under operating conditions. The phase angle $\phi$ has a value smaller or larger than the predetermined value when the torque impulse generated by an individual cylinder is less than optimum. The effective torque may be computed from the following equation:

$$T = f_1(\phi) f_2(M) f_3(RPM) K$$

where
T = the effective torque output
$f_1(\phi)$ = a function of the phase angle $\phi$
$f_2(M)$ = a function of the amplitude M of the period wave
$f_3(RPM)$ = a function of engine speed RPM and
K = a constant The torque of the remaining cylinders is obtained by computing an average torque $T_A$ according to the following equation:

$$T_{avg} = \frac{1}{n} \Sigma\, T_{n/n} = \frac{1}{n} \Sigma\, [K \cdot f_1(\phi_n) \cdot f_2(M_n) \cdot f_3(RPM)] /$$

where the subscript n is the number of individual cylinders in the engine.

Figure 43:
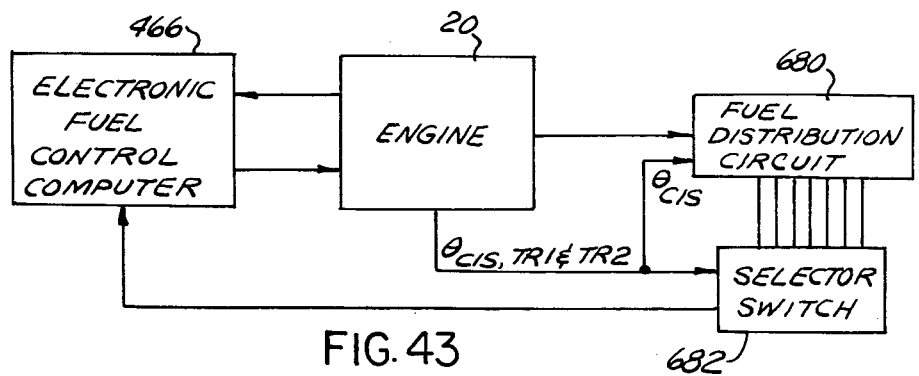
FIG. 43 is a block diagram of the Closed Loop Fuel Distribution Control.
Figure 44:
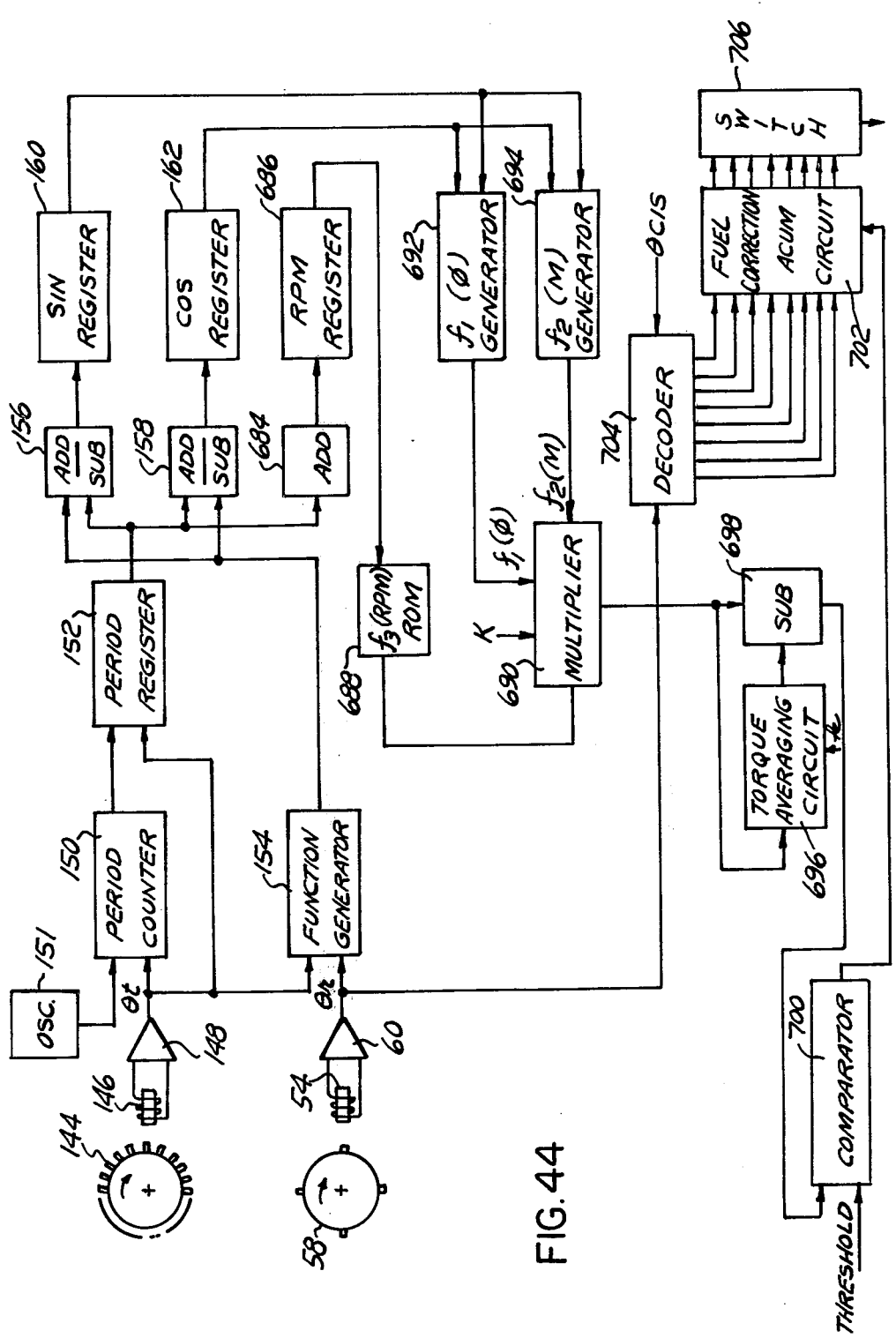
FIG. 44 is a block diagram showing the Closed Loop Fuel Distribution Control in greater detail.

The block diagram shown on FIG. 43 shows the relationship between the Engine 20, the Electronic Fuel Control computer 466, the Closed Loop Fuel Distribution Control 680 and a Selector Switch 82. The Electronic Fuel Control Computer 466 generates signals in response to operator commands, engine operating conditions, and environmental parameters as is known in the art, which causes a combustible air/fuel mixture to be delivered to the engine. The Engine 20, may be a spark ignited or diesel engine which responds to the delivered air/fuel mixture and produces a rotational torque at its output which for purposes of explanation will be assumed to be the engine's crankshaft. A crankshaft velocity sensor such as Sensor 38 shown on FIG. 9 generates a signal w indicative of the instantaneous rotational velocity of the crankshaft, and a Reference Signal Generator, such as $\theta$ Reference Signal Generator 46 also shown on FIG. 9 generates a signal $\theta_r$ when each piston of the engine is in a predetermined position as previously described. A third sensor (not shown), generates a cylinder identification signal $\theta_{CIS}$ once for each operational cycle of the engine (i.e. every two revolutions). The cylinder identification signal $\theta_{CIS}$ identifies one particular cylinder at a predetermined point during its operation cycle. The signal $\theta_{CIS}$ may be taken from the distributor, from a marker on a cam shaft or any other source. The signals $\theta_r$, $\theta_{CIS}$ and w are received by the Closed Loop Fuel Distribution Control 680 which computes a correction signal for each individual cylinder based on the measured torque. The correction signals are applied to a Selector Switch 682 which selects in a predetermined sequence, the correction signal to be input to the Electronic Fuel Control Computer 466. The correction signal for each cylinder is received coincident with the Electronic Fuel Control Computers computation cycle for the quantity of fuel to be delivered to that particular cylinder. Each fuel delivery signal generated by the Electronic Fuel Control Computer 466 is corrected in accordance with the received correction signal to minimize the torque impulse differences between the individual cylinders. The details of the Closed Loop Fuel Distribution Control 680 are shown in block form on FIG. 44. As previously described with reference to the Ignition Timing Control and Closed Loop Engine Roughness Control, the signals $\theta_r$ and $\theta_t$ are generated at the output of Amplifiers 60 and 148 in response to the output signals generated by the magnetic pick-ups 54 and 146 detecting the teeth on wheels 58 and 144. The output of Amplifier 148 is connected to the Period Counter 150, Period Register 152 and Function Generator 154 while the output of Amplifier 60 is connected to the Function Generator 154 and $f_3$ (RPM) Generator 688. The output of an Oscillator 151 is also connected to the input of the Period Counter 150, and the output of the Period Counter 150 is connected to the input of the Period Register 152. The output of the Period Register 152 is connected to the input of ADD Circuit 684 and to the inputs of two Add/Subtract Circuits 156 and 158. The output of the Function Generator is also connected to the inputs of Add/Subtract Circuits 156 and 158. The output of the two Add/Subtract Circuits 156, and 158 are connected to the inputs of Sin Register 160 and Cos Register 162 respectively. The output of ADD Circuit 684 is connected to the input of an RPM Register 686. The output of the RPM Register 686 addresses an $f_3$(RPM) ROM (Read Only Memory) 688. The output of ROM 688 is connected to one input of a Multiplier 690. The outputs of the Sin and Cos Registers 160 and 162 are connected to the inputs of a $f_1(\phi)$ Generator 692 and an $f_2(M)$ Generator 694. The outputs from the $f_1(\phi)$ Generator 692, the $f_2(M)$ Generator 694 along with a constant K are also connected to the input of Multiplier 690. The output of the Multiplier is connected to the inputs of a Torque Averaging Circuit 696 and a Subtract Circuit 698. The output of the Torque Averaging Circuit is also connected to an input of the Subtract Circuit 698. The output of the Subtract Circuit is connected to one input of a Comparator 700. The output of Comparator 700 is connected to a Fuel Correction Accumulator Circuit 702. The Correction Accumulator Circuit 702 has multiple individual accumulators, one for each engine cylinder. A Decoder 704 receives the signals $\theta_r$ and $\theta_{CIS}$ discussed with reference to FIG. 42. The multiple outputs of the Decoder are input to the Fuel Correction Accumulator Circuit and sequentially activate the accumulators. The parallel outputs of the Fuel Correction Accumulator Circuit 702 are connected to the Selector Switch 704 which sequentially outputs the content of each accumulator circuit to the Electronic Fuel Control Computer 466 (FIG. 31).

The signals $\theta_r$ and $\theta_t$ are used to generate the Fourier Coefficient from the A sin $\phi$ and A cos $\phi$ of the phase angle $\phi$ which are stored in the Sin and Cos Register 160 and 162 respectively, as previously discussed with reference to the Closed Loop Ignition Timing Control previously discussed with reference to FIGS. 15, 20, 21 and 22. The $f_1(\phi)$ Generator 692 comprises the Comparator 164, Divider 166, ARC Tangent ROM 164 and Cotangent Correction Circuit 172 shown in detail on FIG. 23 and discussed relative thereto. The signal $f_1(\phi)$ is taken from the output of Shift Register 358. Since the details of these circuits have already been discussed they need not be repeated here for an understanding of the invention.

The $f_2(M)$ Generator 694 computes the absolute values of the content of the Sin and Cosine Register, $|A|$ and $|B|$, respectively, and a third number having a value equal to $0.6875 (|A| + |B|)$ and outputs the signal $f_2(M)$ which is the greater of the three (3) computed values. This provides a measure of the amplitude M with an error of less than four (4%) percent. The details of the $f_2(M)$ Generator 686 will be discussed hereinafter with reference to the circuit shown on FIG. 45.

The content of the Period Register 152 are successively added and stored in RPM Register 686. The number is then used to address the $f_3$(RPM) ROM 688 which outputs a signal $f_3$(RPM) having a value indicative of the engine speed.

The signals $f_1(\phi)$, $f_2(M)$, $f_3$(RPM) and K are serially multiplied in Multiplier 690 to generate the torque signal $T = f_1(\phi) \times f_2(M) \times f_3(RPM) \cdot K$. This torque signal is sequentially computed for each cylinder. The torque signal is input to the Torque Averaging Circuit 696 which outputs a signal $T_{avg}$ having an average value of the preceding torque measurements. The Torque Averaging Circuit 696 may be a shift register which stores a predetermined number of torque signals, then divides the stored contents by the number of torque signals stored in accordance with the equation $$T_A = \sum_n T_n/n$$

previously discussed or may be an averaging circuit such as $\phi$ Averaging Circuit 172 shown on FIG. 15 and discussed in detail with reference to the circuit shown on FIG. 25. The average torque value from the Torque Averaging Circuit 696 is subtracted from the torque value computed by Multiplier 690 in the Subtract Circuit 698 to generate a signal T indicative of the difference between the computed and average values. The signal $\Delta T$ is subsequently compared with a threshold value to determine if the signal $\Delta T$ exceeds predetermined limits.

As previously discussed with reference to the Closed Loop Fuel Control System, the torque impulses produced by the individual cylinders, will vary from cylinder to cylinder, and even the torque impulse produced by the same cylinder will vary from cycle to cycle due to differences in the combustion process. These variations nominally fall within determinable limits, and no fuel distribution compensation is required when these limits are not exceeded. Fuel distribution is only required when these limits are consistently exceeded in a given direction, i.e. consistently too large or too small.

The threshold signal applied to Comparator 700 establishes the limits for the variation in the signal $\Delta T$ and adds the signal $\Delta T$ to the accumulator in the Fuel Correction Accumulator Circuit 702 corresponding to the cylinder for which an excessive $\Delta T$ signal was measured. The corresponding accumulator in the Fuel Correction Accumulator Circuit 702 to which the signal $\Delta T$ is added is determined by the output of Decoder 704 which receives the cylinder identification signal $\theta_{CIS}$ and the reference signal $\theta_r$. The output of the Decoder sequentially enables the appropriate accumulator as the signals $\Delta T$ are sequentially generated.

The successive $\Delta T$ signals transmitted by Comparator 700 are added into the respective accumulators which store a number indicative of the desired correction. The output of each accumulator is received by the Selector Switch 706 which outputs the appropriate correction signal to the Electronic Fuel Control Computer 466 during the interval during which the fuel quantity is being computed for the particular cylinder. The Electronic Fuel Control Computer 466 responds to the correction signal and generates fuel injection signals indicative of increased or decreased quantities of fuel to be delivered in accordance with the value of the correction signal received. In this manner, the Closed Loop Fuel Distribution Control individually trims the quantity of fuel being delivered to each cylinder.

Since the portion of the circuit for the generation of the data content of the Sin and Cos Registers 160 and 162 and the generation of the phase signal $f_1(\phi)$ have been discussed in detail with reference to the Timing Control, they will not be repeated here.

Figure 45:
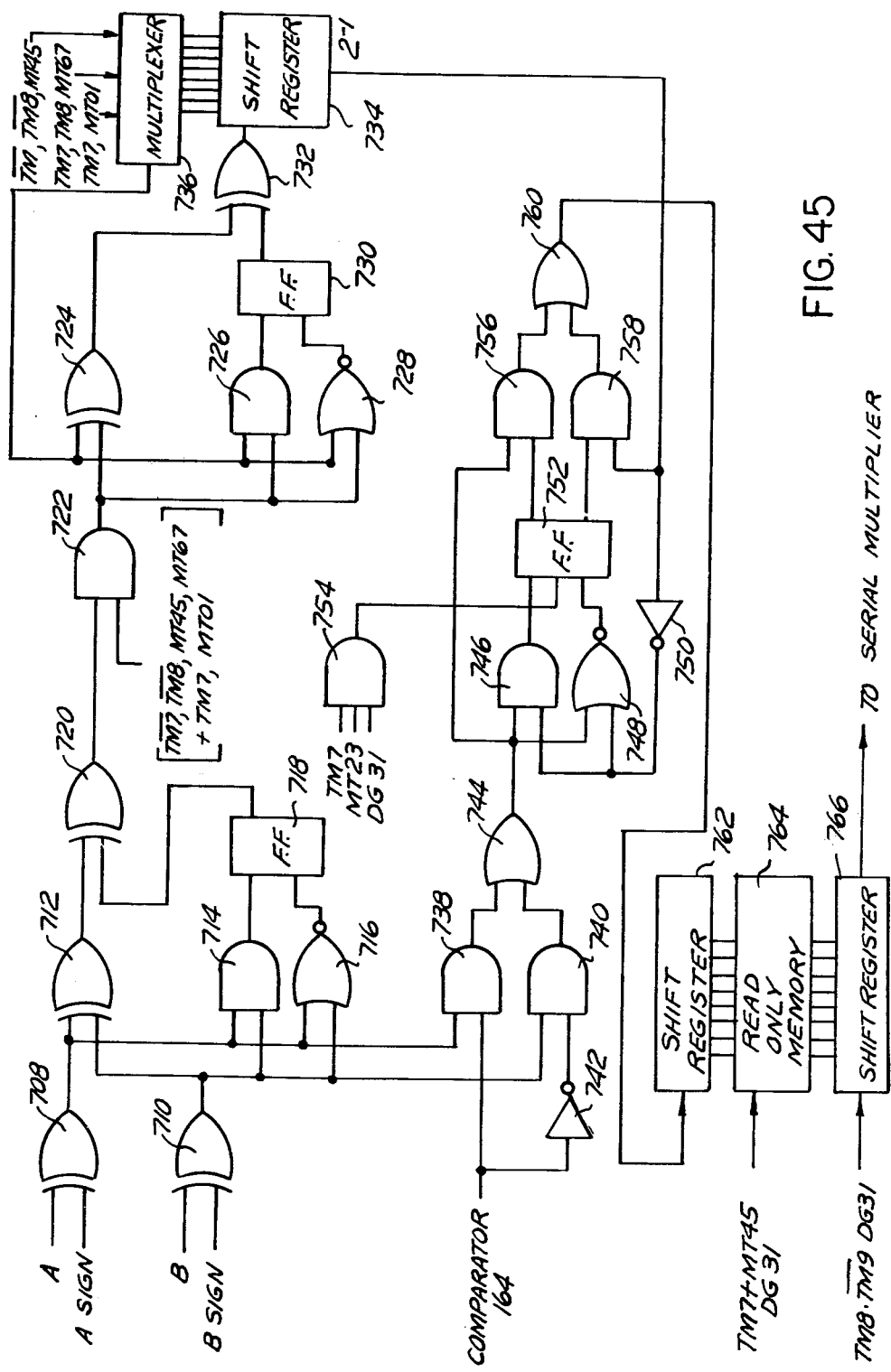
FIG. 45 is a circuit diagram of the $f_1$ ($\phi$) Generator shown on FIG. 44.

The details of the $f_2(M)$ Generator 694 are shown on FIG. 45. Referring to FIG. 23 and 45, the content of the Sin and Cos Registers 160 and 162 are input to exclusive OR gates 708 and 710 respectively. OR gates 708 and 710 also receive the signals A-SIGN and B-SIGN generated at the Q outputs of Flip-Flops 360 and 364 respectively as shown on FIG. 23. The outputs of exclusive OR Gates 708 and 710 are connected to a first serial adder comprising exclusive OR Gates 712 and 720, AND gate 714, NOR gate 716 and Flip-Flop 718. The output of exclusive OR gate 720 is connected to an input of AND gate 722 which receives the timing signals $\overline{TM7}$, $\overline{TM8}$, MT45, MT67+TM7, MT01 at its alternate input. The output of AND gate 722 is connected to a second serial adder comprising exclusive OR gates 724 and 732, AND gate 726, NOR gate 728 and Flip-Flop 730. The output of exclusive OR gate 732 is connected to the input of a Shift Register 734. The parallel output of Shift Register 734 is connected to the input of a Multiplexer 736 such as a Motorola Differential 4 Channel Multiplexer type CD 4052. The Multiplexer receives the input signals $\overline{TM7}$, $\overline{TM8}$ MT45 and $\overline{TM7}$, $\overline{TM8}$, MT67 and MT7, MT01. The output of the Multiplexer 736 is connected to the inputs of exclusive OR gate 724, AND gate 726 and NOR gate 728.

Referring back to FIG. 23, the Q output of Flip-Flop 290 in the Comparator 164 is a signal indicative of whether the absolute value of the Cos Register 162 is larger than the absolute value of the Sin Register 160. Returning to FIG. 45, the Q output of Flip-Flop 290 is connected to one input of AND gate 738 and the input to inverter 742. The output of inverter 742 is connected to one input to AND gate 740. The alternate inputs of AND gates 738 and 740 are connected to the outputs of exclusive OR gates 708 and 710 respectively. The outputs of AND gates 738 and 740 are connected to alternate inputs of OR gate 744. The output of OR gate 744 is connected to the inputs of AND gates 746 and 756 and NOR gate 748. The alternate inputs to AND gate 746 and OR gate 748 are connected to the output of inverter 750. The outputs of AND gate 746 and NOR gate 748 are connected to the set and reset inputs of Flip-Flop 752. AND gate 746, NOR gate 748, inverter 750 and Flip-Flop 752 comprise a comparator circuit.

AND gate 754 receives the input signals TM7, MT23 and DG31 and has its output connected to the toggle input of Flip-Flop 752. The Q output of Flip-Flop 752 is connected to the alternate input to AND gate 756, while its $\overline{Q}$ output is connected to an input of AND gate 758. The alternate input of AND gate 758 and the input to inverter 750 are connected to the $2^{-1}$ bit location serial output of Shift Register 734.

The outputs of AND gates 756 and 758 are connected to alternate inputs to OR gate 760. The output of OR gate 760 is connected to the input of Shift Register 762. The parallel output of Shift Register 762 is input to Read Only Memory 764 in response to the signal TM7, MT45, DG31. The parallel output of Read Only Memory 764 is connected to the parallel inputs of Shift Register 766. The output of Shift Register 766 is output one bit at a time in response to the signal TM8, $\overline{TM9}$, DG31.

Figure 46:
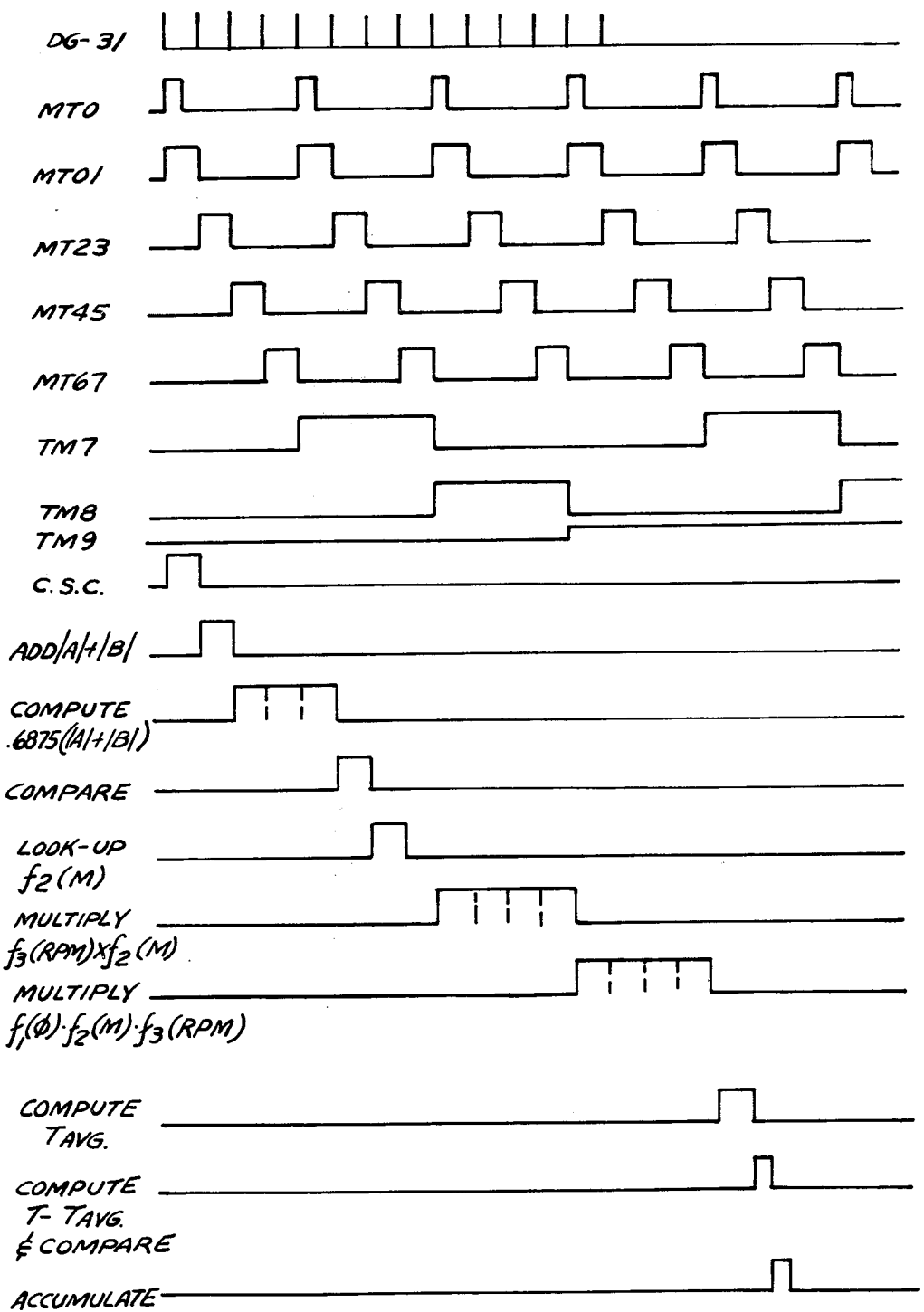
FIG. 46 is a series of waveforms used in the description of the Closed Loop Fuel Distribution Control.

The operation of the $f_2(M)$ Generator 694 is discussed with reference to FIG. 45 and the waveforms shown on FIG. 46. The content of the Sin and Cos Registers 160 and 162 are converted to their absolute values $|A|$ and $|B|$ respectively by the exclusive OR gates 708 and 710 which receive their sign signals, A-SIGN and B-SIGN, at their alternate inputs. Simple inversion in binary format is complimentary arithmetic. The absolute values $|A|$ and $|B|$ are added in the first adder and the sum $|A|+|B|$ is output at the output of exclusive OR gate 720 and stored in Shift Register 736 through AND gate 722 and second adder circuit during the interval $\overline{TM7}$, $\overline{TM8}$, MT45. During the same interval, Multiplexer 736 transmits zero's (0's) to the alternate input of exclusive OR gate 724 so that the content of Shift Register at the end of this interval is $|A|+|B|$.

During the interval $\overline{TM7}$, $\overline{TM8}$, MT67, Multiplexer 736 outputs a signal having a value equal to the content of Shift Register 734 divided by 2 (i.e. the content of Shift Register shifted by one bit location) which is added to $|A|+|B|$ and restored in Shift Register 734. At the end of this interval the content of Shift Register 734 is $(|A|+|B|)+\frac{1}{2}(|A|+|B|)$. During the interval TM7 MT01, the new content of Shift Register is divided by 4 and added to the value $|A|+|B|$ output from OR gate 720 and restored in the Shift Register 734. The content of Shift Register 734 at the end of this interval is $(|A|+|B|)+\frac{1}{4}[|A|-|B|+\frac{1}{2}(|A|+|B|)]$ or $(|A|+|B|)+\frac{1}{4}(|A|+|B|)+\frac{1}{16}(|A|+|B|)$. The serial output of Shift Register 734 taken from the $2^{-1}$ bit location is:

$$(|A|+|B|)(\tfrac{1}{2}+\tfrac{1}{8}+1/16)=0.6875(|A|+|B|)$$

The gate comprising AND gates 738 and 740 inverter 742, and OR gate transmits the larger of the two absolute values appearing at the outputs of exclusive OR gates 708 and 710 to the input of the comparator comprising AND gate 746, NOR gate 748, inverter 750, and Flip-Flop 752, and to AND gate 756 in response to the signal received from the output of Comparator 164 shown on FIG. 23. During the interval TM7, MT23, the output of OR gate 744 is compared with output of Shift Register 734 taken from the $2^{-1}$ bit location. At the end of this interval Flip Flop is toggled by the DG31 signal and the Q output of Flip Flop 752 enables AND gate 756 if the absolute value of the Sin or Cos Registers 160 and 162; i.e. $|A|$ or $|B|$ transmitted by OR gate 744 is greater than 0.6875 ($|A|+|B|$) taken from Shift Register 734.

If 0.6875 ($|A|+|B|$) is greater than either $|A|$ or $|B|$, the $\overline{Q}$ output of Flip-Flop enables AND gate 758.

In the interval TM7, MT45, the greater of $|A|$, $|B|$, or 0.6875 ($|A|+|B|$) is read into the Shift Register 762 depending on the states of Flip Flop 752 and Flip Flop 290 in the Comparator 164 (FIG. 23).

The DG31 signal at the end of the TM7, MT45 interval enables Read Only Memory 764 to be addressed by the content of Shift Register 762. The Read Only Memory 764 stores in discrete address locations the $f_2(M)$ values used in the torque computation. The $f_2(M)$ value stored in the location addressed by the content of Shift Register 762 is temporarily placed in Shift Register 766 from where it is output to the Multiplier 690 one digit at a time in response to the signal DG31 during the interval TM8, $\overline{TM9}$.

Figure 47:
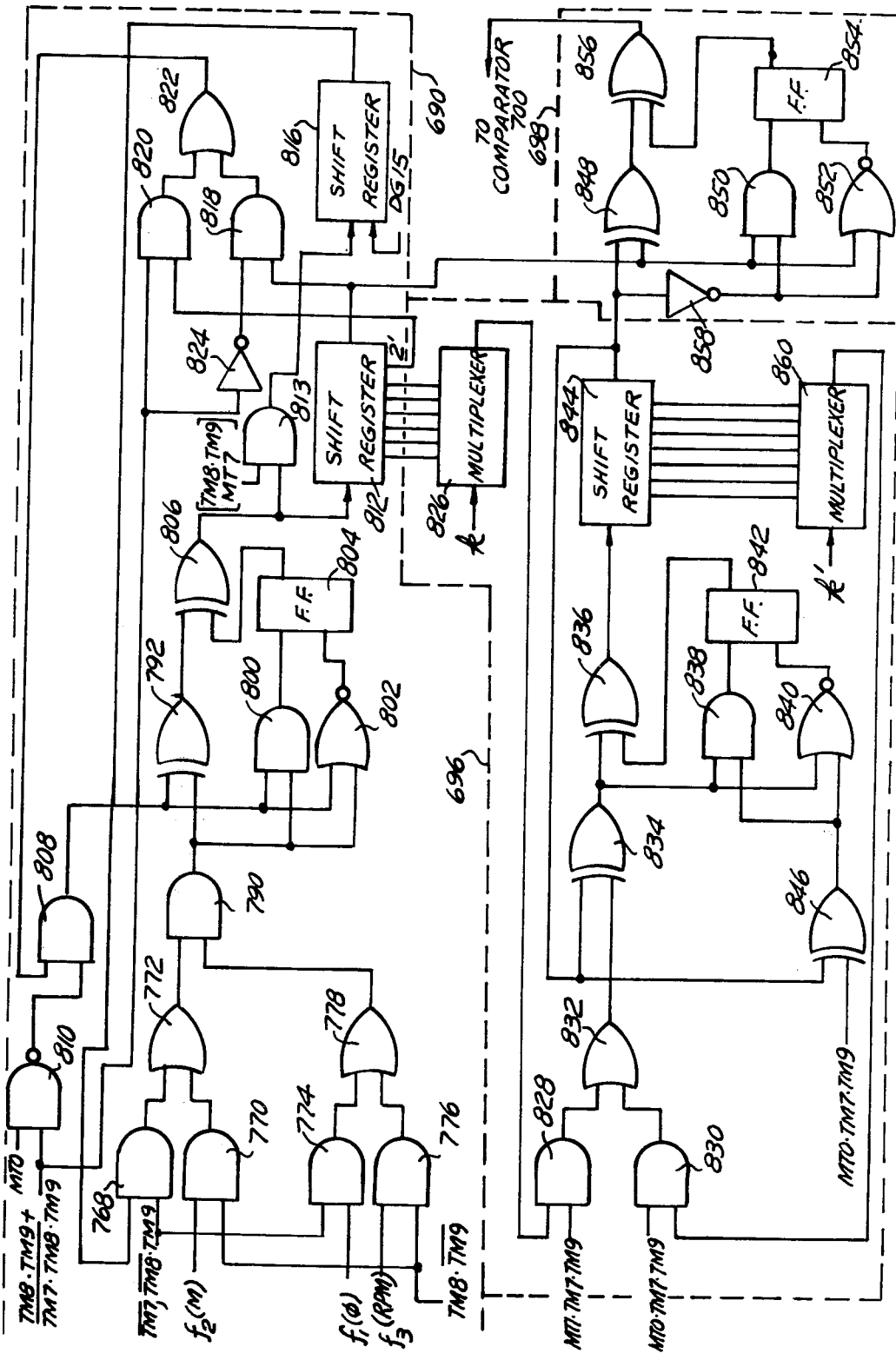
FIG. 47 is a circuit diagram of the Multiplier shown on FIG. 44 and Torque Averaging Circuits shown on FIG. 44.

The details of the Multiplier 690 and Torque Averaging Circuit 696 are shown on FIG. 47. AND gates 770 and 776 receive the timing signal TM8 $\overline{TM9}$ while AND gates 768 and 774 receive the timing signals $\overline{TM7}$ $\overline{TM8}$ TM9. AND gate 770 also receives the $f_2(M)$ data from the output of Shift Register 766 shown on FIG. 45. AND gate 774 also receives the $f_1(\phi)$ data from Shift Register 358 shown on FIG. 23 and AND gate 776 receives the $f_3(RPM)$ data from the $f_3(RPM)$ Read Only Memory 688 shown on FIG. 44. The outputs of AND gates 768 and 770 are connected to alternate inputs of OR gate 772 while the outputs of AND gates 774 and 776 are connected to alternate inputs of OR gate 778. The outputs of OR gates 772 and 778 are connected to the input of AND gate 790. The output of AND gate 790 is connected to an ADD circuit comprising exclusive OR gates 792 and 806, AND gate 800, NOR gate 802 and Flip Flop 804. NAND gate 810 receives the timing signals MT0 and TM7·$\overline{TM9}$ +$\overline{TM7}$·$\overline{TM8}$·TM9 at its alternate inputs. The output of NAND gate 810 is connected to one input of AND gate 808 having its output connected to an alternate input to exclusive OR gate 792. The output of the ADD Circuit appearing at exclusive OR gate 806 is connected to the input of Shift Register 812 and to one input to AND gate 813. The alternate input of AND gate 813 receives the signal TM8·$\overline{TM9}$·MT7. The parallel output of Shift Register 812 is connected to the parallel inputs to Multiplexer 826 while the serial output of Shift Register 812 is connected to one input of AND gate 818 and one input to exclusive OR gate 848, AND gate 850 and NOR gate 852 in the Subtract Circuit 698. The output from Shift Register 812 taken from the $2^1$ bit location is connected to one input to AND gate 820.

The output of AND gate 813 is connected to the input to Shift Register 816. The output from Shift Register 816 is connected to the alternate input of AND gate 768.

AND gate 820 receives the timing signal TM7·$\overline{TM9}$ +$\overline{TM7}$·$\overline{TM8}$·TM9 at its alternate input while AND gate 818 receives the compliment of this timing signal from the output of inverter 824. The outputs of AND gates 818 and 820 are connected to alternate inputs to OR gate 822 having its output connected to an alternate input of AND gate 808.

Multiplexers 826 and 860, AND gates 828, 830 and 838, exclusive OR gates 834, 836 and 846, NOR gate 840, Flip-Flop 842 and Shift Register 844 are connected as shown and comprise the Torque Averaging Circuit 696 which is structurally and functionally the same as the $\phi$ Averaging circuit 172 shown on FIG. 25 and previously discussed relative thereto.

The output of the Torque Averaging Circuit 696 appearing at the output of Shift Register 844 is connected to the Subtract Circuit 698 comprising exclusive OR gates 848 and 856, AND gate 850, NOR gate 852, Flip Flop 854 and inverter 858. The output of exclusive OR gate 856 is connected to one input of Comparator 700 as shown on FIG. 44.

The operation of the Multiplier 690, is discussed with reference to the wave forms shown on FIG. 46. The first operation is the multiplication of $f_3(RPM)$ by $f_2(M)$ to produce the product $f_2(M) \cdot f_3(RPM)$. As previously indicated the number indicative of the function $f_2(M)$ is output from Shift Register 766 (FIG. 45) in reverse order one digit at a time, during the timing interval TM8·$\overline{TM9}$. The first digit of the function $f_2(M)$ generated in the interval TM8·$\overline{TM9}$·MT0 is AND'ed with the $f_3(RPM)$ data and placed in Shift Register 812. The prior data in Shift Register 812 recirculated through AND gate 820 and OR gate 822 is blocked at AND gate 808 disabled by the negative output of NAND gate 810 in response to the MT0 signal at alternate input of NAND gate 810. After the termination of the signal MT0 the output of NAND gate 810 goes high enabling AND gate 808 so that for the next 7 digits output from the Shift Register 766, the AND'ed results of $f_2(M)$ and $f_3(RPM)$ are added to the prior content of Shift Register 812 multiplied by 2 by means of the ADD circuit comprising exclusive OR gates 792 and 806, AND gate 800, NOR gate 802 and Flip-Flop 804. The multiplication by 2 of the data in Shift Register 812 is accomplished by taking the data from the $2^1$ bit location of the shift register as shown. During the interval TM8 $\overline{TM9}$ TM7, indicative of the final addition, AND gate 813 is enabled and the product of the serial multiplication is also stored in Shift Register 816.

An example of the serial multiplication of $f_2(M)$ $f_3(RPM)$ is given below. In the example $f_2(M)=11$ or 1011 in digital format and $f_3(RPM)=9$ or 1001 in digital format.

| OPERATION | MULTIPLIER $f_2(M)$ | OUTPUT AND GATE 790 | RECIRCULATED CONTENT SHIFT REGISTER 812 ($\times 2$) | SUM STORED IN SHIFT REGISTER 812 |
|---|---|---|---|---|
| 0 | 1 | 00001001 | 00000000 | 00001001 |
| 1 | 0 | 00000000 | 00010010 | 00010010 |
| 2 | 1 | 00001001 | 00100100 | 00101101 |

-continued

| OPERATION | MULTIPLIER $f_2$ (M) | OUTPUT AND GATE 790 | RECIRCULATED CONTENT SHIFT REGISTER 812 (×2) | SUM STORED IN SHIFT REGISTER 812 |
|---|---|---|---|---|
| 3 | 1 | 00001001 | 01011010 | 01100011 |

The digital number 01100011 is equivalent to $64+32+2+1=99$ which is the product of $9\times 11$.

In the time interval $\overline{TM7}\cdot\overline{TM8}\cdot TM9$ the content of Shift Register 816 are output in response to the signal DG15 one (1) bit at a time in the reverse order of significance and AND'ed with the $f_1(\phi)$ data. During the interval $\overline{TM7}\cdot\overline{TM8}\cdot TM9\cdot MT0$ the output of NAND gate 810 goes low disabling AND gate 808 preventing the recirculation of the original content of Shift Register 812 so that the content of Shift Register 812 after the first summation is just the ANDed product of $f_1(\phi)$ and the first digit output from Shift Register 816. After the interval $\overline{TM7}\cdot\overline{TM8}\cdot TM9\cdot MT0$ NAND gate 810 is disabled, enabling AND gate 808 permitting the data content of Shift Register 812 multiplied by two (2) to be added to the subsequent AND products of $f_1(\phi)$ and the next seven (7) most significant bits stored in Shift Register 816. The serial multiplication proceeds as previously described such that at the end of the interval $\overline{TM7}\cdot\overline{TM8}\cdot TM9$ the content of Shift Register 812 is the product $f_1(\phi)\cdot f_2(M)\cdot f_3(RPM)$.

The content of Shift Register 812 are input in parallel into Multiplexer 826 of the Torque Averaging Circuit 696 (FIG. 44) which computes the average torque in accordance with the equation:

$$x(kT)=au(KT)+(1-a)\times(kT-T)$$

as previously discussed with reference to the $\phi$ Averaging Circuit 172 shown on FIG. 25. The constant "k" may be a fixed value or may be variable as a function of an engine parameter as previously described.

The average torque, serially extracted from the output of Shift Register 844 is subtracted from the computed torque extracted from Shift Register 812 in the Subtract Circuit 698 to produce a difference signal $\Delta T=T-T_{avg}$ which is input to Comparator 700. After the timing interval $TM8\cdot\overline{TM9}+\overline{TM7}\cdot\overline{TM8}\cdot TM9$, the content of Shift Register 812 is recirculated through AND gate 818, OR gate 822, AND gate 808 and back into the Shift Register 812 through the ADD circuit comprising exclusive OR gates 792 and 806, AND gate 800, NOR gate 802 and Flip-Flop 804.

Figure 48:
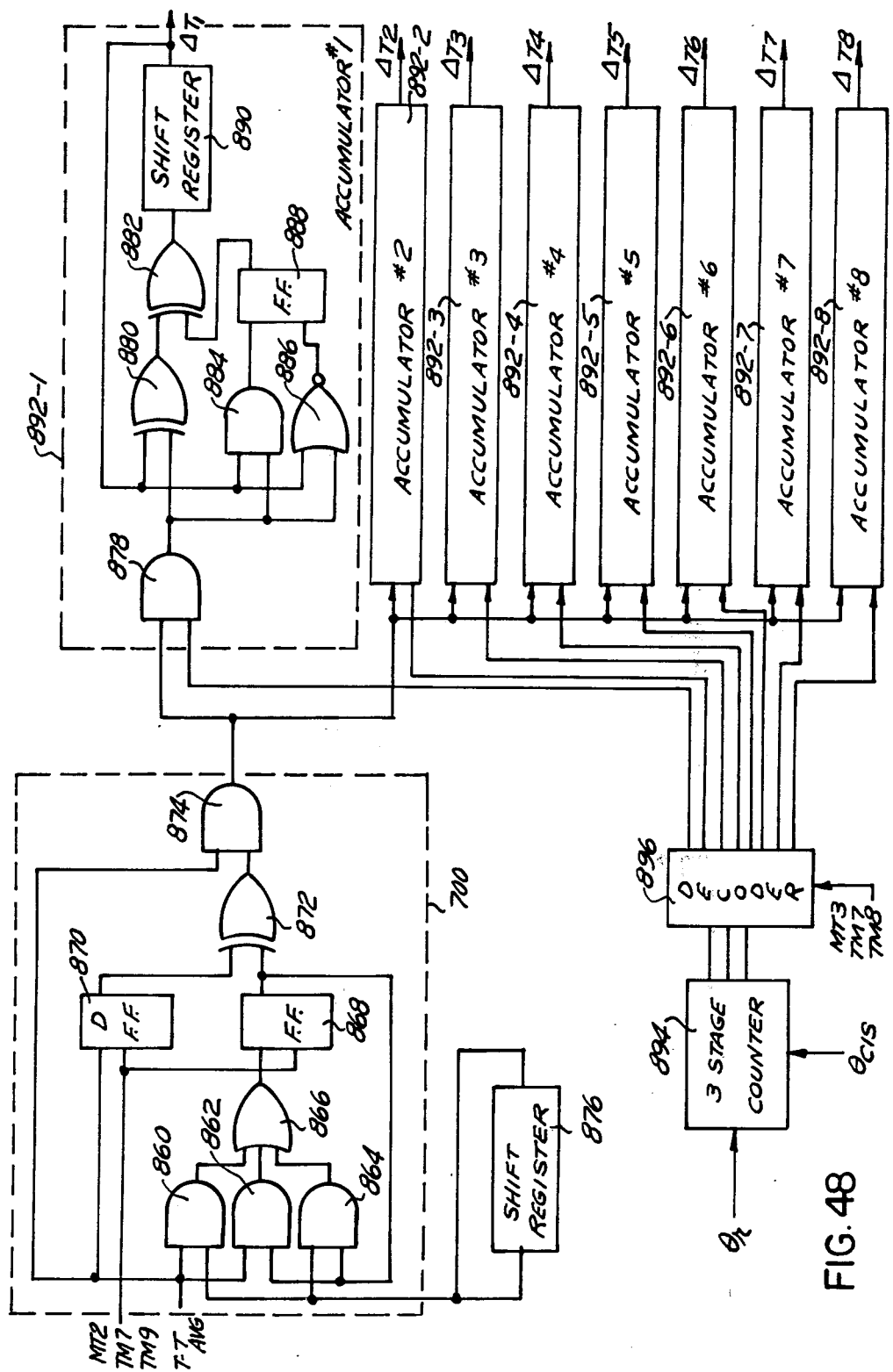
FIG. 48 is a circuit diagram showing the details of the Comparator and Fuel Correction Accumulator shown on FIG. 44.
Figure 49:
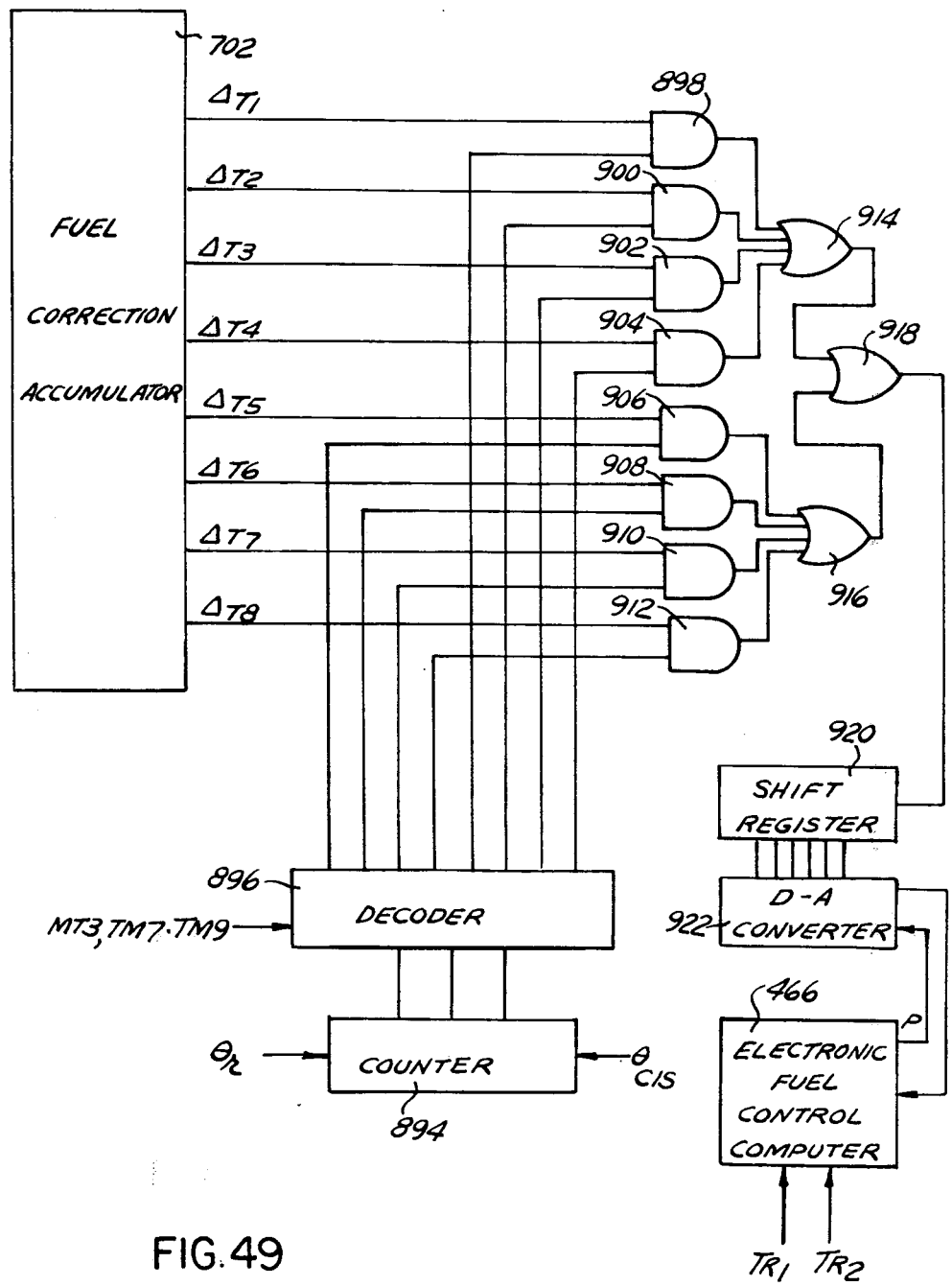
FIG. 49 is a circuit showing the details of the Switch shown on FIG. 44 and application of the fuel correction signal to an Electronic Fuel Control Computer.

The Comparator 700 and Fuel Correction Accumulator Circuit are shown on FIG. 48. Referring to FIG. 48 the output of the Subtract Circuit 698 is received by Comparator 700 and applied to the inputs of AND gates 860, 862, and 874, and the D input of a D-type Flip-Flop 870. A threshold value stored in Shift Register 876 is received by the inputs of AND gates 860 and 864. The outputs of AND gates 860, 862 and 864 are applied to alternate inputs of OR gate 866 having its output connected to the set input of Flip Flop 868. Flip-Flops 868 and 870 are toggled during the timing interval $MT2\cdot TM7\cdot TM9$. The Q outputs of FlipFlops 868 and 870 are connected to alternate inputs of exclusive OR gate 872 having its output connected to the alternate input of AND gate 874.

The output of AND gate 874 is connected to an input of AND gate 878 in an Accumulator Circuit 892-1 and a like AND gate in Accumulator Circuits 892-2 through 892-8. In the illustrated circuit, it is assumed the engine has eight (8) cylinders, therefore the circuit embodies eight accumulators, one for each cylinder. When the engine has more or less than eight cylinders, the number of Accumulator Circuits 892 is adjusted to equal the number of cylinders. Since the Accumulator Circuits are identical, only Accumulator Circuit 892-1 is shown in detail.

Referring back to FIG. 48, the alternate input to AND gate 878 is connected to one output of Decoder 896. The output of AND gate 878 is connected to the inputs of a typical ADD circuit comprising exclusive OR gates 880 and 882, AND gate 884, NOR gate 886 and Flip-Flop 888 connected in a familiar manner. The output of the ADD circuit, appearing at the output of exclusive OR gate 882 is connected to the input of Shift Register 890. The output of Shift Register 890 is the correction signal $\Delta T_1$ indicative of the correction to be applied to the electronic fuel control computer during the computation of the fuel requirements for a particular cylinder. In a like manner the other Accumulator Circuits 892-2 through 892-8 generate the correction signals $\Delta T_2$ through $\Delta T_8$ to be applied to the fuel control computer during the computation of the fuel requirements of the other cylinders. The electronic fuel control computer generates output signal indicative of increased or decreased fuel requirements in response to the values of the individual correction signals $\Delta T_1$ through $\Delta T_8$ on a cylinder-to-cylinder basis.

The signal which enable the respective AND gates 878 in the Accumulator Circuits 892-1 through 892-8 so that the respective Accumulator Circuits store the $T-T_{avg}$ signal corresponding to their respective cylinders are generated by a synchronizing circuit comprising 3-Stage Counter 894 and Decoder 896. The 3-Stage Counter 894 receives the signals $\theta_r$ and $\theta_{cis}$ and generates a number indicative of the $\theta_r$ signals received after each $\theta_{cis}$ signal. The parallel output of Counter 896 are received by a Decoder 896 which outputs a signal on one of eight parallel outputs in response to the signals received from the Counter 894 and the timing signal MT3 TM7 TM9. The Decoder 896 is of conventional structure and may be a commercially available component or may be constructed individual components similar to that shown on FIG. 32. One of the parallel outputs of the Decoder 896 is connected to the alternate inputs of AND gate 878 in each of the other Accumulator Circuits as shown with reference to Accumulator 892-1.

The operation of the circuit of FIG. 48 will be discussed with reference to the waveforms shown on FIG. 46. During the timing interval MT2 TM7 TM9 the value of the signal $T-T_{avg}$ is compared with a threshold signal stored in Shift Register 876 and the result of the comparison is stored at the output of Flip-Flop 868. The Shift Register 876 actually stores the 2's complement of the threshold value. When the value of T-Tavg is a positive number and less than the stored value of the threshold or when the value of T-Tavg is a negative number and greater than the stored threshold valve, at the end of the timing interval MT2 TM7 TM9 the Q output of Flip-Flop 868 is a logic zero. Conversely, when the value of T-Tavg is a positive number and has a value greater than the threshold value or T-Tavg is a negative number having a value less than the threshold value, the Q output of Flip-Flop 868 at the end of the timing interval MT2·TM7·TM9 is a logic 1.

The Q output of Flip-Flop 870 is a logic 0 for positive values of T-T$_{avg}$ and a logic 1 for negative values. The output of exclusive OR gate 872 will therefore have a logic 0 output in response to positive or negative T-T$_{avg}$ signals having a value less than the threshold value. When the value of T-Tavg is greater than the threshold value, the output of exclusive OR gate 872 becomes a logic 1 enabling AND gate 874. At the end of the signal MT2·TM7·TM9, the signals toggling Flip-Flops 868 and 870 are terminated and they retain their final state.

During the timing interval MT3 TM7 TM9, one of the AND gates 878 in the Accumulators 892-1 through 892-8 is enabled by a signal received from Decoder 896. Therefore if AND gate 874 is enabled as a result of the signal T-Tavg having a value larger than the threshold value determined by the prior comparison, the signal T-Tavg is passed by AND gates 874 and 878 and added to the recirculated content of Shift Register 890. Obviously, if the value of T-Tavg has a negative value, the absolute value of the negative number will be subtracted from the recirculated content of Shift Register 890, Shift Register 890 stores a value $\Delta T = \Sigma T$-Tavg for all values of T-Tavg greater than the threshold value. The value $\Delta T$ may be a positive or negative number depending upon whether the torque output of the respective cylinder is greater or smaller than the average torque value. The threshold value stored in Shift Register 876 is indicative of nominal variations in the torque output of each cylinder resulting from the parameters which cause differences in the torque output other than variations in the fuel quantity as previously discussed with reference to the closed loop roughness fuel control system. The variations of signal T-Tavg having a value less than the threshold value are fully anticipated by the system and need not be added into the Accumulator Circuits, since they are indicative of a cylinder contributing the desired torque and therefore no fuel correction is required.

The distribution of the signals T-Tavg to the appropriate Accumulator Circuit 892-1 through 8928 is accomplished by the 3 Stage Counter 894 and Decoder 896. The Counter 894 is reset in response to the cylinder identification signal $\theta_{cis}$ which identifies that a particular cylinder is about to initiate its torque impulse cycle. The $\theta_{cis}$ signal may be generated for any cylinder, but for discussion purposes, it will be assumed the $\theta_{cis}$ signal is generated just prior to the cylinder associated with Accumulator Circuit 892-1 and the Counter 894 will thereafter count the reference signals $\theta_r$ and generates a number indicative of the cylinder for which the torque data is being processed. This number is received by the decoder which also receives the timing signal MT3 TM7 TM9 indicative that the processing of the torque data has been completed and the value T-T$_{avg}$ is ready to be entered into the appropriate accumulator. The Decoder 896 generates a signal during the timing interval MT3 TM7 TM9 which enables the AND gate corresponding to the cylinder identified by the number received from the Counter 894. The signal T-T$_{avg}$ is thereby added to or subtracted from the accumulated signal $\Delta T$ stored in the Accumulator Circuit 892 corresponding to the identified cylinder.

The details of the Switch 706 (FIG. 43) are shown on FIG. 48. The output signals $\Delta T_1$ through $\Delta T_8$ stored in Fuel Correction Accumulator 702 are received at inputs to AND gates 898 through 912. The alternate inputs of AND gates 898 through 912 are connected to the parallel outputs of the Decoder 896 receiving a parallel input from the Counter 894 as previously discussed. The connections between AND gates 898 and 912 are made in a different sequence than that used for sequentially energizing the Accumulators 892-1 through 892-8. The outputs of AND gates 898, 904 are connected to the input of OR gate 914 while the outputs of AND gates 906 through 912 are connected to the input of OR gate 916. The outputs of OR gates 914 and 916 are connected to the input of OR gate 918. As is known in the art a single multi-input OR gate or a greater number of dual input OR gates may be used to OR the outputs of AND gates 898 through 912 to produce a single output as illustrated by the output of OR gate 918. The output of OR gate 918 is connected to the input of Shift Register 920 which temporarily stores the received signal $\Delta T$. The parallel output of Shift Register 920 is connected to the parallel input of Digital to Analog (D/A) Converter 922. The analog output of the D/A Converter 922 is received by Electronic Fuel Control Computer 466 such as the analog fuel control computer 466 shown in detail on FIG. 38.

The delay pulses P generated by the Electronic Fuel Control Computer 466 and shown on FIG. 38 may be used to enable the D/A Converter 922 to receive the $\Delta T$ data stored Shift Register 920 prior to the computation by the Electronic Fuel Control Computer 466 of the injection signal for the injector valve supplying fuel to a particular cylinder.

It is, of course, recognized that when the such as a programmed minicomputer, a hybrid or fabricated from discreet components, the D/A Converter 922 may be omitted and the data $\Delta T$ may be entered directly into the digital computer from Shift Register 920 or possibly even directly from OR gate 918. In a like manner when the injection timing is computed individually for each cylinder, the injection timing signal may be used to transfer the data $\Delta T$ from Shift Register 920 to the Electronic Fuel Control Computer.

The operation of the circuit shown on FIG. 48 is as follows. The Fuel Correction Accumulator 702 stores a plurality of correction signals $\Delta T_1$ through $\Delta T_n$ which are the correction signal to be used in the computation of the fuel requirements for each cylinder such that the torque contribution of each cylinder to the total output torque of the engine will be approximately equal. In the timing interval MT3, TM7·TM9 prior to the computation of fuel requirements for a particular cylinder, the AND gate receiving the correction signal $\Delta T$ associated with the particular signal stored in the Fuel Correction Accumulator 702 is enabled and the correction signal associated with the particular cylinder is transferred to Shift Register 920 where it is temporarily stored. Referring now to FIGS. 38 and 39, the correction signal $\Delta T$ is transfered to the Digital to Analog Converter 922 in response to the delay pulse P generated by the Electronic Fuel Control Computer 466 which signifies the beginning of the final computation of the fuel injection signal for the particular cylinder. The Digital to Analog Converter converts the digital correction signal $\Delta T$ to an analog signal which is negatively summed with the bias signal $V_b$ generated by the Closed Loop Roughness Control 668.

As previously indicated, when the torque T generated by the individual cylinder is larger than the average torque, the correction signal $\Delta T$ has a positive value which when negatively summed with the bias signal $V_b$ decreases the value of the signal applied to the positive input to the differential Amplifier 670. This reduces the conductance of transistor 674 and the quantity of the sink current is reduced. This increases the value of the charge current $I_c$ to either capacitance 650 or 651. Capacitances 650 or 651 will now be charged at a faster rate and will reach the value of the load signal from the Load Sensor 636 in a shorter time interval effectively decreasing the duration of the injection pulse signal being generated at the output terminal 670. The shortened period of the injection pulse signal decreases the quantity of fuel being delivered to the particular cylinder in proportion to the value of the generated correction signal $\Delta T$. The reduction in the quantity of fuel supplied to the particular cylinder results in a comparable reduction in the torque generated. In this manner the correction signals $\Delta T$ applied to the Electronic Fuel Control Computer effectively equalizes the torque outputs of each cylinder.

In an alternate embodiment, not illustrated, the correction signal $\Delta T$ may be negatively summed with the load signal generated by the Load Sensor 636. The correction signal $\Delta T$ will effectively reduce the value of the load signal and reduce the length of the injection signal generated at the output terminal 656. Those skilled in the art will recognize that the correction signal $\Delta T$ may be applied elsewhere in the Electronic Fuel Control Computer circuit to achieve the same result.

TIMING OPTIMIZATION CONTROL

The fuel distribution principal just described may also be used to optimize various timing functions of the engine on a cylinder to cylinder basis, such as the time at which the individual spark plugs are energized or the time at which the fuel is injected into the engine. Fuel injection time in compression ignited engines, such as a diesel engine, is more critical than in a spark ignited engine, however, it is well known that properly controlled fuel injection time for a spark ignited engine can also significantly improve the engine's efficiency.

First referring back to FIG. 23, which shows the circuit in which a signal indicative of the computed phase angle $\phi$ for each torque impulse is computed and stored in the Parallel Load Shift Register 358. This phase angle contains the basic timing information for each torque impulse, from which individual timing correction signals can be generated for each cylinder. These correction signals may be applied to correct ignition timing, injection timing or both as shall be discussed hereinafter. Instead of generating a signal indicative of the average phase angle $\phi_{avg}$ as shown on FIG. 24, the computed phase angle may be directly compared with the reference phase angle $\phi_r$ to generate to error signal $\Delta \phi$ which can then be individually accumulated to generate a correction signal for each cylinder. These corrections may then be applied one at a time and in the proper sequence to the circuits generating the ignition and/or injection signals during the period when the ignition or injection time is being computed.

Figure 50:
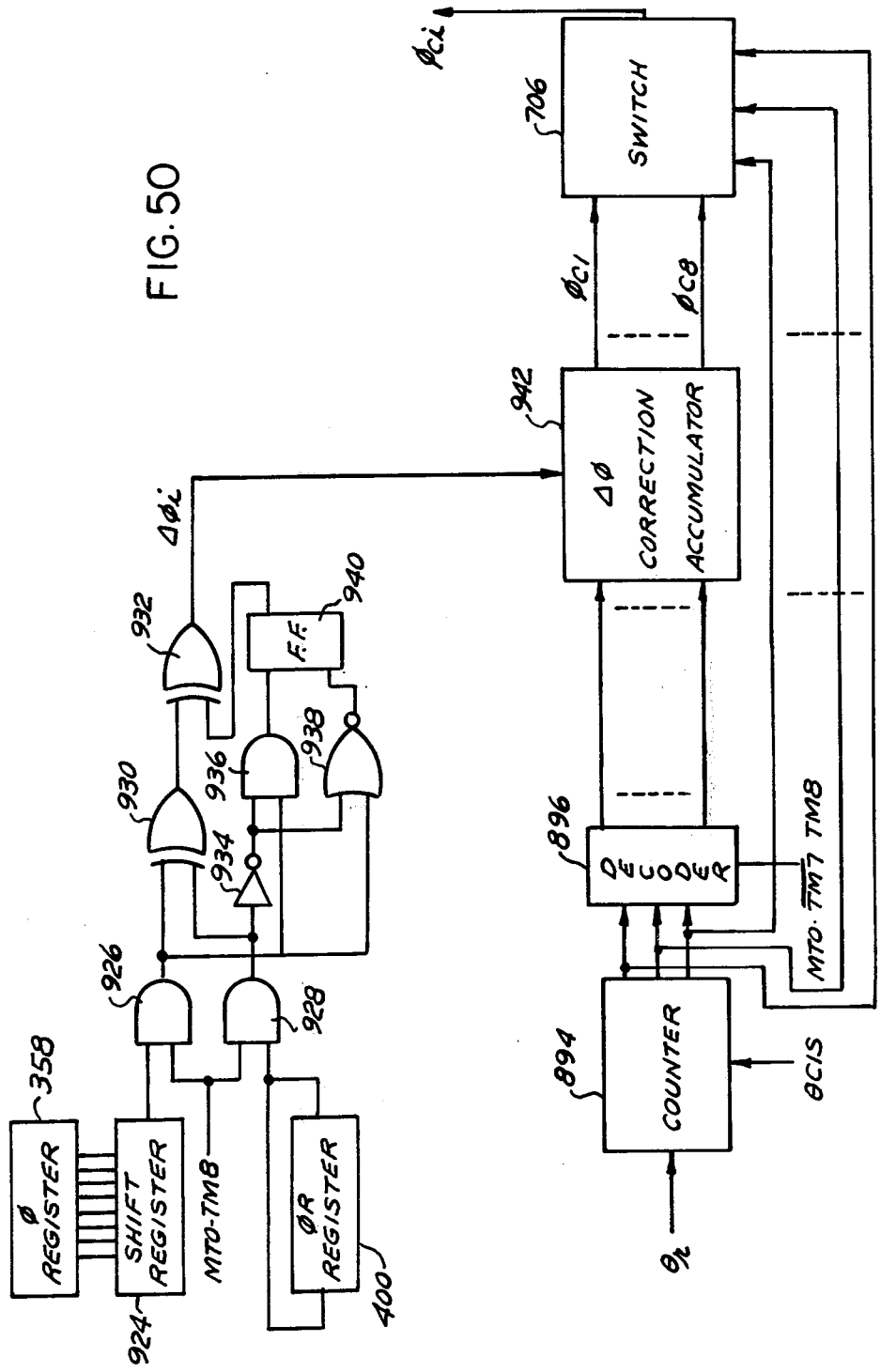
FIG. 50 is a circuit diagram of a Timing Distribution Control.

The circuit details for the Timing Optimization Control are shown on FIG. 50. Referring to FIG. 50, the $\phi$ Register 358 is the Parallel Load Shift Register 358 shown on FIG. 23 and stores the value of the computed phase angle $\phi$ as previously discussed.

The parallel output of $\phi$ Register 358 is connected to a parallel input serial output Shift Register 924 having its output connected to an input of AND gate 926. Alternatively, the phase angle $\phi$ may be serially out directly to AND gate 926 eliminating Shift Register 924. A $\phi_R$ Register such as Shift Register 400 shown on FIG. 25 stores the value of the reference phase angle $\phi_R$. The output of $\phi$ Register 400 is connected to the input of AND gate 928. The alternate inputs to AND gates 926 and 928 receive the timing signal MT0 $\overline{TM7}$ TM8. The outputs of AND gates 926 and 928 are connected to the inputs of a conventional subtract circuit comprising exclusive OR gates 930 and 932, inverter 934, AND gate 936, OR gate 938 and Flip-Flop 940 connected as shown. The output of the subtract circuit from exclusive OR gate 932 is the error signal $\Delta \phi_i$ which is input to a $\phi$ Correction Accumulator 942. The $\phi$ Correction Accumulator 942 is structurally and functionally the same as the Fuel Correction Accumulator 702 shown in detail as Accumulator 892-1 through 892-8 of FIG. 48. A Counter 894 and 896 as shown on FIG. 48, receiving the timing signals $\theta_r$ and $\theta c_{is}$, generate signals operative to enter the $\Delta \phi_i$ signal into the appropriate accumulator in the $\phi$ Correction Accumulator 942 during the timing interval MT0 $\overline{TM7}$ TM8. The error signal $\Delta \phi$ generated from the torque impulses of each cylinder are accumulated and stored in an associated accumulator to generate the correction signals $\phi_{c1}$ through $\phi_{c8}$ as discussed with reference to the Fuel Correction Accumulator as shown on FIG. 48. The correction signal $\phi_{c1}$ through $\phi_{c8}$ stored for each cylinder are output to the Switch 706 which in response to the signals from the Decoder 896 outputs the correction signals, one at a time, in a predetermined sequence to the ignition or injection timing controls so that they may be used in the computation of the ignition or injection timing for the associated cylinder.

The application of the individual correction signals to both ignition and injection timing are shown on FIGS. 51 and 52 respectively. Referring to FIG. 51, the ignition angle $\phi_i'$ computed from the engine speed and manifold pressure is stored in Register B 142 as illustrated and discussed with reference to FIG. 15. The correction signal $\phi_{c1}$ from the Switch 706 is temporarily stored in a Shift Register 944. The outputs of Register B and Shift Register 944 are input into an ADD Circuit 178 where they are added and sum $\phi_i' + \phi_{c1}$ is placed in an Ignition Angler Register in response to the timing signals $P_1$ and ADDT initiating the computation of the ignition signal for the cylinder associated with correction signal stored in the Shift Register 944.

The simultaneous occurrence of the timing signals $P_1$ and ADDT is indicative of the first MT0 signal generator after each reference signal $\theta_r$ as described with reference to the Closed Loop Timing Control and shown on the waveforms of FIG. 21.

As previously discussed, the sum signal stored in the Ignition Angle Register 180 is received by a Rate Multiplier 182 which generates a rate signal having a frequency proportional to the value of the sum signal. The rate signal generated by Rate Multiplier 182 is counted up in an Up Counter 184 in a first interval between successive reference signals $\theta_r$ to generate a number indicative of the sum signal divided by engine speed. During this period, the next correction signal associated with the next sequential cylinder is received and stored in Shift Register 944. At the end of the first interval, the number stored in the Up Counter 184 is transferred to a Down Counter 186, which during the next sequential interval between successive reference signals is counted down. Simultaneously, the next sequential sum signal previously stored in the Ignition Angle Register 180 is input to the Rate Multiplier 182 which generates a new rate signal having a frequency proportional to new signal. During the count down interval, the Down Counter generates a signal which is terminated when Down Counter reaches zero counts. The termination of the signal generated by the Down Counter is the ignition signal which is generated at a time after the reference signal determined by the value of the sum signal. The output of the Down Counter 168 is received by the Dwell Circuit 188 which controls the on-off time of the Amplifier 104 energizing the ignition coil as previously described. In this manner, the time at which the ignition signal is generated is individually trimmed by the error signal associated with the particular cylinder.

Referring now to FIG. 52, the injection timing signals for the Electronic Fuel Control Computer 466 may be computed from one or more of the engines operating parameters using the same basic circuit shown on FIG. 15. When used for injection timing, it is recognized the values stored in the Read Only Memory 122 would be different from the values stored for ignition timing, however, the operational principles of the circuit are the same. As with ignitiion timing, the generated timing angle $\phi_i'$ is stored in Register B 142. The injection timing correction signal $\phi_{ci}$ corresponding to the cylinder for which the next sequential injection signal is to be computed is stored in Shift Register 944. The operation of the circuit down to the output of the Down Counter 186 is the same as previously described with reference to FIG. 51. The injection reference signal $\theta_r$ (INJ) may be generated in the same way as the ignition reference signal $\theta_r$. The output of the Down Counter 186 is connected to the input of a One Shot Multivibrator 946 which generates a short pulse at its output in response to the termination of the Down Counter's output signal. The output of the One Shot Multivibrator 946 toggles Flip-flop 948 which changes state in response to each output pulse generated by the One Shot Multivibrator 946. The trigger signals TR1 and TR2 used to initiate the generation of the fuel injection pulses generated by an electronic fuel control computer, such as Electronic Fuel Control Computer 466, are generated at the complementary Q and $\overline{Q}$ outputs of Flip-Flop 948. The trigger signals TR1 and TR2 are therefore generated at a time which is a function of the engine's operational parameters and trimmed by the phase angle correction signal $\phi_{ci}$ causing the injection to occur at a time optimizing the conversion of the energy produced by the combustion of the air/fuel mixture in each cylinder into rotational energy of the engine's crankshaft.

An alternate embodiment showing the application of the individual phase angle correction signals $\phi_{ci}$ to a simplified injection timing system is illustrated on FIG. 53. In this embodiment, the timing angle $\phi_i'$ is derived directly from the injection reference signals $\theta_r$ (INJ) and are not computed from operational parameters of the engine as illustrated by the circuit shown on FIG. 15. The reference signals $\theta_r$(INJ) are generated for each cylinder at predetermined engine crankshaft angles greater than the maximum injection advance angle anticipated for the particular engine. These reference signals may be generated in the same way as described for the generation of the reference signals $\theta_r$ for ignition advance.

Referring to FIG. 53, the phase angle correction signals $\theta_{ci}$ are input to the Shift Register 950 as in the embodiments of FIGS. 51 and 52. Shift Register 950 has a parallel output which transfers the injection correction signal $\phi_{ci}$(INJ) directly to the Rate Multiplier 182 in response to each injection reference signal $\theta_r$ (INJ). The Rate Multiplier 182 in conjunction with Up and Down Counters 184 and 186 generate a signal at the output of the Down Counter 186 which is terminated when the counts in the Down Counter reach zero as previously described. The One Shot Multivibrator 946 and Flip-Flop 948 cooperate to produce the complementary trigger signals TR1 and TR2 at the Q and $\overline{Q}$ outputs of Flip-Flop 948 in response to the termination of the output signal of Down Counter 186 as described with reference to FIG. 52. The trigger signals TR1 and TR2 are received by the Electronic Fuel Control Computer 466 and initiate the fuel injection signal at a time after each injection reference signal $\theta_r$(INJ) determined by the value of the phase angle correction signal $\phi_{ci}$.

INTEGRATED CLOSED LOOP ENGINE CONTROL

The various closed loop control systems described herein are illustrative of the various types of information that may be extracted from the instantaneous rotational velocity of the engine's output shaft. They also show, by way of specific examples, how the rotational velocity data may be processed to extract information about one or more operational parameters of the engine. Upon further analysis, a person skilled in the art would recognize that the instantaneous rotational velocity of the engine's output shaft contains additional information indicative of other operational parameters of the engine which may also be extracted by appropriate processing. It is recognized that the extractable information is not limited to information useful in engine control, but may also include information useful in engine diagnostics. Therefore, the scope of the disclosed invention is not limited to the specific embodiments of the disclosed controls or to the processing methods described herein.

As previously shown by specific examples, the signals indicative of the various parameters extracted by the processing of the instantaneous rotational velocity of the engine's output shaft may be combined into an integrated engine control optimizing the engine's performance about one or more of a variety of the engine's operational parameters. For example, the integrated engine control may optimize the engine's output power, torque, or fuel economy. Additionally, the engine control may be optimized to reduce the emission of undesirable exhaust gases, to generate exhaust gases compatible with catalytic converters such as those used on present day automotive vehicles, or even control the quantity of exhaust gases being recirculated back through the engine. Such an integrated control system is illustrated in block form on FIG. 54.

Referring to FIG. 54, an engine 20 which may be a compression ignited (diesel) or spark ignited engine is subject to environmental and operational inputs such as the ambient air temperature, ambient air pressure, humidity, etc. along with a command indicative of the desired output power or speed of the engine. Sensors, collectively depicted as block 1002, generate signals indicative of the input command, the environmental parameters and sleected engine operating parameters which are input to an Engine Control Computer 1000. Selected signals required for the generation of the output shaft's instantaneous rotational velocity signals and for the subsequent processing to extract the desired operational parameters are input to a Rotational Velocity Sensor 1004 and the Processor 1006.

The Rotational Velocity Sensor 1004 detects the rotation of the engine's output shaft and generates signals indicative of the output shaft's instantaneous rotation velocity as previously described.

The Processor 1006 processes the signals indicative of the instantaneous rotational velocity of the engine's output shaft and generates signals indicative of desired engine operating parameters which are communicated to the Engine Control Computer 1000. The output signals of the Processor 1006, generally designated by arrows A, B, and C, may be one or more of the signals generated by the various closed loop controls previously discussed herein or any other signals indicative of other engine parameters extracted from the signals generated by the Rotational Velocity Sensor 1004.

The Engine Control Computer 1000 generates control signals in response to the signals received from the Sensors 1002 and the Processor 1006 optimizing the performance of the engine about the selected operational parameters. As previously indicated, these operational parameters may be power, torque, fuel economy, exhaust emissions or any other parameter desired to be controlled.

A specific embodiment of the integrated engine control applied to a spark ignited engine is illustrated in FIG. 55. Referring to FIG. 55, the Engine Control 1000 includes an electronic fuel control computer such as Electronic Fuel Control Computer 466 illustrated on FIG. 36 and an Ignition Timing and DIstribution Control as shown in detail at the top and right hand side of FIG. 15.

The Processor 1006 comprises three separate processors designated as Roughness Signal Generator 1007, Timing Signal Generator 1008 and Distribution Signal Generator 1009. The Roughness Signal Generator 1007 may be a Closed Loop Engine Roughness Control 671 such as illustrated in FIG. 36 and may or may not include the Warm-Up Control 583 shown on FIG. 37. The Roughness Signal Generator 1007 generates a bias signal, such as the bias signal $V_b$ which controls the fuel delivery to the engine so that the engine operates at a predetermined roughness level. The bias signal is computed from the instantaneous rotational velocity of the engine's crankshaft resulting from the combustion of the air/fuel mixture as previously disclosed.

The Timing Signal Generator 1008 may be a Phase Angle Generator 96 such as discussed in detail with reference to FIGS. 20 through 26, which computes the phase angle of each torque impulse and generates a phase correction signal $\phi_c$. The Ignition Timing and Distribution Control 28 responds to the phase correction signals $\phi_c$ and generates the ignition timing signals at a time operative to cause the phase angle of the torque impulses to have a predetermined value.

The Distribution Signal Generator 1009 may be a Distribution Control 680 such as discussed in detail with reference to FIGS. 44 through 49 which generates torque correction signal $\Delta T_n$ in response to the data generated by the Rotational Velocity Sensor 1004. The torque correction signals $\Delta T_n$ may be applied to the Electronic Fuel Control Computer 466 to control the quantity of fuel being delivered to the engine, or the time at which the fuel is delivered to the engine or both to equalize the torque contribution of each combustion chamber to the total torque output of engine.

As the engine control systems become increasingly complex, the interactions between the individual closed loop controls could be counter productive or result in an over correction. For instance, the roughness signal is a function of timing (either injector or ignition), fuel distribution, exhaust gas recirculation as well as other factors. In a like manner, the timing correction signal $\phi_c$ is also a function of engine roughness as well as the other factors recited above, and the interactions of one correction could nullify the other or result in an excessive dual correction. The integrated scheme shown on FIG. 56 treats the engine as a multi-input multi-output system which can eliminate these adverse results. State variable theory dictates that every state variable be fed through a gain, to every input control. With this scheme, the total closed loop dynamics can be tailored by the selection of a gain matrix K and a governing control law such that:

$$\underline{U} = K\underline{X}$$

where $\underline{U}$ is the input vector and $\underline{X}$ is a state vector.

Figure 56:
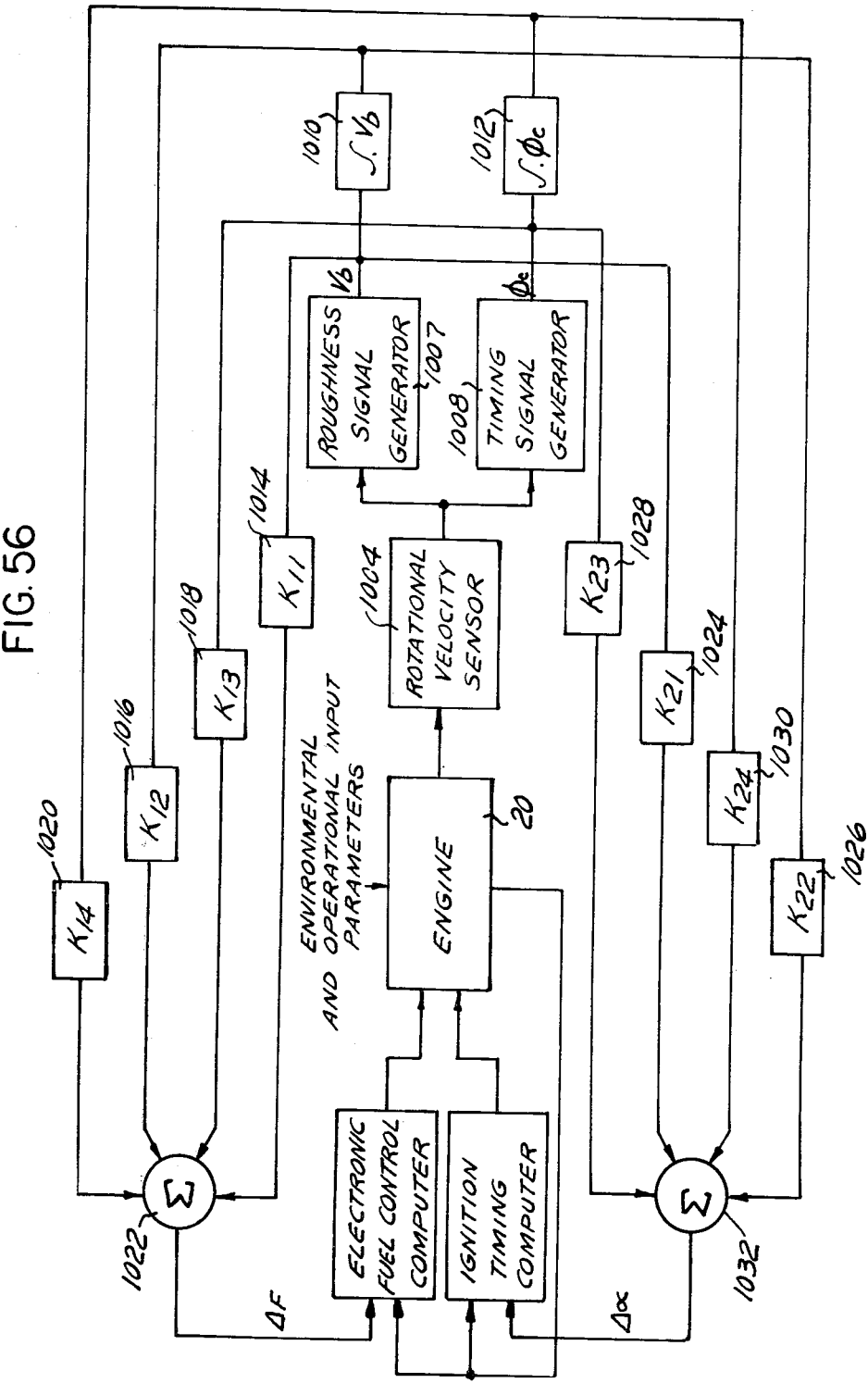
FIG. 56 is a block diagram of an Integrated Closed Loop Engine Control having a state variable matrix.

For simplicity, only two closed loops are shown in the embodiment illustrated in FIG. 56. However, the principal is applicable to the three closed loop controls illustrated in FIG. 55 and may be expanded to include other state variables.

Referring now to FIG. 56, the operation of the Engine 20 is controlled by the environmental and operation inputs as well as the signals generated by the Electronic Fuel Control Computer 466 and the ignition signals generated by the Ignition Timing and Distribution Circuit 28 as previously discussed relative to FIG. 51. The Rotational Velocity Sensor 1004 generates data indicative of the instantaneous velocity of the engine's crankshaft which is converted to a roughness bias signal $V_b$ and a phase correction signal $\theta_c$ by the Roughness Signal Generator 1007 and the Timing Signal Generator 1008 respectively. In this system, the input vector to the engine u is:

$$U = \begin{bmatrix} F/A \\ \alpha \end{bmatrix}$$

where F/A is the desired air fuel mixture to be delivered and $\alpha$ is the desired ignition spark advance required for the efficient operation of the engine.

The state vectors X are:

$$X = \begin{bmatrix} V_b \\ \int V_b \\ \phi_c \\ \int \phi_c \end{bmatrix}$$

where $V_b$ is the output signal generated by the Roughness Signal Generator 1007 and $\phi_c$ is the output signal generated by the Timing Signal Generator 1008 and $\int V_b$ and $\phi_c$ are the integrated values of $V_b$ and $\phi_c$ respectively.

The gain matrix K is depicted in FIG. 56. Returning now to FIG. 56, the bias signal $V_b$ generated by the Rougness Signal Generator 1007 is multiplied by a factor $K_{11}$ in an Amplifier 1014 and by factor $K_{21}$ in an amplifier 1024. The bias signal $V_b$ is also integrated in an Integrator 1010 and generates the signal $\int V_b$ which is multiplied by a factor $K_{12}$ in Amplifier 1016 and by a factor $K_{22}$ in Amplifier 1026. In a like manner, the signal $\phi_c$ generated at the output of the Timing Signal Generator 1008 is multiplied by a factor $K_{13}$ in Amplifier 1018 and by a factor $K_{23}$ in Amplifier 1028. The integrated signal $\int \phi_c$ is generated at the output of Integrator 1012 and is multiplied by a factor $K_{14}$ in Amplifier 1020 and by a factor $K_{24}$ in Amplifier 1028.

The K matrix signals $K_{11} V_b$, $K_{12} \int V_b$, $K_{13} \phi_c$ and $K_{14} \int \phi_c$ generated by Amplifiers 1014 through 1020 are summed in Sum Amplifier 1022 and the sum signal F input into the Electronic Fuel Control Computer 466. The Electronic Fuel Control Computer 466 generates signals controlling the air fuel delivery to the engine in response to the signals indicative of the environmental and operational parameters of the engine and the sum signal $\Delta F$.

In a like manner, the signals $K_{21} V_b$, $K_{22} \int V_b$, $K_{23} \phi_c$ and $K_{24} \int \phi_c$ are summed in Sum Amplifier 1032 and the sum signal $\Delta \alpha$ input to the Ignition Timing Computer 28. The Ignition Timing Computer generates signals controlling the ignition time of the spark plugs as a function of the received operational parameters and the sum signal $\Delta \alpha$ generated by Sum Amplifier 1032.

The multiplication factors $K_{11}$ through $K_{14}$ and $K_{21}$ through $K_{24}$ can be computed using linear optimal control theory or exerimentally determined.

As previously indicated, the gain matrix shown in FIG. 52 may be expanded to include more than the two closed loop feedback controls illustrated.

What is claimed is:

1. A warm-up control for an internal combustion engine having sensors generating signals indicative of the operational parameters of the engine including a temperature sensor generating a temperature signal indicative of the engine's temperature, and a load sensor generating a load signal indicative of the engine's load, fuel control means for generating fuel delivery signals indicative of the engine's fuel requirements in response to the signals generated by said sensor and other input signals and a fuel delivery means for delivering fuel to the engine in response to the fuel delivery signals, said warm-up control comprising:
    first signal generator means for generating a first warm-up correction signal having a value variable as a first function of the engine temperature below a first predetermined temperature;
    second signal generator means for generating a second warm-up signal having a value variable as a second function of the temperature signal below a second predetermined temperature;
    switch means controlling the transmission of the signals generated by said first and second signal generators to the fuel control means in response to the load signal, said switch means transmitting the signal generated by said first signal generator means to the fuel control means when the load signal is indicative of a load applied to the engine, and transmitting the signal generated by said second signal generator to the fuel control means when the load signal is indicative of the absence of a load.

2. The warm-up control of claim 1 wherein said first predetermined temperature is the same temperature as said second predetermined temperature.

3. The warm-up control of claim 2 wherein said engine includes a transmission means disposed between the engine and a load and wherein said transmission means has at least one first state connecting the engine to a load and at least one second state in which the engine is disengaged from the load, said load sensor is a switch responsive to the state of said transmission means.

4. The warm-up control of claim 3 wherein said transmission means is an automotive transmission having a plurality of said first states and at least one second state, said load sensor is a switch generating a first signal when said automotive transmission is in any of said first states and a second signal when said transmission is in said at least one second state.

5. The warm-up control of claim 3 wherein the transmission means is an automatic automotive transmission having a gear shift lever switch generating a first signal when said automatic transmission is in said first state and a second signal when said transmission is in said second state, said load sensor is said gears shift lever switch.

6. The warm-up control of claim 1 further including means for generating a load enrichment signal for a predetermined time in response to the initiation of a load signal indicative of a load being applied to the engine.

7. The warm-up control of claims 4 or 5 further including:
    means for generating a load enrichment signal for a predetermined time in response to the load signal switch terminating said second signal and generating said first signal indicating a load has been applied to the engine.

8. The warm-up control of claim 7 wherein said engine has a sensor generating an idle signal indicative of the engine being in an idle mode of operation, said means for generating a load enrichment signal is further operative to generate said load enrichment signal in response to the termination of said idle signal.

9. The warm-up control of claim 7 wherein the fuel control means is a closed loop engine roughness control having an engine roughness sensor generating roughness signals indicative of the engine's roughness, a summing means for summing the roughness signal with at least one other signal to generate an engine roughness control signal, and a special condition switch operative to apply a fixed reference signal to said summing means causing the roughness control to generate an engine roughness control signal having a predetermined value causing a rich air/fuel mixture to be supplied to the engine, said switch means transmits said first and second warm-up signals to said summing means in response to said load signal and said load enrichment signal activates said special condition switch.

10. The warm-up control of claim 1 wherein the value of said first warm-up signal is greater than the value of said second warm-up signal and the change in the quantity of fuel delivered to the engine in response to the first warm-up signal is greater than the change in the quantity of fuel delivered to the engine in response to said second warm-up signal.

11. The warm-up control of claim 10 wherein the polarity of said second warm-up signal is opposite the polarity of said first warm-up signal and wherein the quantity of fuel delivered to the engine is increased in response to said first warm-up signal and decreased in response to said second warm-up signal.

12. A warm-up control for an internal combustion engine comprising:
- means for generating a signal indicative of the temperature of the engine;
- means for generating a signal indicative of the load on the engine;
- first signal generator means for generating a first warm-up correction signal having a variable value when said temperature signal indicates the engine is below a first predetermined temperature;
- second signal generator means for generating a second warm-up correction signal having a variable value when said temperature signal indicates the engine is below a second predetermined temperature;
- switch means responsive to said load signal for gating said first warm-up correction signal when there is a load on the engine and for gating said second warm-up correction signal in the absence of a load on the engine; and
- fuel control means responsive to said first warm-up correction signal and said second warm-up correction signals for controlling the fuel delivered to the engine in accordance with the engine temperature and engine load.

13. The warm-up control according to claim 12 wherein said means generating a signal indicative of the load is a switch means operatively coupled to a transmission means connected to said engine and is responsive to the engagement of the transmission to the load.

14. The warm-up control according to claim 12 wherein said load sensor is a switch responsive to a first and second position of transmission shift level wherein said second position indicates no load on the engine.

15. The warm-up control according to claim 13 further including means for generating a load enrichment signal for a predetermined time in response to a signal generated by said load sensor indicative of the initiation of the engagement of the transmission to the load.

16. The warm-up control according to claim 14 further including means for generating a load enrichment signal for a predetermined time in response to said load sensor switching from second position.

17. The warm-up control of claims 15 or 16 wherein said fuel control means includes:
- an engine roughness sensor generating a roughness signal indicative of the engine's roughness;
- means for generating a signal indicative of at least one other engine operating parameter;
- a summing means for summing said roughness signal and said signal indicative of at least one engine operating parameter, and
- a switch means responsive to said load enrichment signal and operative to modify said signal from said summing means for controlling the fuel delivered to the engine to prevent engine stalling.

18. The warmup control of claim 12 wherein the value of said first warm-up signal is greater than the value of said second warm-up signal and the change in the quantity of fuel delivered to the engine in response to the first warm-up signal is greater than the change in the quantity of fuel delivered to the engine in response to said second warm-up signal.

19. The warm-up control of claim 18 wherein the polarity of said second warm-up signal is opposite the polarity of said first warm-up signal and wherein the quantity of fuel delivered to the engine is increased in response to said first warm-up signal and decreased in response to said second warm-up signal.

* * * * *